US011178008B2

(12) United States Patent
Ackley et al.

(10) Patent No.: US 11,178,008 B2
(45) Date of Patent: Nov. 16, 2021

(54) MANAGING A FLEET OF DEVICES

(71) Applicant: Datamax-O'Neil Corporation, Altamonte Springs, FL (US)

(72) Inventors: H. Sprague Ackley, Seattle, WA (US); Thomas Celinder, Singapore (SG)

(73) Assignee: DATAMAX-O'NEIL CORPORATION, Altamonte Springs, FL (US)

( * ) Notice: Subject to any disclaimer, the term of this patent is extended or adjusted under 35 U.S.C. 154(b) by 0 days.

(21) Appl. No.: 16/818,344

(22) Filed: Mar. 13, 2020

(65) Prior Publication Data
US 2020/0213198 A1 Jul. 2, 2020

Related U.S. Application Data

(63) Continuation of application No. 15/638,654, filed on Jun. 30, 2017, now Pat. No. 10,644,944.

(51) Int. Cl.
*G06F 15/177* (2006.01)
*H04L 12/24* (2006.01)
(Continued)

(52) U.S. Cl.
CPC ...... *H04L 41/0836* (2013.01); *H04L 41/0668* (2013.01); *H04L 41/0806* (2013.01); *H04L 63/104* (2013.01); *G06Q 10/00* (2013.01)

(58) Field of Classification Search
CPC ............. H04L 41/0836; H04L 41/0668; H04L 41/0806; H04L 63/104; G06Q 10/00
(Continued)

(56) References Cited

U.S. PATENT DOCUMENTS 5,488,223 A * 1/1996 Austin ................. B41J 11/009
235/375
5,689,755 A 11/1997 Hiroyuki
(Continued)

FOREIGN PATENT DOCUMENTS

JP 2004-042514 A 2/2004
WO 2013/163789 A1 11/2013
(Continued)

OTHER PUBLICATIONS

Corrected Notice of Allowability dated Jul. 22, 2020 for U.S. Appl. No. 15/638,569.
(Continued)

*Primary Examiner* — Atta Khan
(74) *Attorney, Agent, or Firm* — Alston & Bird LLP

(57) ABSTRACT

Methods of managing a fleet of devices are provided, as are methods for configuring a standby device for a job in a workflow environment, and methods for performing a job in a workflow environment. Device information is analyzed, such as information pertaining to verification systems. Device instructions are sent to various locations on a device network in response to a deviation from a parameter value having been detected. The deviation from the parameter value may correspond to printed media and/or indicia produced by one or more devices. A workflow device and a standby device are provided, and the workflow device sends configuration data to the standby device. The standby device installs configuration data and is introduced into the workflow environment.

20 Claims, 32 Drawing Sheets

(51) Int. Cl.
*H04L 29/06* (2006.01)
*G06Q 10/00* (2012.01)

(58) Field of Classification Search
USPC ........................................................ 709/220
See application file for complete search history.

(56) References Cited

U.S. PATENT DOCUMENTS

| | | | |
|---|---|---|---|
| 6,041,229 A | 3/2000 | Nathan | |
| 6,042,279 A | 3/2000 | Sprague | |
| 6,665,425 B1 * | 12/2003 | Sampath | H04N 1/00002 |
| | | | 358/1.15 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,509,642 B1 | 3/2009 | Mitchell et al. | |
| 7,726,575 B2 | 6/2010 | Wang et al. | |
| 7,821,662 B2 | 10/2010 | Matsueda | |
| 7,916,327 B2 | 3/2011 | Yamaguchi | |
| 8,294,969 B2 | 10/2012 | Plesko | |
| 8,317,105 B2 | 11/2012 | Kotlarsky et al. | |
| 8,322,622 B2 | 12/2012 | Yong | |
| 8,336,761 B1 | 12/2012 | Scott | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | George | |
| 8,400,658 B2 | 3/2013 | Ito | |
| 8,408,464 B2 | 4/2013 | Zhu et al. | |
| 8,408,468 B2 | 4/2013 | Van et al. | |
| 8,408,469 B2 | 4/2013 | Timothy | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Philip | |
| 8,474,712 B2 | 7/2013 | Kearney et al. | |
| 8,479,992 B2 | 7/2013 | Kotlarsky et al. | |
| 8,490,877 B2 | 7/2013 | Philip | |
| 8,517,271 B2 | 8/2013 | Kotlarsky et al. | |
| 8,523,076 B2 | 9/2013 | Timothy | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Phillip | |
| 8,556,174 B2 | 10/2013 | Kosecki et al. | |
| 8,556,176 B2 | 10/2013 | Van et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein, Jr. | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Yiwu | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre, Jr. | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz, Sr. | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue et al. | |
| 8,862,105 B2 | 10/2014 | Lindeman et al. | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |

(56) References Cited

U.S. PATENT DOCUMENTS

| | | |
|---|---|---|
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Duane |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,248,640 B2 | 2/2016 | Heng |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey et al. |
| 9,342,827 B2 | 5/2016 | Smith |
| 9,355,294 B2 | 5/2016 | Smith et al. |
| 9,367,722 B2 | 6/2016 | Xian et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,407,840 B2 | 8/2016 | Wang |
| 9,412,242 B2 | 8/2016 | Van et al. |
| 9,418,252 B2 | 8/2016 | Nahill et al. |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |
| 9,478,113 B2 | 10/2016 | Xie et al. |
| D771,631 S | 11/2016 | Fitch et al. |
| D777,166 S | 1/2017 | Bidwell et al. |
| 9,582,696 B2 | 2/2017 | Barber et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| D790,505 S | 6/2017 | Vargo et al. |
| D790,546 S | 6/2017 | Zhou et al. |
| D790,553 S | 6/2017 | Fitch et al. |
| 9,715,614 B2 | 7/2017 | Todeschini et al. |
| 9,734,493 B2 | 8/2017 | Gomez et al. |
| 9,857,167 B2 | 1/2018 | Jovanovski et al. |
| 9,892,876 B2 | 2/2018 | Bandringa |
| 10,007,112 B2 | 6/2018 | Fitch et al. |
| 10,019,334 B2 | 7/2018 | Caballero et al. |
| 10,021,043 B2 | 7/2018 | Sevier |
| 10,038,716 B2 | 7/2018 | Todeschini |
| 10,066,982 B2 | 9/2018 | Ackley et al. |
| 10,327,158 B2 | 6/2019 | Wang et al. |
| 10,360,728 B2 | 7/2019 | Venkatesha et al. |
| 10,401,436 B2 | 9/2019 | Young et al. |
| 10,410,029 B2 | 9/2019 | Powilleit |
| 10,644,944 B2 | 5/2020 | Ackley et al. |
| 2001/0048833 A1 | 12/2001 | Katsuda et al. |
| 2002/0089692 A1 | 7/2002 | Ferlitsch |
| 2002/0143423 A1 | 10/2002 | Huber et al. |
| 2003/0020938 A1 | 1/2003 | Terada et al. |
| 2003/0090697 A1 | 5/2003 | Lester et al. |
| 2004/0136030 A1* | 7/2004 | Gassho ............... G06F 3/1259 358/1.15 |
| 2005/0046875 A1 | 3/2005 | Gibson |
| 2006/0033956 A1 | 2/2006 | Takahashi |
| 2007/0063048 A1 | 3/2007 | Havens et al. |
| 2007/0233543 A1 | 10/2007 | Keita |
| 2008/0144084 A1* | 6/2008 | Rai ..................... G06F 3/126 358/1.15 |
| 2008/0189693 A1 | 8/2008 | Pathak |
| 2009/0027729 A1 | 1/2009 | Trelewicz et al. |

(56) References Cited

U.S. PATENT DOCUMENTS

| | | | |
|---|---|---|---|
| 2009/0033970 A1* | 2/2009 | Bray | H04N 1/60 358/1.13 |
| 2009/0134221 A1 | 5/2009 | Zhu et al. | |
| 2009/0164533 A1 | 6/2009 | Hubbard | |
| 2009/0303502 A1* | 12/2009 | Robinson | H04N 1/2307 358/1.9 |
| 2010/0158547 A1* | 6/2010 | Carling | G03G 21/02 399/27 |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2010/0265880 A1 | 10/2010 | Rautiola et al. | |
| 2011/0075192 A1* | 3/2011 | Kumamoto | G06F 3/121 358/1.15 |
| 2011/0169999 A1 | 7/2011 | Grunow et al. | |
| 2011/0202554 A1 | 8/2011 | Powilleit et al. | |
| 2011/0228668 A1 | 9/2011 | Pillai et al. | |
| 2012/0111946 A1 | 5/2012 | Vladimir | |
| 2012/0168512 A1 | 7/2012 | Kotlarsky et al. | |
| 2012/0179625 A1 | 7/2012 | Holmes | |
| 2012/0193423 A1 | 8/2012 | Justin | |
| 2012/0203647 A1 | 8/2012 | Taylor | |
| 2012/0223141 A1 | 9/2012 | Good et al. | |
| 2012/0257917 A1* | 10/2012 | Bockus, Jr. | G06F 3/1285 400/76 |
| 2012/0268544 A1 | 10/2012 | Munechika et al. | |
| 2013/0043312 A1 | 2/2013 | Van Horn | |
| 2013/0075168 A1 | 3/2013 | Amundsen et al. | |
| 2013/0175341 A1 | 7/2013 | Kearney et al. | |
| 2013/0175343 A1 | 7/2013 | Timothy | |
| 2013/0208315 A1* | 8/2013 | Zeng | G06F 3/126 358/1.15 |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0287258 A1 | 10/2013 | Philip | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306731 A1 | 11/2013 | Monaco | |
| 2013/0307964 A1 | 11/2013 | Bremer et al. | |
| 2013/0308625 A1 | 11/2013 | Park et al. | |
| 2013/0313324 A1 | 11/2013 | Koziol et al. | |
| 2013/0313325 A1 | 11/2013 | Wilz et al. | |
| 2013/0318397 A1 | 11/2013 | Shawn | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008439 A1 | 1/2014 | Wang | |
| 2014/0025584 A1 | 1/2014 | Liu et al. | |
| 2014/0034734 A1 | 2/2014 | Sauerwein, Jr. | |
| 2014/0036848 A1 | 2/2014 | Pease et al. | |
| 2014/0039693 A1 | 2/2014 | Havens et al. | |
| 2014/0042814 A1 | 2/2014 | Kather et al. | |
| 2014/0049120 A1 | 2/2014 | Kohtz et al. | |
| 2014/0049635 A1 | 2/2014 | Laffargue et al. | |
| 2014/0061306 A1 | 3/2014 | Wu et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Alfred | |
| 2014/0074746 A1 | 3/2014 | Wang | |
| 2014/0076974 A1 | 3/2014 | Havens et al. | |
| 2014/0078341 A1 | 3/2014 | Havens et al. | |
| 2014/0078342 A1 | 3/2014 | Li et al. | |
| 2014/0078345 A1 | 3/2014 | Edward | |
| 2014/0085665 A1* | 3/2014 | Sheldon | G06F 3/1205 358/1.15 |
| 2014/0098792 A1 | 4/2014 | Wang et al. | |
| 2014/0100774 A1 | 4/2014 | Edward | |
| 2014/0100813 A1 | 4/2014 | Edward | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Giordano et al. | |
| 2014/0104451 A1 | 4/2014 | Todeschini et al. | |
| 2014/0106594 A1 | 4/2014 | Matthew | |
| 2014/0106725 A1 | 4/2014 | Sauerwein, Jr. | |
| 2014/0108010 A1 | 4/2014 | Maltseff et al. | |
| 2014/0108402 A1 | 4/2014 | Gomez et al. | |
| 2014/0108682 A1 | 4/2014 | Aldo | |
| 2014/0110485 A1 | 4/2014 | Toa et al. | |
| 2014/0114530 A1 | 4/2014 | Fitch et al. | |
| 2014/0124577 A1 | 5/2014 | Wang et al. | |
| 2014/0124579 A1 | 5/2014 | Yiwu | |
| 2014/0125842 A1 | 5/2014 | Winegar | |
| 2014/0125853 A1 | 5/2014 | Paul | |
| 2014/0125999 A1 | 5/2014 | Longacre et al. | |
| 2014/0129378 A1 | 5/2014 | Neil | |
| 2014/0131438 A1 | 5/2014 | Philip | |
| 2014/0131441 A1 | 5/2014 | Nahill et al. | |
| 2014/0131443 A1 | 5/2014 | Taylor | |
| 2014/0131444 A1 | 5/2014 | Paul | |
| 2014/0131445 A1 | 5/2014 | Ding et al. | |
| 2014/0131448 A1 | 5/2014 | Xian et al. | |
| 2014/0133379 A1 | 5/2014 | Wang et al. | |
| 2014/0136208 A1 | 5/2014 | Maltseff et al. | |
| 2014/0140585 A1 | 5/2014 | Ynjiun | |
| 2014/0151453 A1 | 6/2014 | Meier et al. | |
| 2014/0152882 A1 | 6/2014 | Samek et al. | |
| 2014/0158770 A1 | 6/2014 | Sevier et al. | |
| 2014/0159869 A1 | 6/2014 | Zumsteg et al. | |
| 2014/0166755 A1 | 6/2014 | Liu et al. | |
| 2014/0166757 A1 | 6/2014 | Taylor | |
| 2014/0166759 A1 | 6/2014 | Liu et al. | |
| 2014/0168787 A1 | 6/2014 | Wang et al. | |
| 2014/0175165 A1 | 6/2014 | Havens et al. | |
| 2014/0175172 A1 | 6/2014 | Jovanovski et al. | |
| 2014/0191644 A1 | 7/2014 | Chaney | |
| 2014/0191913 A1 | 7/2014 | Ge et al. | |
| 2014/0197238 A1 | 7/2014 | Liu et al. | |
| 2014/0197239 A1 | 7/2014 | Havens et al. | |
| 2014/0197304 A1 | 7/2014 | Feng et al. | |
| 2014/0203087 A1 | 7/2014 | Smith et al. | |
| 2014/0204268 A1 | 7/2014 | Grunow et al. | |
| 2014/0214631 A1 | 7/2014 | Michael | |
| 2014/0217166 A1 | 8/2014 | Berthiaume et al. | |
| 2014/0217180 A1 | 8/2014 | Pengfei | |
| 2014/0231500 A1 | 8/2014 | Ehrhart et al. | |
| 2014/0232930 A1 | 8/2014 | Donald | |
| 2014/0247315 A1 | 9/2014 | Marty et al. | |
| 2014/0257906 A1 | 9/2014 | Soubra | |
| 2014/0263493 A1 | 9/2014 | Amurgis et al. | |
| 2014/0263645 A1 | 9/2014 | Smith et al. | |
| 2014/0267609 A1 | 9/2014 | Franck | |
| 2014/0270196 A1 | 9/2014 | Braho et al. | |
| 2014/0270229 A1 | 9/2014 | Keith | |
| 2014/0278387 A1 | 9/2014 | DiGregorio | |
| 2014/0278391 A1 | 9/2014 | Braho et al. | |
| 2014/0282015 A1 | 9/2014 | Nixon et al. | |
| 2014/0282210 A1 | 9/2014 | Thomas | |
| 2014/0284384 A1 | 9/2014 | Lu et al. | |
| 2014/0288933 A1 | 9/2014 | Braho et al. | |
| 2014/0297058 A1 | 10/2014 | Barker et al. | |
| 2014/0299665 A1 | 10/2014 | Barber et al. | |
| 2014/0300916 A1 | 10/2014 | Boldt et al. | |
| 2014/0312121 A1 | 10/2014 | Lu et al. | |
| 2014/0319220 A1 | 10/2014 | Larry | |
| 2014/0319221 A1 | 10/2014 | Oberpriller et al. | |
| 2014/0326787 A1 | 11/2014 | Maria | |
| 2014/0332590 A1 | 11/2014 | Wang et al. | |
| 2014/0344943 A1 | 11/2014 | Todeschini et al. | |
| 2014/0346233 A1 | 11/2014 | Liu et al. | |
| 2014/0351317 A1 | 11/2014 | Smith et al. | |
| 2014/0353373 A1 | 12/2014 | Van et al. | |
| 2014/0361073 A1 | 12/2014 | Qu et al. | |
| 2014/0361082 A1 | 12/2014 | Xian et al. | |
| 2014/0362184 A1 | 12/2014 | Jovanovski et al. | |
| 2014/0363015 A1 | 12/2014 | Keith | |

(56) References Cited

U.S. PATENT DOCUMENTS

| | | |
|---|---|---|
| 2014/0369511 A1 | 12/2014 | Sheerin et al. |
| 2014/0374483 A1 | 12/2014 | Chunhua |
| 2014/0374485 A1 | 12/2014 | Xian et al. |
| 2015/0001301 A1 | 1/2015 | Yunxin |
| 2015/0001304 A1 | 1/2015 | Erik |
| 2015/0003673 A1 | 1/2015 | Marie |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Ting |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Erik |
| 2015/0083800 A1 | 3/2015 | Li et al. |
| 2015/0086114 A1 | 3/2015 | Erik |
| 2015/0088522 A1 | 3/2015 | Hendrickson et al. |
| 2015/0096872 A1 | 4/2015 | William |
| 2015/0099557 A1 | 4/2015 | Pettinelli et al. |
| 2015/0100196 A1 | 4/2015 | Hollifield |
| 2015/0102109 A1 | 4/2015 | Richard |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Sanjay |
| 2015/0144692 A1 | 5/2015 | Benjamin |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161427 A1 | 6/2015 | Guo et al. |
| 2015/0161429 A1 | 6/2015 | Tao |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Edward |
| 2015/0210199 A1 | 7/2015 | Gregory |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Benjamin |
| 2016/0040982 A1 | 2/2016 | Li et al. |
| 2016/0042241 A1 | 2/2016 | Erik |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Erik |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Erik |
| 2016/0178479 A1 | 6/2016 | Stanley |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | John |
| 2016/0292477 A1 | 10/2016 | Jeffrey |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0327930 A1 | 11/2016 | Charpentier et al. |
| 2016/0330218 A1 | 11/2016 | Hussey et al. |
| 2016/0343176 A1 | 11/2016 | Sprague |
| 2016/0364586 A1 | 12/2016 | Erik |
| 2016/0377414 A1 | 12/2016 | Thuries et al. |
| 2017/0046104 A1* | 2/2017 | Vonderen ............. B41J 2/17566 |
| 2017/0046603 A1 | 2/2017 | Lee et al. |

FOREIGN PATENT DOCUMENTS

| | | |
|---|---|---|
| WO | 2013/173985 A1 | 11/2013 |
| WO | 2014/019130 A1 | 2/2014 |
| WO | 2014/110495 A1 | 7/2014 |

OTHER PUBLICATIONS

Carl W. Gerst III, "New Standards Reliably Verify 2D Data Matrix Codes" Copyright 2008, 10 pages.

Communication Pursuant to Article 94 (3) for European Application No. 18179969.3, dated Dec. 17, 2019, 6 pages.

Corrected Notice of Allowability for U.S. Appl. No. 15/638,654, dated Feb. 5, 2020, 8 pages.

Extended Search Report in related European Application No. 18179969.3 dated Aug. 13, 2018, pp. 1-7.

GS1, The Global Language of Business, "1D Barcode Verification Process Implementation Guideline", Dated Jul. 2015, 44 pages.

Intermec, "PD41/PD42 Commercial Printer; User's Manual", Copyright 2009-2014, 162 pages.

Intermec, "Thermal Print Head (TPH) Resolution and Advantages" Copyright 2012, 3 pages.

Notice of Allowance and Fees Due (PTOL-85) dated Feb. 5, 2020 for U.S. Appl. No. 15/638,654.

Notice of Allowance and Fees Due (PTOL-85) dated Mar. 24, 2020 for U.S. Appl. No. 15/638,569.

Notice of Allowance for U.S. Appl. No. 15/638,654, dated Aug. 23, 2019.

Notice of Allowance for U.S. Appl. No. 15/638,654, dated Dec. 18, 2019, 12 pages.

Notice of Allowance for U.S. Appl. No. 15/638,654, dated Nov. 14, 2019, 16 pages.

Office Action from U.S. Appl. No. 15/638,569, dated Aug. 22, 2019.
Office Action from U.S. Appl. No. 15/638,654, dated Apr. 5, 2019.
U.S. Appl. No. 13/367,978, filed Feb. 7, 2012, (Feng et al.); now abandoned.

U.S. Patent Application for Application Independent DEX/UCS Interface filed May 8, 2015 (Pape); 47 pages, U.S. Appl. No. 14/707,123.

U.S. Appl. No. 14/277,337 for Multipurpose Optical Reader, filed May 14, 2014 (Jovanovski et al.); 59 pages; now abandoned.

U.S. Appl. No. 14/283,282 for Terminal Having Illumination and Focus Control filed May 21, 2014 (Liu et al.); 31 pages; now abandoned.

U.S. Appl. No. 14/446,391 for Multifunction Point of Sale Apparatus With Optical Signature Capture filed Jul. 30, 2014 (Good et al. ); 37 pages; now abandoned.

(56) References Cited

OTHER PUBLICATIONS

Annex to the Summons to Attend Oral Proceedings for European Patent Application No. 18179969.3 dated Jul. 16, 2020, 6 pages.
Communication Pursuant to Rules 70(2) and 70a(2) for European Patent Application No. 18179969.3 dated Jan. 7, 2019, 2 pages.
Summons to Attend Oral Proceedings for European Patent Application No. 18179969.3 dated Jul. 16, 2020, 2 pages.
Corrected Notice of Allowability dated Aug. 12, 2020 for U.S. Appl. No. 15/638,569.
Non-Final Rejection dated Jun. 23, 2020 for U.S. Appl. No. 15/638,522.
Notice of Allowance and Fees Due (PTOL-85) dated Dec. 9, 2020 for U.S. Appl. No. 15/638,522.
Notice of Allowance and Fees Due (PTOL-85) dated Mar. 8, 2021 for U.S. Appl. No. 15/638,522.
Communication Pursuant to Article 94(3) issued in EP Application No. 18179969.3 dated May 31, 2021 (4 pages).

\* cited by examiner

Exemplary Triggering Events

Ascertained by Workflow Device
Change in status
    Device failure
        General failure
        Physical failure
        Software failure
    Loss of connectivity
    Scheduled Downtime
        Maintenance requirement
        Service due
    Deviation from parameter value
Production requirement
    Additional capacity needed
    Different capability needed User Input
Device request by User
    Device failure
        General failure
        Functional failure
    Additional capacity needed
    Maintenance requirement
    Service due Ascertained by Standby Device
Communication from workflow device
    Change in status
    Production requirement
Loss of connectivity with workflow device
    Device offline
    Time since last communication
Scheduled downtime
    Maintenance requirement
    Service due
Deviation from parameter value
Production requirement
Communication from other source
    Server
    User Input Ascertained by Server
Communication from workflow device
    Change in status
    Production requirement
Loss of connectivity with workflow device
    Device offline
    Time since last communication
Scheduled downtime
    Maintenance requirement
    Service due
Deviation from parameter value
Production requirement
Communication from other source
    Server
    User Input

FIG. 14

MANAGING A FLEET OF DEVICES

CROSS-REFERENCE TO RELATED APPLICATION

The present application is a continuation application of U.S. patent application Ser. No. 15/638,654, filed on Jun. 30, 2017 and titled "MANAGING A FLEET OF DEVICES," the entire content of which is incorporated by reference into the present application.

FIELD OF THE INVENTION

The present disclosure relates to systems and methods for managing a fleet of devices, for example, one or more devices that have been deployed in a workflow environment. More particularly, but without limitation, the present disclosure concerns systems and methods for deploying devices in a workflow environment and assigning jobs to those devices, for managing performance objectives, for introducing a standby device into a workflow environment, and for performing jobs in a workflow environment. Further, these methods generally allow users to manage a fleet of devices without requiring much knowledge or skill pertaining to information technology.

BACKGROUND

It is common for a fleet of devices to be deployed in a workflow environment. In some settings, a fleet of devices may be deployed across a large enterprise, which may include numerous workflow environments and/or numerous devices within a given workflow environment. Managing a large fleet of devices presents several challenges which are addressed by the present disclosure.

For instance, there are numerous examples of workflow environments which require outputs that meet a certain level of quality, productivity, and/or cost-efficiency. The quality of outputs from a given device can be managed to some degree by periodically sampling outputs and testing the samples for various quality parameters, and then taking appropriate action when the test results indicate an issue with output quality. However, in some settings, quality issues may go undetected for some time and/or quality issues may be unanticipated, for example, when outputs are only periodically sampled for quality testing. Quality issues that go undetected may lead to further undesirable outcomes, such as unsalable or unusable outputs, rework, downtime for devices, customer complaints, and the like. In some situations, an issue with output quality may require downtime for a workflow device until the issue has been resolved. Further, quality issues that are unanticipated may lead to delayed responses. Delays in detecting and responding to output quality, as well as downtime for a workflow device, tend to directly impact the uptime and productivity, and correspondingly the operating costs and profitability, of a device, a workflow environment, and/or an enterprise. It would therefore be advantageous to provide improved methods for managing output quality for a device or fleet of devices, including detecting or predicting quality issues, managing undesirable outcomes from quality issues, and timely responding to quality issues.

As another example, a multitude of factors may cause the time when maintenance or service is required for a given device to vary as between different devices and/or as between different workflow environments. In some situations, maintenance or service requirements for devices may go undetected for some time and/or such requirements may be unanticipated. If a device goes too long without maintenance or service, the device may experience a failure or performance or quality issues may arise; but on the other hand, if maintenance or service is performed too frequently, costs will be incurred that may otherwise have been avoidable. Likewise, a device failure may occur unexpectedly, and eventually a device will reach the end of its useful life. It would therefore be advantageous to provide improved methods for managing maintenance or service, for responding to failures, and for managing useful life, of a device or fleet of devices, including managing maintenance or service schedules, detecting or predicting maintenance or service issues, and timely responding to such issues.

As another example, in some situations, a given output may be producible with any one or more different devices. Similarly, in some situations, a given device may be configurable with any one or more different configurations. Such configurations may include a selection of component parts, consumables, and settings for the device. Operations of an enterprise, a workflow environment, or a given device may be affected by the selection of a device and/or by the selection of a configuration for a device. For example, such sections may impact output quality, maintenance or service requirements, uptime, productivity, and/or operating costs, of a device, a workflow environment, and/or an enterprise. However, in some situations a multitude of factors may be relevant, and/or the relevance of various factors or the significance of various factors may vary as between different devices and/or as between different workflow environments. Furthermore, in some situations, various performance objectives may be inversely proportional to one another (e.g., quality vs. cost, quality vs. productivity, productivity vs. cost), such that tradeoffs between competing objectives may exist. It would therefore be advantageous to provide improved methods for managing the selection of devices and/or device configurations, including managing performance objectives, and deployment of devices and/or device configurations into workflow environments, and assignment of jobs to various devices.

These issues are especially magnified when managing an enterprise that utilizes a large number of workflow devices and/or multiple workflow environments. It would therefore be advantageous to provide improved systems and methods for managing a large fleet of devices, in particular but without limitation, fleets of devices across an enterprise having multiple workflow environments.

The present disclosure seeks to address the foregoing shortcomings and needs, for example, by providing systems and methods that utilize devices having a verification system which allows for improved monitoring of output parameters, which output parameters may then be utilized in the systems and methods for managing fleets of devices disclosed herein, including, without limitation, systems and methods for managing performance objectives, systems and methods for managing maintenance and service requirements, systems and methods for managing the selection of devices device configurations, and/or systems and methods for deploying or introducing devices into workflow environments.

In addition to output quality, there are numerous examples of workflow environments which require a high level of uptime or productivity. As such it would be desirable to enhance the uptime or productivity of a device or a fleet of devices in a workflow environment by providing one or more standby devices, which can be introduced into the workflow environment when a workflow device experiences a failure, a quality issue, or otherwise removed from service for some reason. Similarly, it would be desirable to enhance uptime or productivity by providing one or more standby devices which can be introduced into the workflow environment in connection with improved methods for managing the selection of devices and/or device configurations, for example, but without limitation, in connection with managing performance objectives.

When introducing a standby device into a workflow environment in place of a workflow device, generally the standby device may require firmware, software, applications, and/or settings identical to or compatible with the workflow device being replaced. In some situations, a fleet of devices may comprise several workflow devices having various different configurations, including different firmware, software, applications, and/or settings. For example, different configurations may be desirable to configure devices for various different jobs or users. Additionally, in some situations different configurations may be required as between differing device models in order to configure each of them to perform a given job in a workflow environment, and/or different configurations may be desirable for managing performance objectives.

In some workflow environments, there may be a large number of workflow devices that need to be managed, and some enterprises may encompass multiple workflow environments. Accordingly, some workflow environments may have multiple different devices with multiple different configurations. Such multiple different devices and/or multiple different configurations may require various differing combinations of firmware, software, applications, and/or settings, which may become burdensome to manage. Oftentimes, it would be impractical to maintain a separate standby device for each different workflow device or for each different configuration. For example, it may be cost prohibitive to maintain a large number of standby devices. Instead, it would be desirable to maintain an optimally small number of standby devices, preferably having a given standby device configurable to perform various different jobs corresponding to several different workflow devices and/or configurable according to different factors that may be relevant for managing performance objectives.

A technically proficient support staff generally has been required to setup and maintain device networks in which a server manages a fleet of devices. A technically proficient support staff also generally has been required to configure devices with appropriate firmware, software, applications, and settings and to keep the various firmware, software, applications, and settings information organized and up to date. Even with a server-managed workflow environment, configuration information tends to become mixed up or lost, especially when managing a large number of devices and/or a large number of different configurations. Furthermore, the time required to configure a standby device (e.g., replicate a workflow device on a standby device) and then introduce the standby device into a workflow environment is another issue which tends to directly impact uptime or productivity, and correspondingly operating costs and profitability, of the workflow environment. These issues may be magnified when support staff cannot promptly respond to a service request, resulting in extended downtime.

In view of the foregoing, there further exists a need to provide improved systems and methods for managing a fleet of devices, in particular but without limitation, systems and methods for configuring a standby device and introducing the standby device into a workflow environment. The present disclosure seeks to address the foregoing shortcomings and needs, for example, by providing systems and methods that allow ordinary users to manage a fleet of devices without requiring much knowledge or skill pertaining to information technology.

Optionally, in some embodiments, the systems and methods in the present disclosure may be performed without requiring a server to manage the devices in the workflow environment, thereby offsetting costs associated with network hardware, software, and/or support staff. Additionally, these systems and methods allow for an optimally small number of standby devices in a workflow environment, preferably with a given standby device being capable of replicating multiple different workflow devices, and/or multiple workflow devices with different configurations from one another. The present disclosure additionally addresses these shortcomings and needs by providing improved systems and methods for replicating a workflow device on a standby device and methods for performing jobs in a workflow environment.

SUMMARY

Accordingly, in one aspect, the present disclosure embraces methods of managing a fleet of devices.

Managing Performance Objectives

In an exemplary embodiment, a device network is provided which includes a plurality of workflow devices. One or more of the plurality of workflow devices include a printer configured to produce printed media and/or indicia, and an inline scanner configured to obtain device information pertaining to printed media and/or indicia produced by the printer. The device information may pertain at least in part to printed media and/or indicia produced by such one or more workflow devices. For example, the device information may include a digital image of the printed media and/or indicia. Further, the device information may correspond to one or more jobs, such as jobs having been at least partially performed by one or more workflow devices from among the plurality.

The device information is analyzed, which for example, may include comparing at least some device information to a parameter value. In response to having detected a deviation from a parameter value, an instruction is sent to at least one location on the device network. The deviation from the parameter value may correspond to printed media and/or indicia produced by one or more devices. The instruction triggers an action responsive to address the deviation. As examples, the action may include assigning one or more jobs to a different device, scheduling maintenance for one or more workflow devices from among the plurality, and/or changing an input parameter for at least one workflow device from among the plurality. As an example, the input parameter may include print logic.

The plurality of workflow devices may include a first device, a second device, and optionally an Nth device. As examples, the action may include assigning one or more jobs from the first device to the second device, in which case the second device would be the different device. Additionally, or in the alternative, the action may include assigning one or more jobs from the second device to the third device, in which case the third device would be the different device. Further, the action may include assigning one or more jobs from the first device to the different device and scheduling maintenance for the second device.

In some embodiments, the device network may further include a standby device. The action may include triggering the standby device to be introduced into a workflow environment, in which case the standby device would be the different device.

In some embodiments, a parameter value may be based at least in part on a quality metric corresponding to printed media and/or indicia. The quality metric may be based at least in part on a value corresponding to or more of: print growth, print shrinkage, ink spread, edge determination, minimum reflectance, symbol contrast, minimum edge contrast, modulation, printing defects, quiet zone, and decodability, cell contrast, cell modulation, fixed pattern damage, unused error correction, axial non-uniformity, and grade non-uniformity. Additionally, or in the alternative, the quality metric may be based at least in part on one or more OCR quality parameters, including character_inside_fit, character_outside_fit, character, position, background noise, and character evaluation value (CEV) grade. Additionally, or in the alternative, the parameter value may be based at least in part on a scan parameter or a grade for such printed media and/or indicia, such as an overall symbol grade for indicia. Additionally, or in the alternative, a parameter value may be based at least in part on a performance objective. Such a parameter value may include a quality value, a productivity value, and/or a cost value. A quality value may include any parameter value that has a quality component. A productivity value may include any parameter value that has a productivity component. A cost value may include any parameter value that has a cost component. The performance objective (e.g., the quality value, a productivity value, and/or a cost value) may be based at least in part on the scan parameter or the grade for the printed media and/or indicia, such as the overall symbol grade for such indicia. The action may include changing an input parameter for at least one workflow device in order to change the parameter value based on the performance objective.

In yet another exemplary embodiment, a device network includes a plurality of workflow devices, at least some of which include a verification system. In some embodiments, a device may include a production system integrated with a verification system. Additionally, or in the alternative, a plurality of devices may include a first device having a production system and a second device having a verification system. The first device and the second device may be communicatively coupled. A production system may be configured to produce outputs, and a verification system may be configured to obtain device information pertaining to outputs. Device information at least in part pertaining to outputs produced by one or more of the workflow devices from among the plurality is compared to a parameter value, and responsive to detecting a deviation from the parameter value, an instruction is sent to at least one location on the device network. The instruction triggers an action responsive to address such deviation. In some embodiments, one or more devices may include a printer configured to produce printed media and/or indicia, and/or a scanner/verifier configured to obtain device information pertaining to the printed media and/or indicia. The scanner may be an inline scanner. The device information may include a digital image of the printed media and/or indicia. Device information obtained by the verification system is compared to a parameter value, and in response to having detected a deviation from a parameter value, an instruction is sent to at least one location on the device network. The instruction triggers an action responsive to address the deviation.

In yet another exemplary embodiment, a system for managing a fleet of devices is provided. The system may include a plurality of workflow devices and a device server. At least some of the workflow devices include a printer configured to produce printed media and/or indicia, and at least some of the workflow devices include a scanner configured to obtain device information pertaining to the printed media and/or indicia. The device server is configured to: compare device information to a parameter value, and to send an instruction to at least one location on the device network in response to a deviation from the parameter value having been detected. The instruction triggers an action responsive to address such deviation.

Introducing Standby Devices into Workflow Environments

In yet another exemplary embodiment, a device network is provided, and residing on the network are a plurality of workflow devices, each having been assigned a job in a workflow environment, and one or more standby devices, each residing on standby to one or more of the workflow devices. The plurality of workflow devices may each have configuration data stored in memory thereof, and in some embodiments, the configuration data stored in one workflow device differs in at least one respect from configuration data stored in at least one additional workflow device.

Responsive to a triggering event having occurred with respect to a workflow device, the workflow device may cause the configuration data (e.g., a firmware file, a software file, an application file, and/or settings information) stored in memory thereof to be sent to a standby device selected from among the one or more standby devices, and responsive to receiving the configuration data, the selected standby device may be configured to install firmware, software, and/or an application in memory of the standby device and configure settings of the standby device according to the settings information. The standby device then may be introduced into the workflow environment, for example, in substitution for the workflow device, and may begin performing an assigned job in the workflow environment.

In some embodiments, one or more standby devices each broadcast status information to at least one of the plurality of workflow devices. The status information may include an identity and a location (e.g., an IP address), and a status indicating availability of the device (e.g., for introducing the workflow device into the workflow environment). In some embodiments, a workflow device selects a standby device based at least in part on status information. In some embodiments, the configuration data sent to the standby device differs from configuration data stored in memory of at least one other workflow device from among the plurality. The triggering event may include detecting one or more of: a device failure, scheduled downtime, a production requirement, a loss of connectivity in respect of another workflow device, a standby device, or another device or resource on a device network, a deviation from a parameter value, and a user input.

In another aspect, the present disclosure embraces methods of configuring a standby device for a job in a workflow environment. In an exemplary embodiment, a workflow device and a standby device are provided, and the workflow device and the standby device are in communication with one another, and the workflow device has configuration data (e.g., a firmware file, a software file, an application file, and/or settings information) stored in memory thereof. Configuration data is sent from the workflow device to the standby device, and responsive to receiving the configuration data, the standby device installs the firmware, software, and/or an application in memory of the standby device and configures settings of the standby device according to the settings information.

In another aspect, the present disclosure embraces methods of performing a job in a workflow environment. In an exemplary embodiment, a first device and a second device are provided, and the first device and the second device are in communication with one another, and the first device has configuration data (e.g., a firmware file, a software file, an application file, and/or settings information) stored in memory of the first device. A job is performed using the first device, and then responsive to a triggering event, configuration data from the first device is sent to the second device. Responsive to receiving the configuration data, the second device installs the firmware, software, and/or an application in memory of the second device and configures settings of the second device according to the settings information; and then the job is further performed using the second device.

In some embodiments, a standby device broadcasts status information to a workflow device. The status information may include an identity, a location, and a status indicating availability of the standby device. In some embodiments, a workflow device and a standby device reside on a device network additionally comprising at least one additional workflow device. Each workflow device may have configuration data stored in memory thereof, and the configuration data may differ in at least one respect from the configuration data stored in memory of the at least one additional workflow device.

In some embodiments, configuration data sent to a standby device corresponds to a first job assigned to a workflow device. The first job may differ in at least one respect from a second job assigned to one of the at least one additional workflow devices. The standby device may be configured to perform the first job upon installing firmware in memory of the standby device and configuring settings of the standby device according to settings information.

In some embodiments, a workflow device selects a standby device over at least one additional standby device based at least in part on a first job that has been assigned to the workflow device, for example, because the standby device selected is configurable to perform the first job.

In some embodiments, configuration data is sent from a workflow device to a standby device automatically in response to a triggering event. The triggering event may include detecting one or more of: a device failure, scheduled downtime, a production requirement, a loss of connectivity in respect of another workflow device, a standby device, or another device or resource on a device network, a deviation from a parameter value, and a user input.

In accordance with the present disclosure, a standby device may be introduced into a workflow environment, optionally in substitution for a workflow device. The standby device may broadcast updated status information to at least one other device residing on a device network. Such updated status information may include an identity, a location, and a status indicating that the device has been removed from standby and/or introduced into a workflow environment.

In another exemplary embodiment, configuration data (e.g., a firmware file, a software file, an application file, and/or settings information) is stored in memory of a first standby device selected from among one or more standby devices, and responsive to a triggering event having occurred, the first standby device may be configured to identify a standby device from among the one or more standby devices, and to install firmware, software, and/or an application in memory of one of the one or more standby devices, and configure settings of such standby device according to the settings information. The standby device identified by the first standby device may be the first standby device itself, or another standby device identified from a plurality of standby devices. The identified standby device then may be introduced into the workflow environment, for example, in substitution for a workflow device, and may begin performing an assigned job in the workflow environment.

In another exemplary embodiment, a first device and a second device are provided, and the first device and the second device are in communication with one another, and the first device has configuration data e.g., a firmware file, a software file, an application file, and/or settings information) stored in memory of the first device. Configuration data from the first device is sent to the second device. A job is performed using the first device, and then responsive to a triggering event, the second device installs the firmware, software, and/or an application in memory of the second device and configures settings of the second device according to the settings information; and then the job is further performed using the second device.

Managing Performance Objectives with Standby Devices

In yet another exemplary embodiment, a device network is provided which includes a plurality of workflow devices, one or more standby devices each residing on standby to one or more of the workflow devices, and memory storage. The memory storage has configuration data corresponding to one or more of the workflow devices stored thereon. The configuration data includes firmware and settings information corresponding to the respective job assigned to the one or more workflow devices. The workflow devices may include printers configured to produce printed media and/or indicia, and inline scanners configured to obtain device information pertaining to printed media and/or indicia produced by the printer. The device information may pertain at least in part to printed media and/or indicia produced by such workflow devices. For example, the device information may include a digital image of the printed media and/or indicia. Further, the device information may correspond to one or more jobs, such as jobs having been at least partially performed by one or more workflow devices from among the plurality.

The device information is analyzed, which for example, may include comparing at least some device information to a parameter value. In response to having detected a deviation from a parameter value, an instruction is sent to at least one location on the device network. The deviation from the parameter value may correspond to printed media and/or indicia produced by one or more devices. The instruction triggers one or more actions responsive to address the deviation. As an example, the one or more actions may include causing configuration data to be sent to a standby device selected from among the one or more standby devices.

Responsive to the standby device receiving the configuration data, the standby device installs the respective firmware in memory of the standby device and configures settings of the standby device according to the respective settings information. The standby device is then introduced into the workflow environment, for example, in substitution for one or more workflow devices from among the plurality. One or more jobs having been assigned to the one or more workflow devices are assigned to the standby device having been introduced into the workflow environment, for example, when the standby device is ready to perform the one or more jobs.

In some embodiments, the one or more actions may additionally include changing an input parameter for at least one workflow device from among the plurality, and/or changing an input parameter for at least one standby device from among the plurality. The input parameter may include print logic. Additionally, maintenance may be scheduled for at least one workflow devices from among the plurality and/or for at least one standby device from among the plurality.

The plurality of workflow devices may include a first device, a second device, and optionally a third device. The deviation from the parameter may correspond to printed media and/or indicia produced by the first device, and the standby device may be introduced into the workflow environment in substitution for the second device, with the first device remaining in the workflow environment to perform the respective job having been assigned to the first device. Additionally, maintenance may be scheduled for the second device.

In some embodiments, the standby device is selected based at least in part on status information having been broadcast to at least one location on the device network. The status information may include an identity, a location, and a status indicating availability of the standby device.

In some embodiments, the configuration data sent to the standby device differs from configuration data corresponding to at least one other workflow device from among the plurality. The configuration data sent to the standby device may correspond at least in part to a first job assigned to the workflow devices, which first job differs in at least one respect from a second job assigned to at least one additional workflow device from among the plurality. A standby device may be selected from among the plurality over at least one additional standby device, based at least in part on the standby device being configurable to perform the first job assigned to the workflow devices.

In yet another exemplary embodiment, a workflow device and a standby device are provided. The workflow device may include a production system and/or a verification system. The production system may be configured to produce outputs, and the verification system may be configured to obtain device information pertaining to outputs. The production system may be a printer configured to produce printed media and/or indicia, and the verification system may be a scanner configured to obtain device information pertaining to the printed media and/or indicia.

Responsive to a triggering event having occurred with respect to the workflow device, configuration data is sent to the standby device. The triggering event may be based at least in part on a deviation from a parameter value having been detected with respect to device information at least in part pertaining to an output produced by the production system. The configuration data includes firmware and settings information. As an example, the parameter value may be based at least in part on a quality metric corresponding to at least some of the outputs, such as printed media and/or indicia, produced by the workflow device.

Responsive to the standby device receiving the configuration data, the firmware is installed in memory of the standby device and the settings of the standby device are configured according to the settings information. Additionally, an input parameter for the workflow device may be changed and/or an input parameter for the standby device may be changed. The standby device is introduced into the workflow environment in substitution for the workflow device one or more jobs having been assigned to the workflow devices are assigned to the standby device, for example, when the standby device is ready to perform the one or more jobs.

The foregoing summary is illustrative only, and is not intended to be in any way limiting. In addition to the illustrative features and embodiments described above, further aspects, features, and embodiments will become apparent by references to the drawings, the following detailed description, and the claims.

BRIEF DESCRIPTION OF THE DRAWINGS

FIG. 14 shows an exemplary list of triggering events for introducing a standby device into a workflow environment.

DETAILED DESCRIPTION

In the following detailed description, systems and methods of managing a fleet of devices are described in greater detail with reference to the accompanying figures. More particularly, but without limitation, the present disclosure describes systems and methods for deploying devices in a workflow environment and assigning jobs to those devices, for managing process parameters of devices, for introducing a standby device into a workflow environment, and for performing jobs in a workflow environment. Such jobs may include any tasks assigned to a workflow device, or any functionality for which a workflow device is utilized, in a workflow environment. Numerous specific details are set forth in order to provide a thorough understanding of the present disclosure. It will be apparent, however, to one skilled in the art that the presently disclosed methods may be performed without some or all of these specific details. In other instances, well known aspects have not been described in detail in order not to unnecessarily obscure the present disclosure. The following detailed description is therefore not to be taken in a limiting sense, and it is intended that other embodiments are within the scope of the present disclosure.

Exemplary Device Networks and Workflow Environments

Exemplary device networks which may be implemented for various exemplary workflow environments are shown in FIGS. 1-6. A device network may include one or more workflow devices 100, 200, 300, 400, 500, 600. The workflow devices may be deployed in a workflow environment, and jobs may be assigned to the workflow devices. In some embodiments, a device network may additionally include one or more standby devices (e.g., FIGS. 3-6, 302, 402, 502, 602), residing on standby to one or more of the plurality of workflow devices. A standby device may be introduced into a workflow environment as or when needed, and jobs also may be assigned to the standby device.

A workflow environment may include any environment where devices are used perform jobs in a workflow. For example, but without limitation, the present disclosure is particularly applicable to devices such as printers and scanners, which may be used in environments such as warehouses, distribution centers, or manufacturing facilities in workflows such as receiving, assembly, order fulfillment, and shipping. Further exemplary devices and exemplary workflow environments are discussed below. Each workflow device may be assigned a job to perform in the workflow environment, and/or each workflow device may be assigned to a user or group of users who use the assigned workflow device to perform various jobs in the workflow environment.

Figure 1:
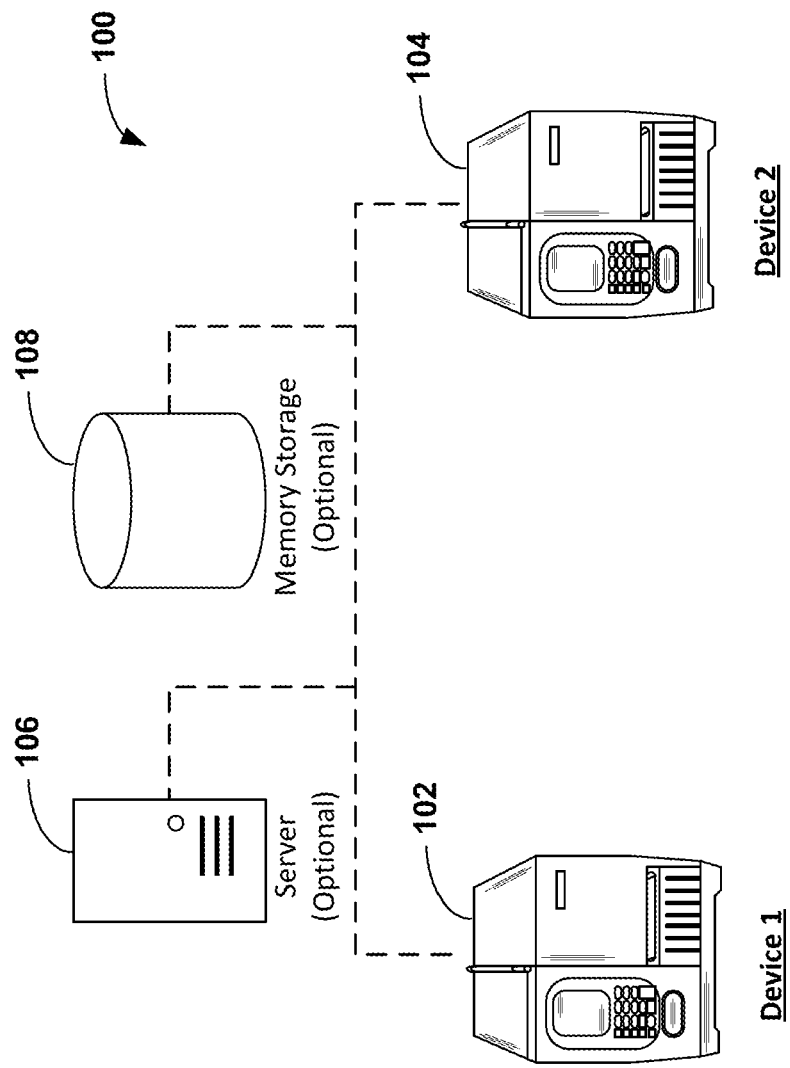
FIG. 1 schematically depicts one embodiment of a device network.
Figure 2:
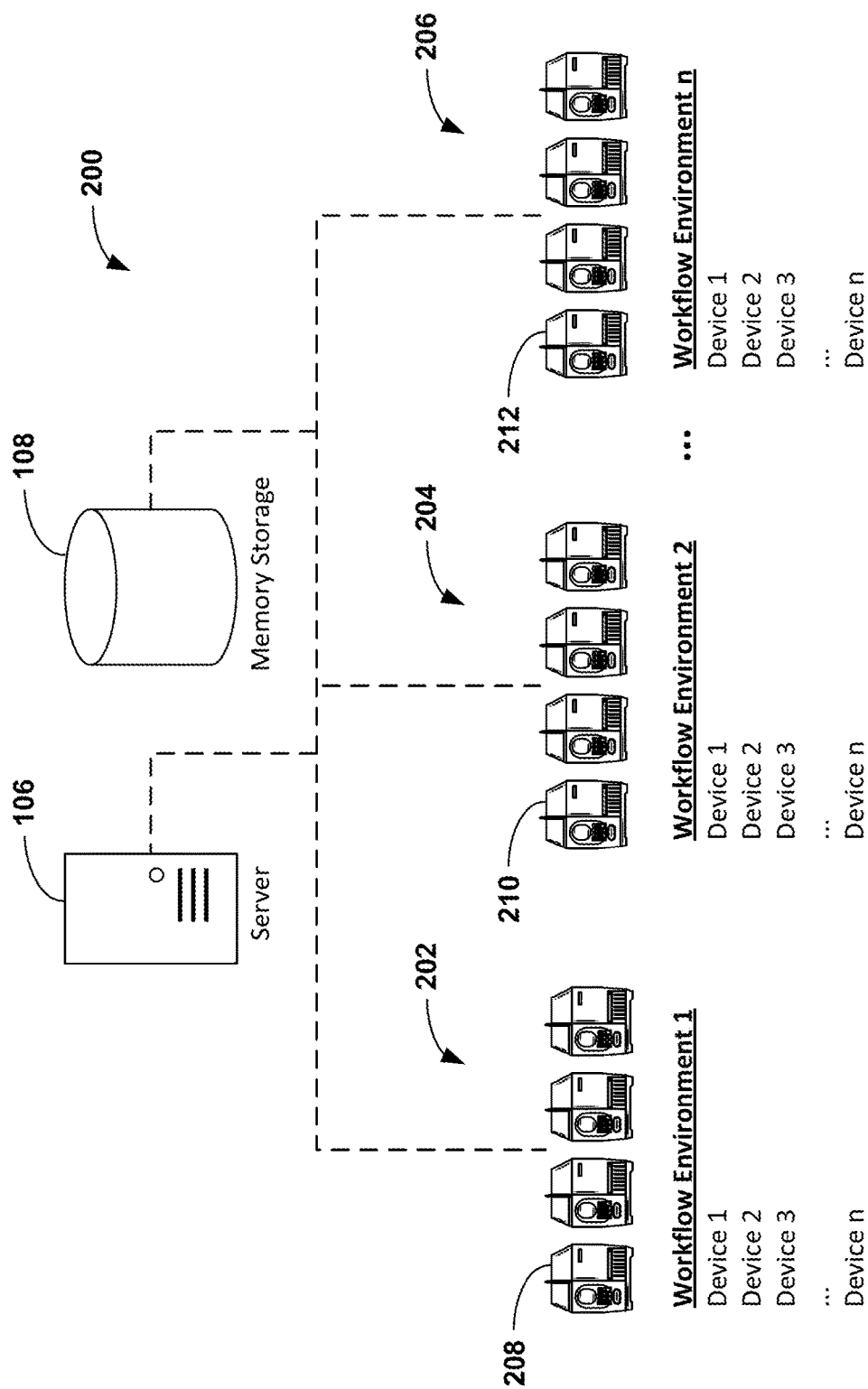
FIG. 2 schematically depicts one embodiment of a device network having a plurality of workflow environments.

As shown in FIG. 1, a device network may include a first device 102, and a second device 104. The first device 102 may be a workflow device, and the second device 104 may be a standby device or a workflow device. As shown in FIG. 2, a device network may include a plurality of workflow environments. For example, the exemplary device network shown in FIG. 2 includes a first workflow environment 202, a second workflow environment 204, and an N-th workflow environment 206. Each workflow environment may include one or more devices 208, 210, 212, which may include one or more workflow devices and one or more standby devices.

Figure 3:
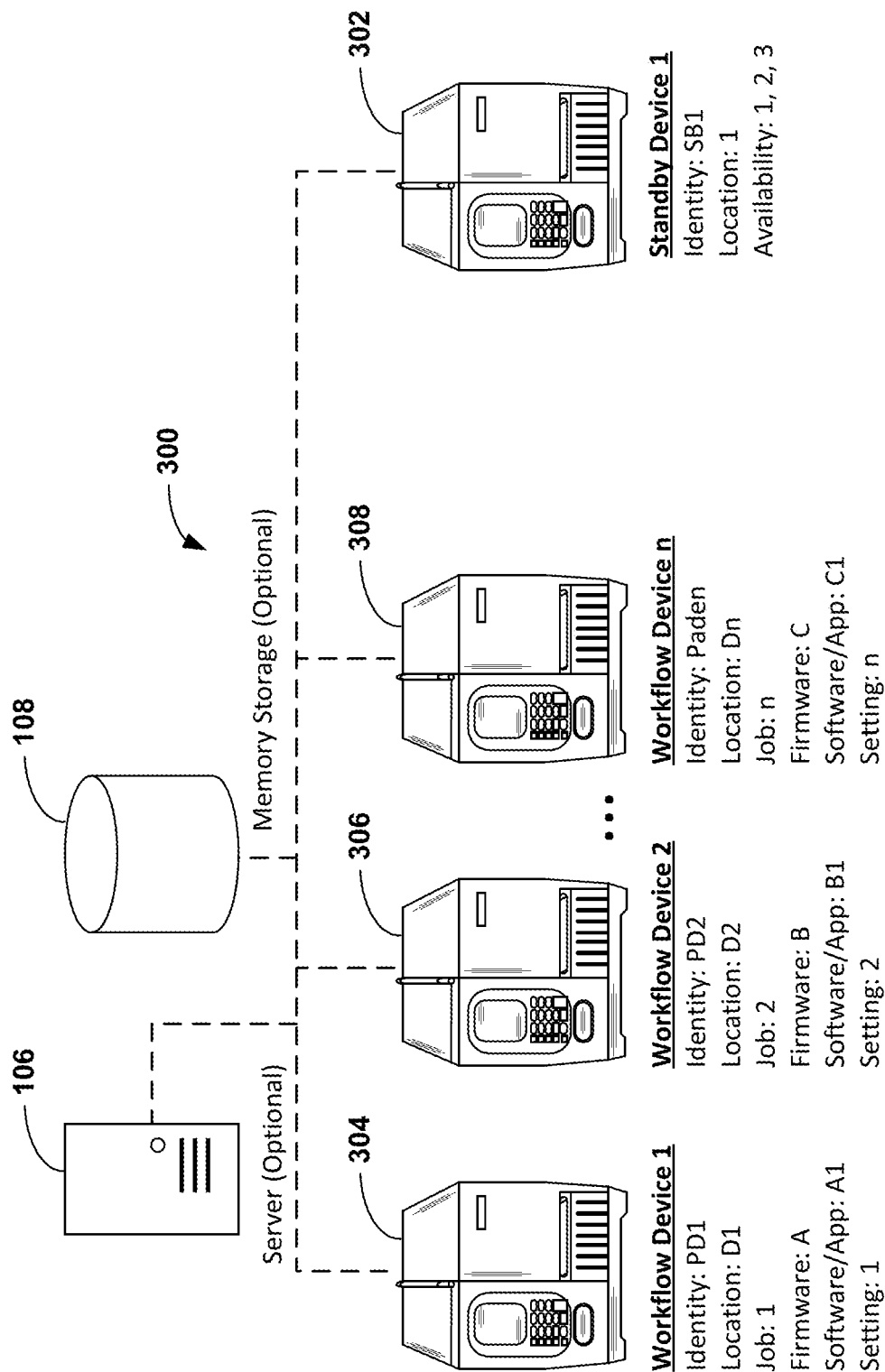
FIG. 3 schematically depicts one embodiment of a device network having a plurality of workflow devices and a standby device.

With reference to FIG. 3, an exemplary device network may include a plurality of workflow devices 300 and at least one standby device 302. More particularly but without limitation, the exemplary device network of FIG. 3 includes a first workflow device 304, a second workflow device 306, an Nth workflow device 308, and at least one standby device 302. For purposes of clarity, in some embodiments a device network may alternatively include a single workflow device 102 and a single standby device 104.

Optionally, a device network may also include a server 106 and memory storage 108. In some embodiments, the server may be used for managing the fleet of devices in accordance with the present disclosure. For example, a server 106 may be used for acquiring device information, for analyzing device information, and/or for sending device instructions. In some embodiments, the server 106 may be used for managing communications between devices on a device network, for example, when managing performance objectives as discussed below. Additionally, the server 106 may be used, for example, for general networking purposes such as assigning IP addresses. However, in some embodiments the server 106 may be omitted in accordance with the present disclosure, which offsets costs associated with network hardware, software, and/or technical/skilled support staff. In various embodiments, memory storage may be accessible via the device network (e.g., a database), and/or memory storage may be housed within one or more of the devices (e.g., a workflow device, a standby device) or directly connected to one or more of the devices (e.g., external flash memory).

Figure 4:
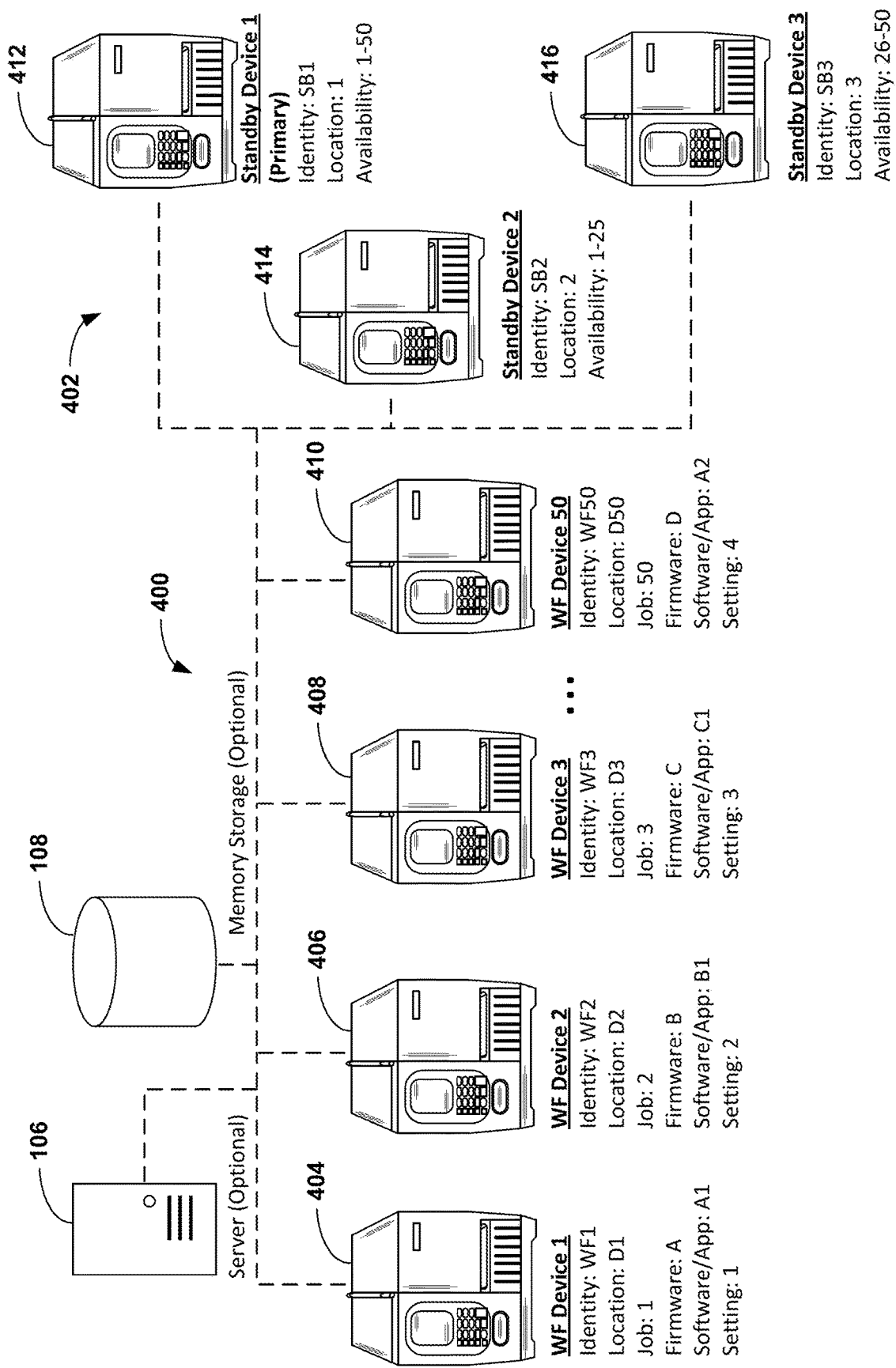
FIG. 4 schematically depicts one embodiment of a device network having a plurality of workflow devices and a plurality of standby devices.
Figure 5:
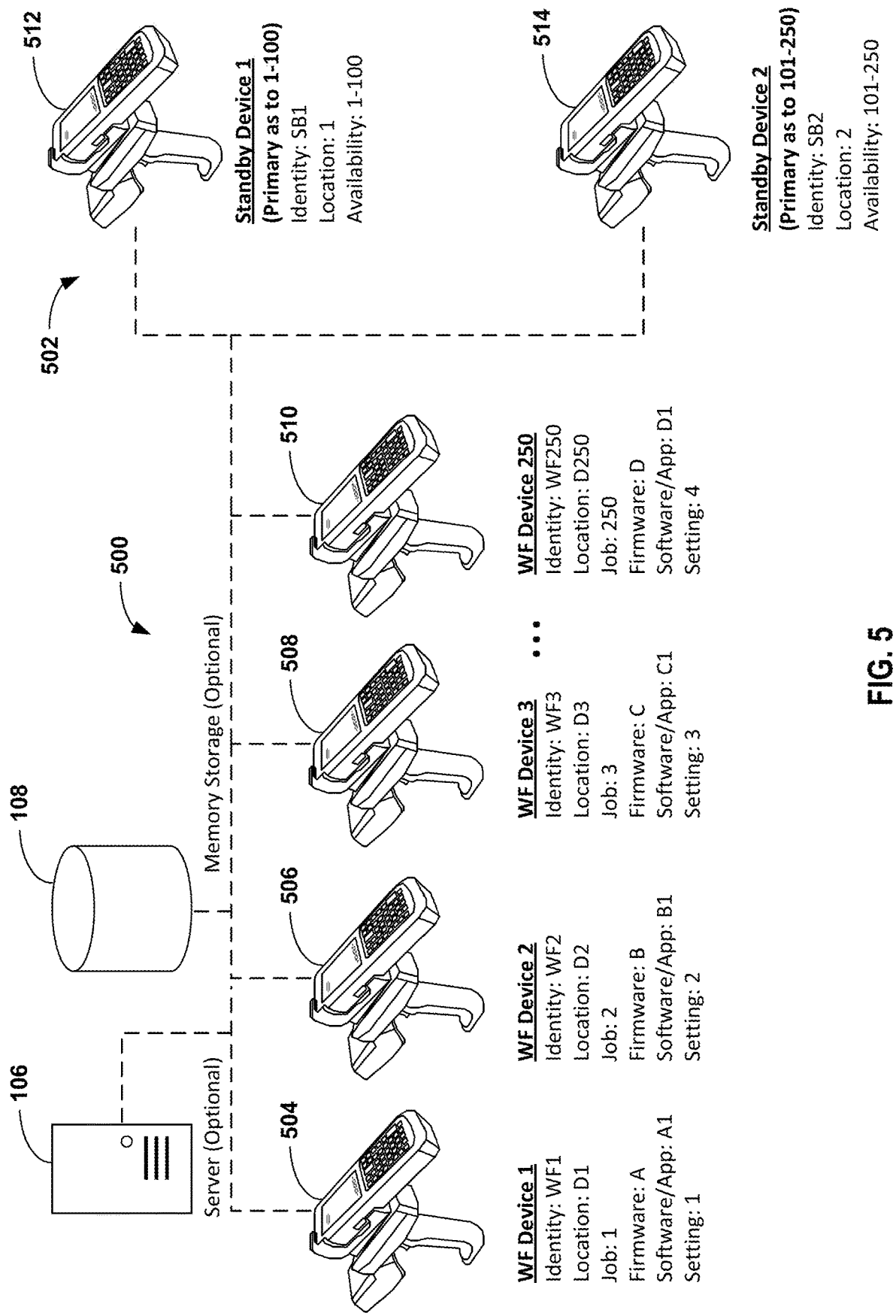
FIG. 5 schematically depicts another embodiment of a device network having a plurality of workflow devices and a plurality of standby devices.

One or more standby devices are available in the event that a workflow device becomes inoperable or otherwise taken out of service. In some embodiments, a device network may include a very large number of workflow devices and a relatively small number of standby devices. For example, as shown in FIG. 4, an exemplary device network includes fifty (50) workflow devices 400 (workflow devices 4-49 omitted for clarity), and a relatively smaller plurality standby devices 402. As an additional example, FIG. 5 shows another exemplary device network which includes two hundred fifty (250) workflow devices 500 (workflow devices 4-249 omitted for clarity), and one or more standby devices 502. More particularly, and without limitation, the workflow devices 400/500 respectively shown in FIGS. 4 and 5 include a first workflow device 404/504, a second workflow device 406/506, a third workflow device 408/508, and a fourth workflow device 410/510.

The plurality of standby devices 402 shown in FIG. 4 includes a first standby device 412, a second standby device 414, and a third standby device 416. The first standby device 412, which is shown as being available for workflow devices 1-50, is designated as the primary standby device. In some embodiments, the primary standby device will be the first device selected from among the plurality of standby devices for introduction into the workflow environment. In some embodiments, the primary standby device may be responsible for assigning, and may assign, other standby device from among the plurality of standby devices for introduction into the workflow environment. Similarly, the one or more standby devices 502 shown in FIG. 5 include a first standby device 512, and a second standby device 514. The first standby device 512, which is shown as being available for workflow devices 1-100, is designated as the primary standby device for those workflow devices. Likewise, the second standby device 514, which is shown as being available for workflow devices 101-250, is designated as the primary standby device for those workflow devices. For the reader's convenience, only a subset of the total number and variety of devices which may reside on a device network have been visually depicted in the figures. The skilled artisan will appreciate that the present disclosure may be implemented with a wide variety of different types and number of devices (workflow devices and/or standby devices), and the type and total number of devices may be increased or decreased to accommodate the particular implementation.

As shown in FIGS. 3 and 4, the workflow devices are printers, such as label printers. As an example, such printers may be deployed in a workflow environment such as a packaging and labeling facility or a distribution center, with each such printer having responsibility for an assigned type of printing job. This may include, for example, printing an assigned type of material, printing for a particular production line, or on-demand printing. As shown in FIG. 5, the workflow devices are handheld scanners, such as barcode scanners or RFID scanners. As an example, such scanners may be deployed to a group of users who use the scanners to perform various scanning jobs, such as shipping and receiving in a parcel facility or distribution center.

Figure 6:
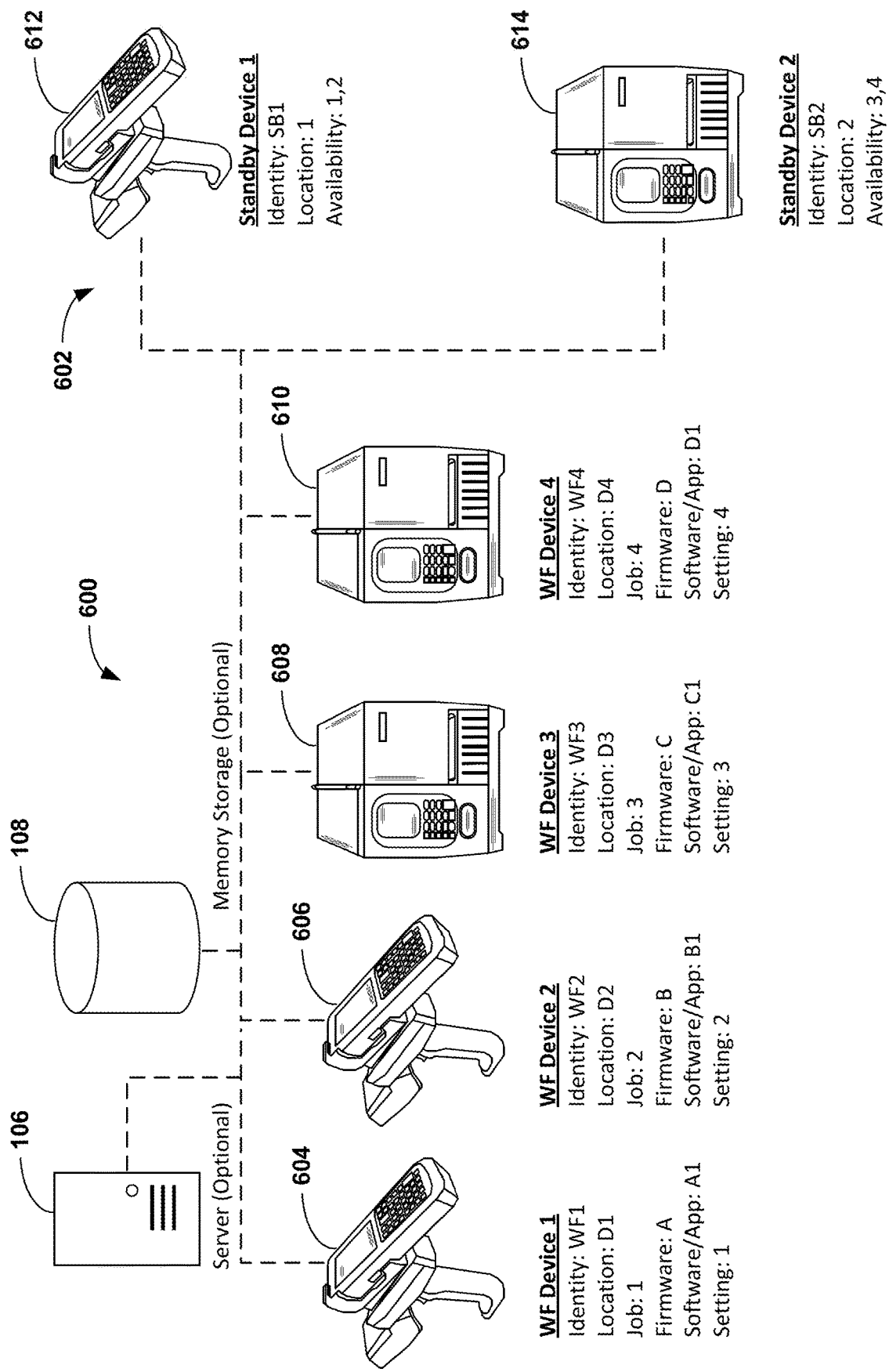
FIG. 6 schematically depicts yet another embodiment of a device network having a plurality of workflow devices and a plurality of standby devices.

As shown in FIG. 6, a device network may include a combination of different types of devices. In this exemplary device network, a plurality of workflow devices 600 are provided, which includes a first scanner 604 and a second scanner 606, and a first printer 608 and a second printer 610. For each of the plurality of workflow devices, there is provided on the device network at least one standby device that is configurable to perform the job assigned to such workflow device, and preferably, an optimally small number of standby devices. For example, as shown in FIG. 6, a plurality of standby devices 602 includes a first standby device (e.g., a handheld scanner) 612 and a second standby device (e.g., a printer) 614. The first standby device 612 is configurable to perform the job assigned to the first workflow device 604 and the second workflow device 606, and the second standby device 614 is configurable to perform the job assigned to the third workflow device 608 and the fourth workflow device 610.

The exemplary device networks shown in FIGS. 1-6 are not intended to be limiting. Rather, the present disclosure may be implemented with an unlimited variety of workflow devices in an unlimited variety of workflow environments, and further examples are provided below. As will be appreciated by those skilled in the art, often times, a fleet of devices may include different workflow devices (e.g., different features or functionalities) and/or multiple workflow devices with different configurations (e.g., different firmware, different software, different applications, and/or different settings). In various embodiments of the present disclosure, a device network may include identical devices, common devices (e.g., not identical, but sharing some common feature, functionality, or configuration), different devices (e.g., devices that typically would not be assigned to the same job because of some different feature, functionality, or configuration), or a combination of identical devices, common devices, and different devices.

Such differences may arise for any number of reasons. For example, in some workflow environments there may be several different jobs, and a different workflow device or a different configuration may be required or preferred over others when performing a given job. Similarly, different users may require or prefer a different workflow device or a different configuration. Additionally, with respect to replacements and upgrades, it is common for only a subset of a fleet of devices to be replaced or upgraded, resulting in a fleet of devices with various differences. Likewise, when new devices are added to an existing fleet, it is common for the new devices to have differences over the preexisting devices. Accordingly, it can be expected that the number of differences among various devices in a fleet increase as the size of the fleet increases. Yet, it is an object of the present disclosure to provide an optimally small number of standby devices to accommodate workflow device failures and downtime for even a very large fleet of devices, and even when the fleet of devices includes several various different devices and/or different configurations.

In accordance with the present disclosure, various devices on a device network communicate with one another, for example, so that a standby device can be introduced into a workflow environment when needed. Any communication protocol may be used, such as TCP/IP. A server 106, such as a DHCP server, may provide IP addresses to the various devices on the device network. A device network may be configured as a LAN, a WAN, or any other network configuration. In some embodiments, a device network may utilize wireless network or a Bluetooth technology. In some embodiments, network management software may be utilized.

Each device may communicate with any other device, as desired by the skilled artisan. In some embodiments, a standby device communicates to at least one workflow device, and additionally or alternatively, a workflow device communicates to at least one standby device.

In some embodiments, a device network may include different devices, and devices on the network may communicate either only with other devices with some commonality (e.g., common feature, common functionalities, common models, common configuration), or devices on the network may communicate both to common devices and different devices. Accordingly, such communications may be broadcast, multicast, unicast, or any other desired routing scheme.

For example, in the device network shown in FIG. 3, the at least one standby device 302 may communicate with each of the plurality of workflow devices 300. Additionally, or in the alternative, each of the plurality of workflow devices 300 may communicate with the at least one standby device 302, and/or to one another. More particularly, and without limitation, the first workflow device 304 may communicate with a standby device 302, and/or to the second workflow device 306 and the Nth workflow device 308.

As another example, workflow devices and standby devices may be configured to communicate only to other compatible devices. For example, with reference to FIG. 4, the first standby device 412 shows as being available for workflow devices 1-50 (and is shown as being the primary standby device), the second standby device 414 shows as being available for workflow devices 1-25, and the third standby device 416 shows as being available for workflow devices 26-50. Such availability may be based on configurability of the devices, prioritization of the standby devices allocation to workflow devices, or other criteria that may be selected by the skilled artisan. Accordingly, in some embodiments the first workflow device 404 may be configured to communicate with the first standby device 412 (i.e., the primary standby device), but not the second standby device 414 or the third standby device 416; whereas the first standby device 412 may be configured to communicate with all of the workflow devices 400, as being the primary standby device to all of them. Similarly, the second workflow device 406 may be configured to communicate with the second standby device 414 and to the third standby device 416, while the second standby device 414 may be configured to communicate with the second workflow device 406 and to the third workflow device 408. Likewise, the fourth workflow device 410 and the third standby device 416 may be configured to communicate with one another.

In some embodiments, a device sends communications comprising status information to one or more other devices on the device network, for example, to allow the one or more other devices to ascertain the status of the device sending the communications. Status information may include an identity, a location, and a status for the device. As examples, a communication sent by a workflow device may include, for example, information that would allow other devices on the device network to ascertain that the workflow device is residing on the device network, the identity and location of the workflow device, a job and/or user assigned to the workflow device, whether or not the workflow device is functioning properly, and/or the compatibility requirements of the device. Communications sent by a standby device may include, for example, information that would allow other devices on the device network to ascertain that the standby device is residing on the network, the identity and location of the standby device, the status of the device, whether the device is available for replicating, and/or the compatibility of the standby device to be configured for various jobs and/or users in the workflow environment.

As illustrated by these examples, some device networks may include a very large number of workflow devices, such ten or more, fifty or more, one hundred or more, or even one thousand or more workflow devices. Even when a device network has a very large number of workflow devices, methods of managing a fleet of devices in accordance with the present disclosure allow for an optimally small number of standby devices. As such, the present disclosure advantageously reduces the cost of providing and maintaining standby devices for a workflow environment, for example, because fewer standby devices are necessary to accommodate the standby requirements of the workflow environment. The methods provided by the present disclosure can be especially advantageous for high-volume workflow environments.

The skilled artisan can select the optimal number of standby devices, for example, based on the number of workflow devices deployed in a workflow environment and the likelihood that any one or more of those devices may experience downtime. When selecting the optimal number of standby devices, the skilled artisan may also consider maintenance requirements and service intervals for various devices, as well as the extent to which a given standby device would be configurable to perform the various jobs to which the workflow devices are assigned, or to accommodate requirements of the various users. In some workflow environments, it may be desirable for every single workflow device to have a corresponding standby device. Such a 1:1 ratio may be appropriate in workflow environments where downtime is extremely expensive or has severe consequences. However, in most workflow environments, the skilled artisan will prefer to provide only a few standby devices to accommodate a very large number of workflow devices and/or users. Exemplary ratios for the number of workflow devices per compatible standby device include, without limitation from 1:1 to 1000:1 or greater, for example, 10:1, 20:1, 50:1, 100:1, 1000:1 or greater.

Managing Performance Objectives

Various embodiments of the present disclosure embrace systems and methods for managing performance objectives for a device or a fleet of devices, including systems and methods for managing output quality, productivity or uptime, and/or cost-efficiency. In general, the systems and methods disclosed herein embrace obtaining information directly or indirectly from one or more devices among a fleet, and utilizing such information manage a fleet of devices or individual devices from among the fleet. The fleet of devices may include multiple different workflow environments, or a subset of devices within a workflow environment. Information obtained from a device or fleet of devices may be used to manage that same device or fleet, and/or such information may be used to manage a different device or a different fleet of devices other than that from which the information was obtained. Similarly, the information obtained from devices deployed in one workflow environment may be used to manage devices in that same workflow environment, and/or such information may be used to manage one or more different workflow environments. Moreover, information obtained from one enterprise may be utilized to manage devices or workflow environments within that enterprise, and/or such information may be used to manage one or more different enterprises.

Exemplary Devices

In some embodiments, the systems and methods disclosed herein utilize devices having a production system and/or a verification system. Such a production system may be configured to produce outputs, and such a verification system may be configured to verify outputs. In various embodiments, frequent verifications may be obtained, up to and including verifying every output. Alternatively, frequent verifications may be obtained for only a subset of outputs, including verifying every N-th output produced by a device as may be appropriate for the particular setting, such as every 2nd output, every 3rd output, every 4th output, every 10th output, every 100th output, every 1,000th output, or even further between verifications when appropriate. When verifying only a subset of outputs, the skilled artisan may select a frequency of verification by balancing the probability of a meaningful deviation from an output parameter (e.g., a statistically significant deviation, a deviation constituting a failed output, etc.) as between N-number of outputs against the cost of verifying outputs more frequently and the consequences in the event that such deviation between N-number of outputs goes undetected. In some embodiments, providing a production system integrated with or communicatively coupled with a verification system may make verifying every output a feasible option, particularly in settings where independent verification of every output would be impractical. Accordingly, exemplary devices utilize a verification system (e.g., a verification system integrated with or communicatively coupled with a production system) to acquire device information including information pertaining to outputs and/or information pertaining to verifications, which device information may then be utilized in the systems and methods for managing fleets of devices disclosed herein, including, without limitation, systems and methods for managing performance objectives, systems and methods for managing maintenance and service requirements, systems and methods for managing the selection of devices device configurations, and/or systems and methods for deploying or introducing devices into workflow environments.

Figure 7A:
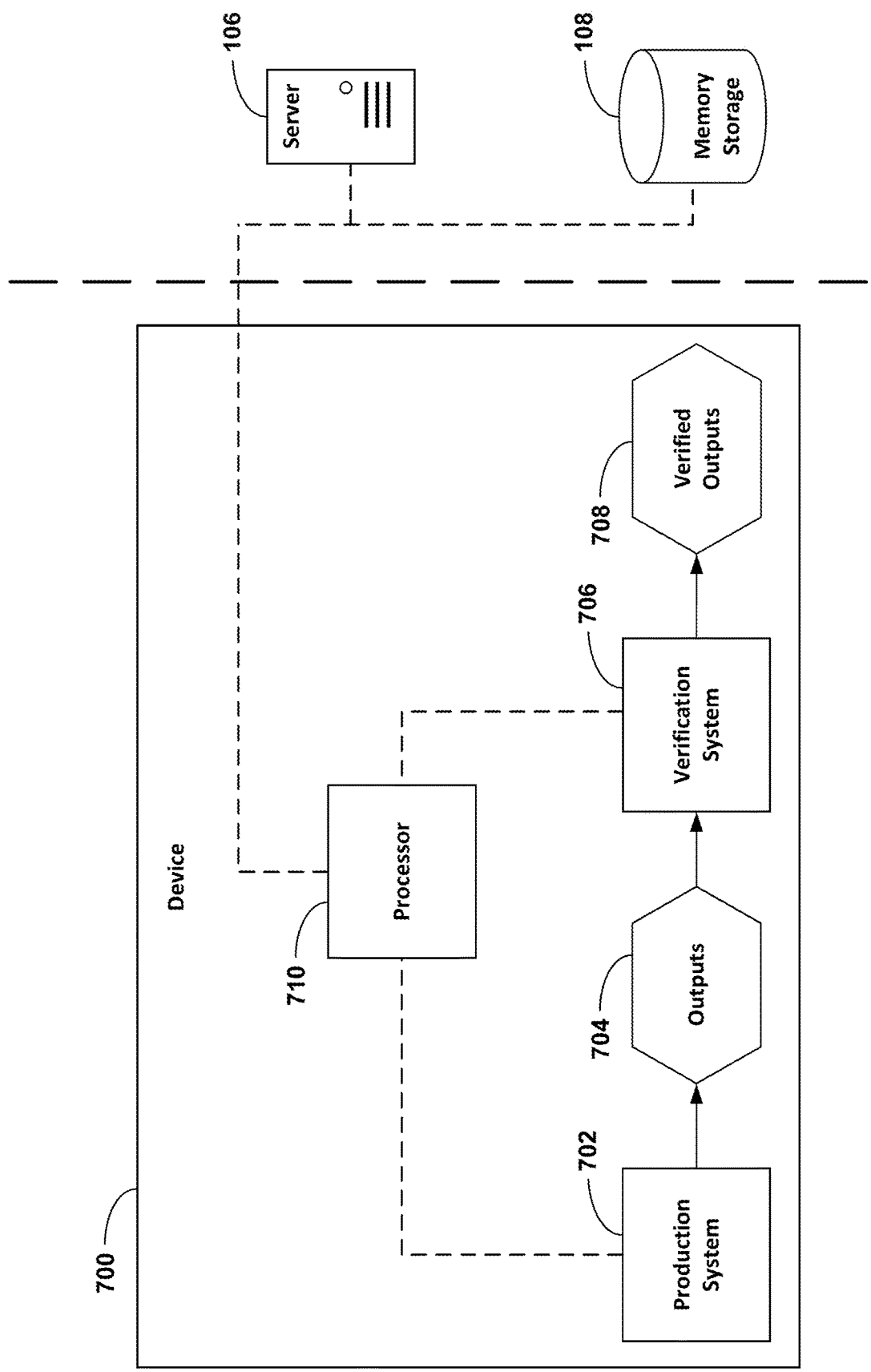
FIGS. 7A through 7F schematically depict various embodiments of one or more devices having a production system and/or a verification.
Figure 7B:
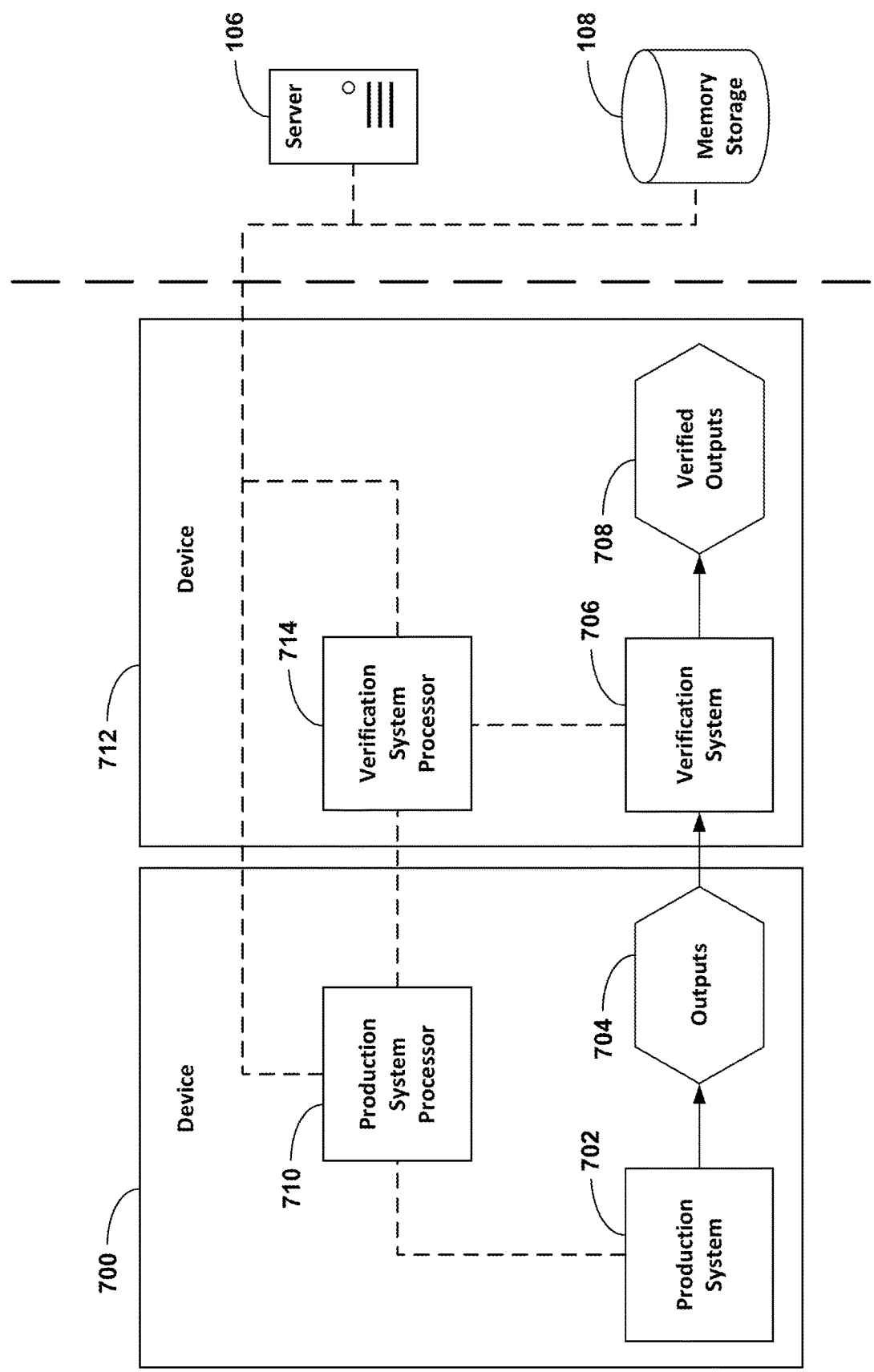

In one embodiment, an exemplary device may be a single device having both a production system and a verification system. In another embodiment, an exemplary device comprising a production system may be communicatively coupled to another exemplary device comprising a verification system. For example, FIG. 7A shows a schematic depicting one embodiment of an exemplary device 700 having a production system integrated with a verification system. As shown, a production system 702 produces outputs 704, and a verification system 706 verifies the outputs 704 produced by the production system 702, providing verified outputs 708. A processor 710 communicatively couples the production system 702 and the verification system 706. The exemplary device 700 may be in communication with a server 106 (for example to manage communications between the exemplary device 700 and other devices on a device network), and memory storage 108 may be provided (for example to store device information). Another exemplary embodiment having a production system integrated with a verification system is shown in FIG. 7B. As shown, a first device 700 includes a production system 702, and a second device 712 includes a verification system 706, and the production system 702 and the verification system 706 are communicatively coupled. Similarly, in the exemplary embodiment shown in FIG. 7B, the production system 702 produces outputs 704, and the verification system 706 verifies the outputs 704 produced by the production system 702, providing verified outputs 708. The first device 700 and the second device 712 are communicatively coupled, for example, by a first processor 710 and a second processor 714. Both the first device 700 and the second device 712 may be in communication with the server 106 (for example to manage communications between the exemplary device 700 and other devices on a device network), and memory storage 108 may be provided (for example store device information).

Various embodiments may utilize any device that might be contemplated by the skilled artisan. For example, but without limitation, devices which may be of particular interest include devices having printing or marking assemblies, scanner/verifier assemblies, and combinations thereof. As examples, FIGS. 7C through 7F show exemplary embodiments of devices having a printing assembly and/or a scanner/verifier assembly which may be utilized in accordance with the present disclosure. It is to be understood, however, that other exemplary devices are disclosed herein which also may be utilized in various embodiments, and the skilled artisan will appreciate that even further, additional devices are within the spirit and scope of the present disclosure.

Figure 7C:
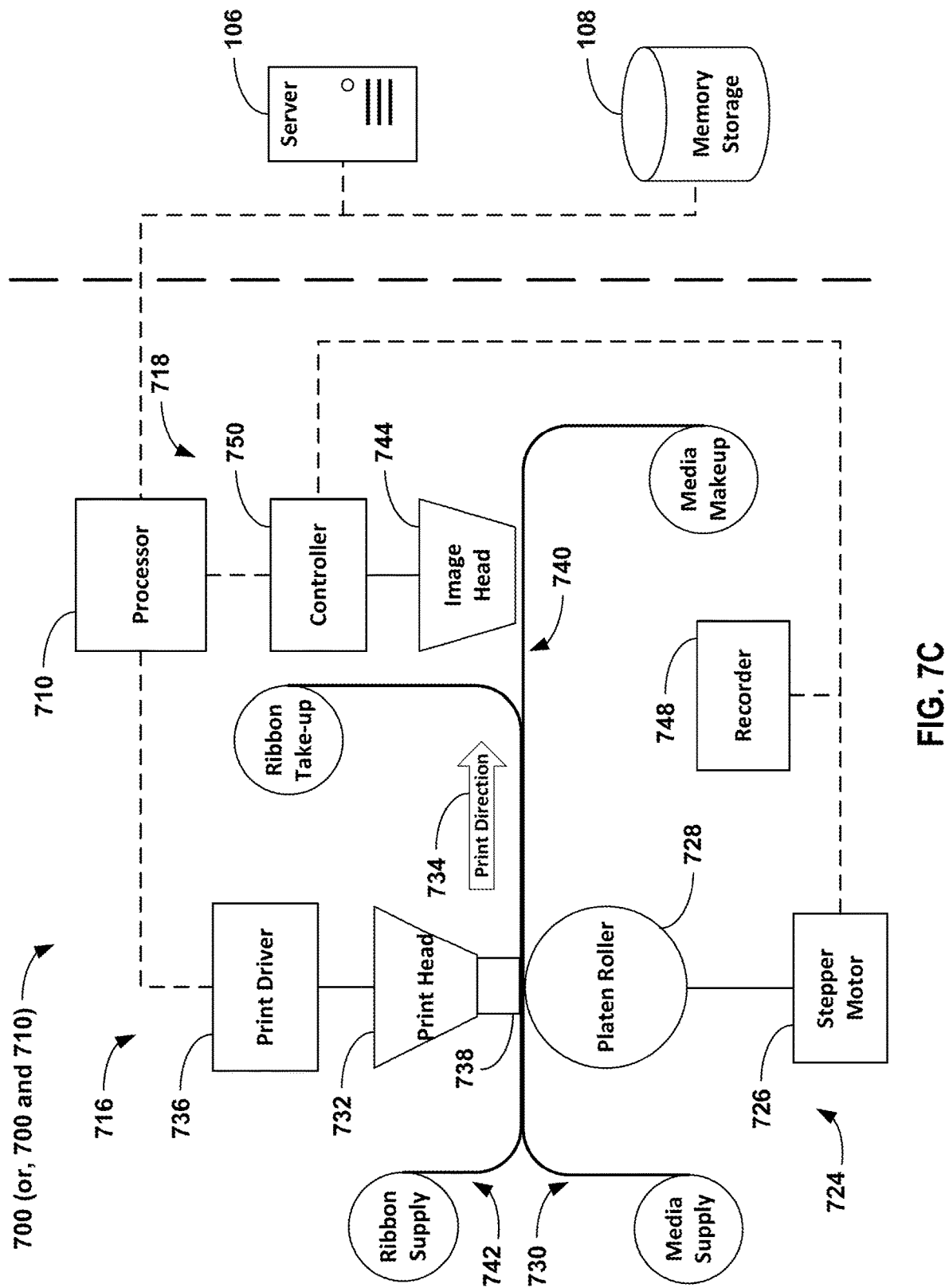
Figure 7E:
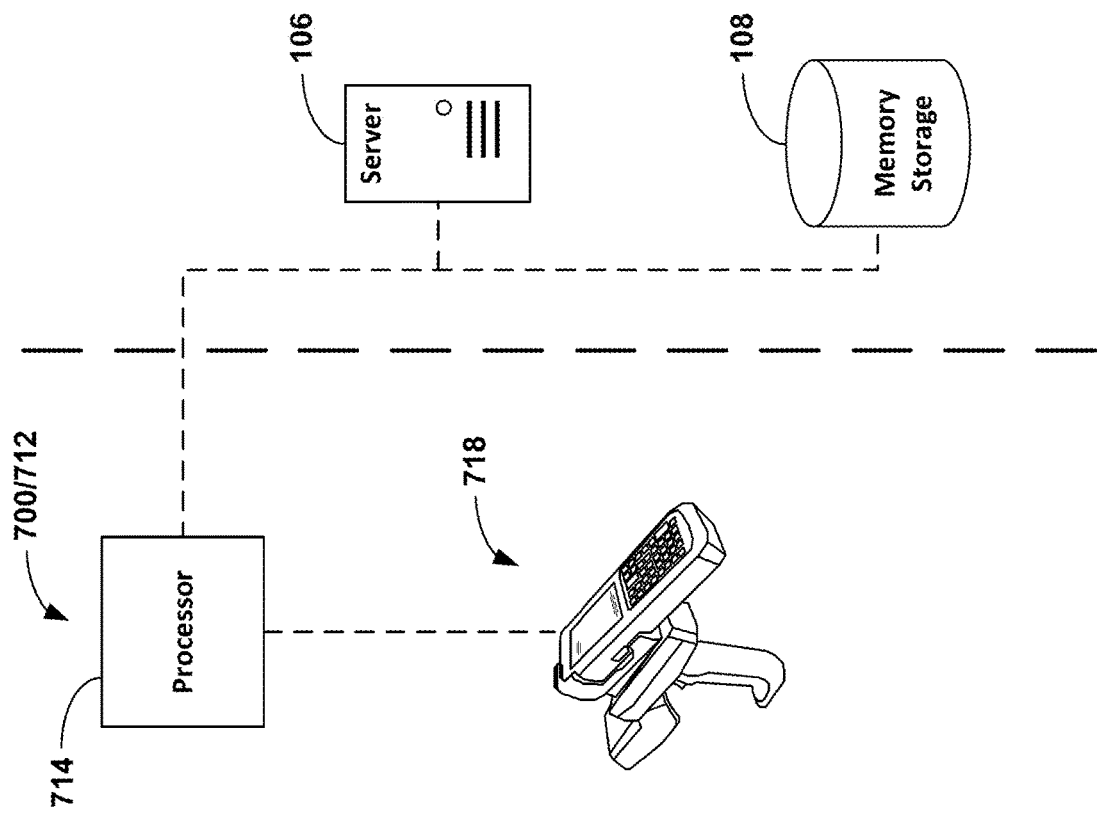
Figure 7D:
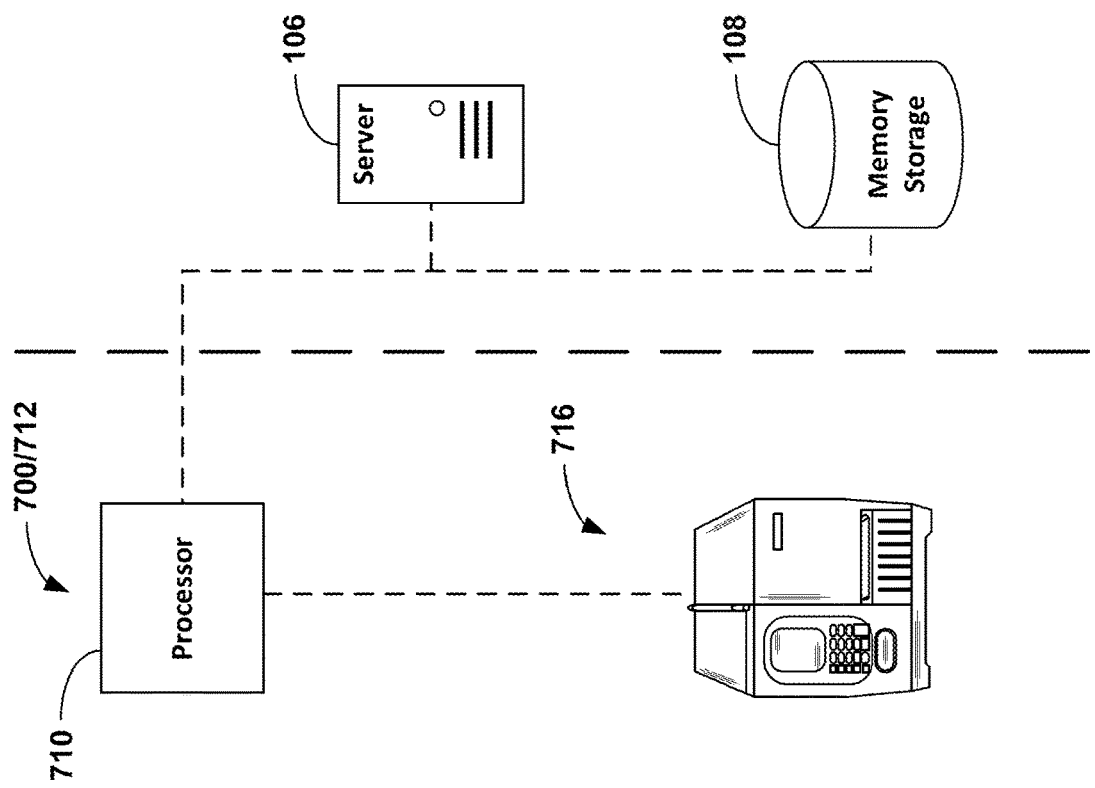

In one embodiment, an exemplary device 700 may include a production system 702 (e.g., a printing assembly) and a verification system 706 (e.g., a scanner/verifier assembly) integrated into a single device, such as a printer having an inline scanner/verifier or an "all-in-one" printer/scanner device (e.g. FIG. 7A, 7C). In another embodiment, a production system 702 (e.g., a printing assembly) and a verification system 706 (e.g., a scanner/verifier assembly) may be provided as separate devices. For example, a first device 700 may include a printing assembly, and a second device 712 may include a scanner/verifier assembly (e.g., FIGS. 7B, 7C, 7D through 7F). The separate devices may be communicatively coupled, providing a production system 702 (e.g., a printing assembly) integrated with and a verification system 706 (e.g., a scanner/verifier assembly). In various embodiments, a production system 702 may include a printing assembly. The production system 702 provides outputs 704. The outputs may include printed media and/or indicia having been printed on such printed media. A verification system 706 may include a scanner/verifier assembly, and the verified outputs may include printed media and/or indicia having been verified by the scanner/verifier assembly; and/or scanned images, glyphs, indicia, or other material having been printed on such verified printed media. In some embodiments, the production system may include a scanner/verifier assembly, and the outputs and/or verified outputs may include printed media and/or indicia having been verified by the scanner/verifier assembly; and/or scanned images, glyphs, indicia, or other items having been printed on such verified printed media. In various other exemplary devices, an output may include any product or result produced by or obtained from a device or production system, and a verification system may include any system or device configured to measure or verify a characteristic or feature of such output, producing verified outputs. Verified outputs may include any product or result produced by or obtained from a device or production system that has been verified by a verification system.

Figure 7F:
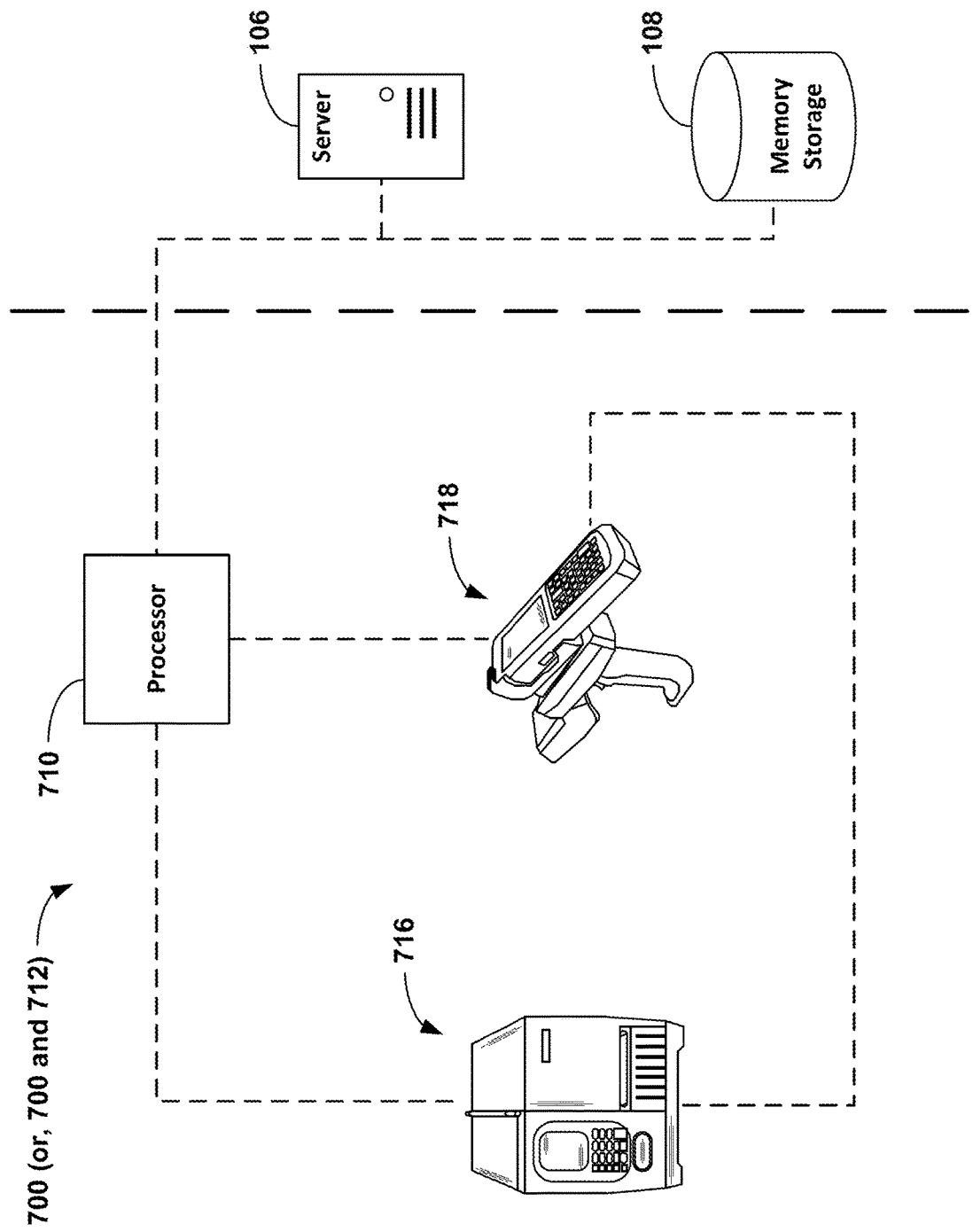

As shown in FIG. 7C, an exemplary system or device 700 is provided, which in some embodiments includes a production system integrated with a verification system. In an exemplary embodiment, the system or device 700 includes integrated within a single device, both a production system 716, which in an exemplary embodiment includes a printing assembly, and a verification system 718, which in an exemplary embodiment includes an in-line scanner/verifier assembly. Alternatively, in some embodiments, the production system 716 and the verification system 718 shown in FIG. 7C may be provided as separate devices. For example, FIG. 7C also encompasses embodiments in which a printing assembly and a scanner/verifier assembly are provided as stand-alone or separate devices, such as respectively shown in FIG. 7D (printing assembly/production system 716) and FIG. 7E (scanner/verifier assembly/verification system 718). Further, in another embodiment as shown in FIG. 7F, a production system 716 and a verification system 718 may be provided as stand-alone or separate devices, yet communicatively coupled with one another, for example providing a printing assembly/production system 716 integrated with a scanner/verifier assembly/verification system 718.

As shown in FIG. 7C, an exemplary system or device 700 may comprise a thermal transfer printer. Alternatively, any other printing or marking devices may be utilized in accordance with the present disclosure, and further examples are provided herein. Printing assemblies such as the exemplary thermal transfer printer shown in FIG. 7C are well known in the art, and thus will be discussed only in brief detail. As shown in FIG. 7C, a drive assembly 724 includes a stepper motor 726 and a platen roller 728. The stepper motor 726 advances the platen roller 728 in discrete increments, which, in turn, advances printable medium 730 between the platen roller 728 and one or more print heads 732 in a printing direction shown by an arrow 734. The position of the printable medium 730 may be tracked with a processor 710 associated with a counter which maintains a count of the steps taken by the stepper motor 726. Alternatively, a tachometer or other conventional device (not shown) may be used to track the position of the printable medium either directly, or indirectly.

The one or more print heads 732 are activated by a print driver 736. The print driver 736 is driven by print commands which are generated by print logic. The print commands comprise retrieved print data in combination with a system clock signal or strobe signal under control of the printer processor 700 to ensure proper timing and spacing of successive sequential parts of the images, glyphs, indicia, or other items to be printed or marked by the one or more print heads 732. The one or more print heads 732 have an array of print elements 738, and are operable for printing or marking a plurality of sequential parts of such images, glyphs, indicia, or other items onto a corresponding plurality of sequential segments of the printable medium 730, producing printed media 740.

The print driver 736 uses the print commands generated by the print logic to provide energizing signals to the array of print elements 730 of the print head 732. The energizing signals activate the print elements 730, which when activated are effective to place a mark on the respective sequential segment of the printable medium 730. In the thermal transfer printer of the embodiment shown in FIG. 7C, when an individual print element 738 is energized, heat is generated, and such heat is transferred to an adjacent region of thermally sensitive print ribbon 742. The print ribbon 742 contains ink, which when melted by heat transferred from one or more printer elements 738 releases from the print ribbon 742 and transfers to the printable medium 730, thereby applying a mark on the respective sequential segment of the printable medium 730. Alternatively, a thermally sensitive printing medium may be used, as is conventional for thermal printers. In that case, the printable medium 730 may comprise a web of thermally sensitive material such as heat-sensitive paper or plastic. While the print head 732 shown in FIG. 7C is a thermal print head, other print heads may be used, such as in laser printers, ink drop printers, dot-peen printers, and further examples as disclosed herein. The operation of print heads is conventional and well-known and, for the sake of brevity and clarity, will not be described in further detail.

Further referring to FIG. 7C, printed media 740 advances past a scanner/verifier assembly 718, which comprises an image head or scanner 744. The image head 744 is configured to capture information about the images, glyphs, indicia, or other items or sequential parts thereof produced by the printing or marking assembly 716. The image head 744 optically images, digitizes, or samples at least a portion of such images, glyphs, indicia, or other items printed by the print head 732. In an exemplary embodiment, the scanner/verifier assembly 718 takes advantage of the motion of the printed media 740 past the image head 744 to successively capture each portion of printed images, glyphs, indicia, or other items as the printed images, glyphs, indicia, or other items advances past the image head. The image head 744 contains an array of photosensitive elements, such as in a charged coupled device ("CCD") having, for example, linear active surface pixel elements. In the case of a CCD, several imaging samples may be taken as the printed media 740 advances past the image head 744. Several imaging samples of printed media and/or indicia may be aggregate to provide a digitized representation or image of an entire printed media and/or indicia. The digitized image and/or imaging samples may be stored in memory storage 108 for further processing or analysis in accordance with the present disclosure. Other known image heads may also be used, including vidicons, two-dimensional semiconductor arrays, and two-dimensional CCD arrays. Operation of such a CCD image head is described in further detail in U.S. Pat. No. 6,042,279, the entirety of which is hereby incorporated by reference into the present disclosure.

In some embodiments, the printing assembly 716 may include a recorder 748, operable for recording the rate sensed at which the drive assembly 724 imparts motive force to the printable medium 730. In some embodiments, the scanner/verifier assembly 718 may include a controller 750, operable for setting a rate at which the image head 744 evaluates (optically images, digitizes, or samples) the printed media and/or indicia or sequential parts thereof. In an exemplary embodiment, a data link may be provided, operable for communicatively coupling the printing assembly 716 and the scanner/verifier assembly 718. For example, the printing assembly 716 may provide the scanner/verifier assembly with data from the recorder 748 (e.g., data relating to the rate sensed at which the drive assembly imparts motive force to the printable medium), and the scanner/verifier assembly 718 may carry out operations responsive to receiving data from the printing assembly (e.g., setting a rate at which the image head evaluates the printed media and/or indicia or sequential parts thereof).

While the exemplary embodiments in FIGS. 7C through 7F discuss printing assemblies and scanner/verifier assemblies, the skilled artisan will appreciate that the spirit and scope of the present disclosure embraces numerous other embodiments of production systems and/or verification systems. For example, in some embodiments a production system 702 may include an instrument, and a verification system 706 may include a calibration device for calibrating the instrument; the outputs 704 may be instrument readings, and the verified outputs 708 may be verified instrument readings. Exemplary instruments include electronic scales and flow meters. As an additional example, in some embodiments a production system 702 may include a dimensioner (e.g., a weighing and volume measuring system for measuring three-dimensional objects such as packages, parcels, pallets, cartons, and boxes), and a verification system 706 may include a scale or a calibration device for calibrating the dimensioner; the outputs 704 may be measurements obtained from the dimensioner, and the verified outputs 708 may be verified measurements. Such other production systems and/or verification systems may include any device or combination of devices that may be within the contemplation of the skilled artisan, many of which other devices are disclosed herein, and all of which are within the spirit and scope of the present disclosure.

Exemplary Device Networks

Figure 8A:
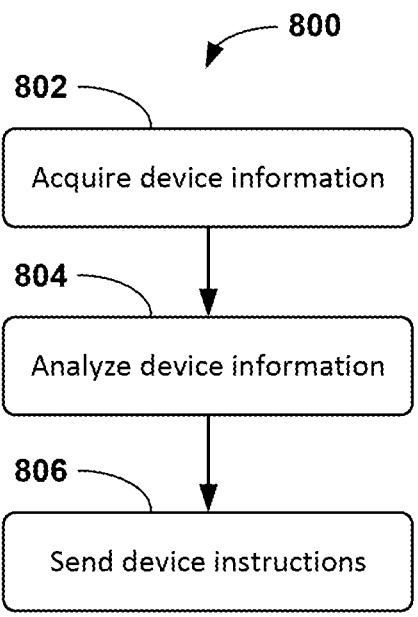
FIG. 8A is a flow chart showing one embodiment of steps or features configured for managing a fleet of devices.
Figure 8E:
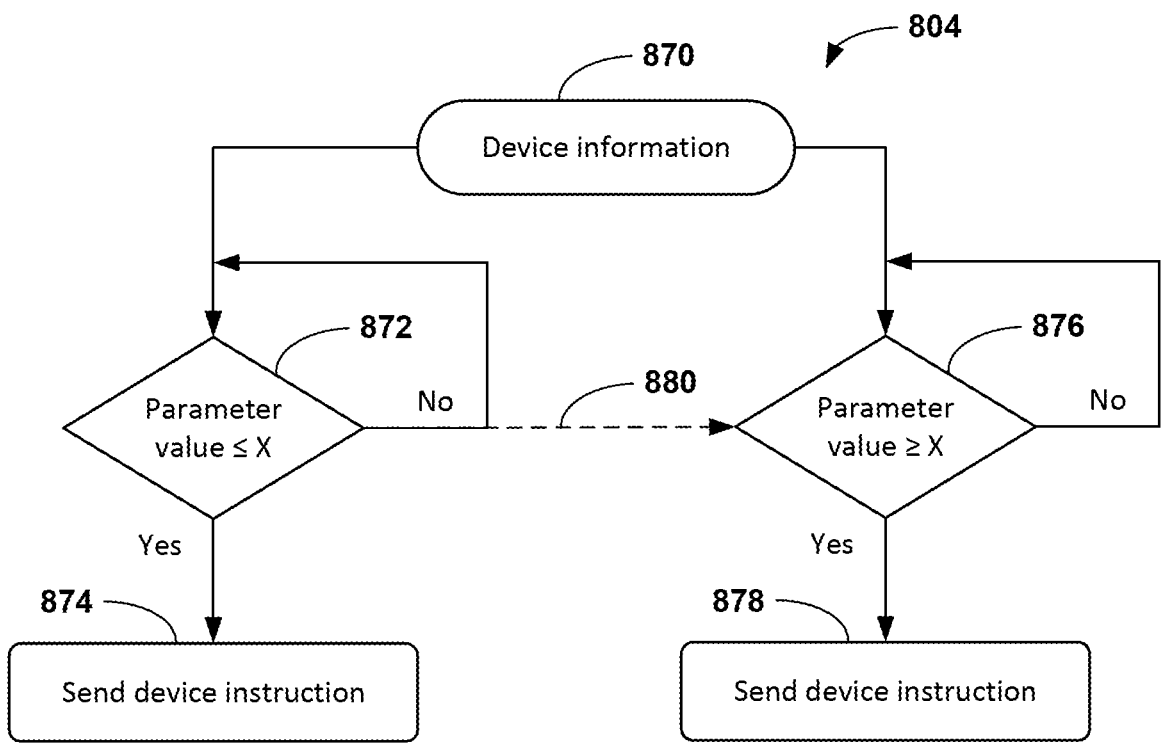
FIG. 8E is a flow chart showing one embodiment of steps or features configured for comparing one or more aspects of device information to one or more parameter values.
Figure 8B:
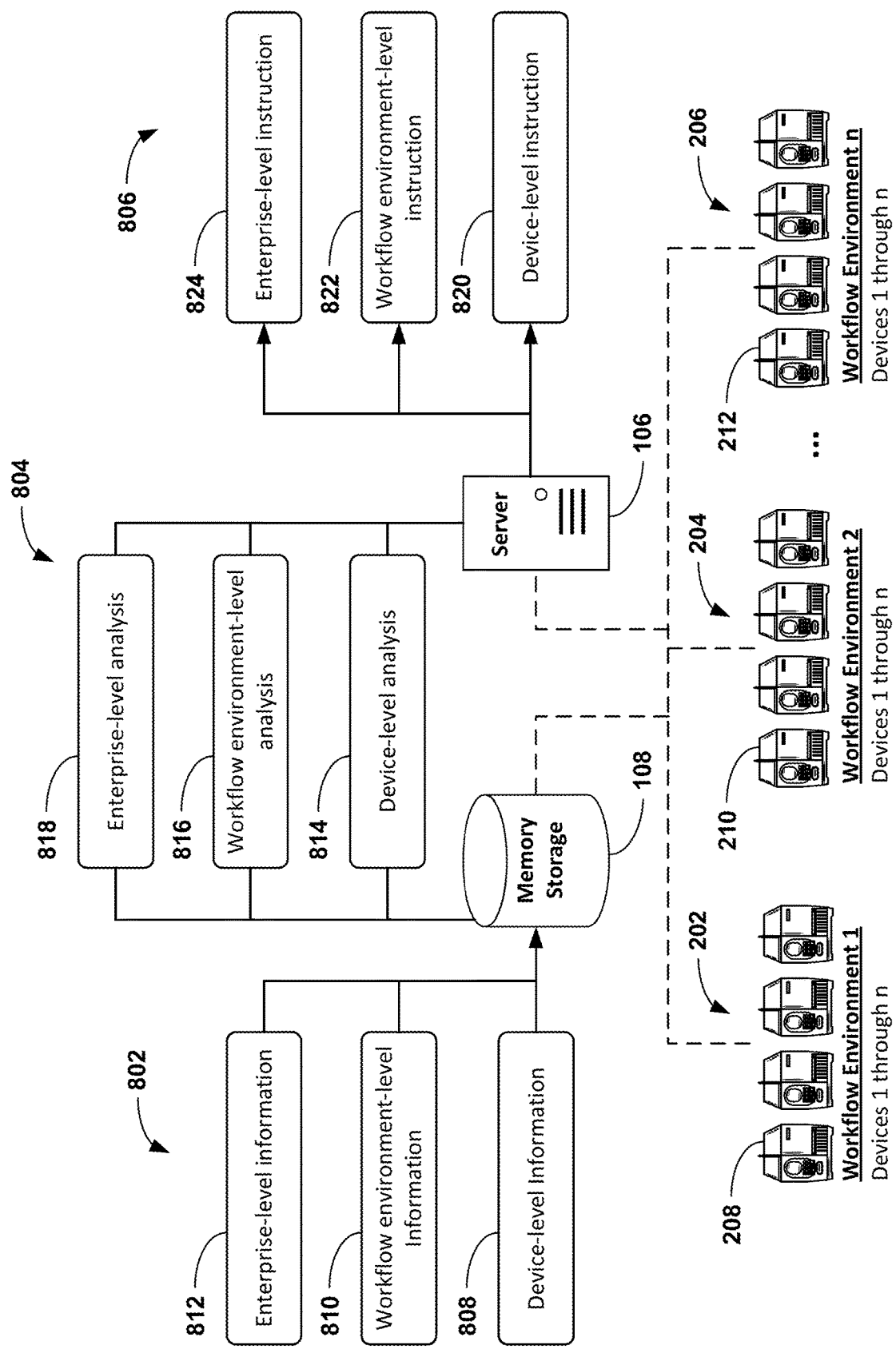
FIG. 8B schematically depicts one embodiment of a device network configured for managing a fleet of devices.

With reference to FIG. 8A, various embodiments of the systems and methods for managing a fleet of devices 800 (e.g., systems and methods for managing performance objectives) may include any one or more steps or features configured for: acquiring device information 802, analyzing device information 804, and sending device instructions based on device information 806. Device networks may be configured to provide a plurality of devices, any one or more of which may be utilized in systems and methods disclosed herein. For example, FIG. 8B shows an exemplary device network (e.g., the exemplary device network of FIG. 2), which may include features configured for receiving device information 802, analyzing device information 804, and sending device instructions 806. Device information may be acquired from any one or more devices, and optionally stored in memory storage 108 (e.g., FIGS. 1-9). Such device information may be subjected to analysis using any one or more analytical techniques, and device information may be sent to one or more devices or other locations on a device network based, at least in part, on such device information.

An exemplary device network may include one or more workflow environments, such as a first workflow environment 202, a second workflow environment 204, and an N-th workflow environment 206. Each such workflow environment may include one or more devices, such as a first plurality of devices 208, a second plurality of devices 210, and a third plurality of devices 212. A device network may be configured to acquire device information 802 from any one or more of such devices. For example, exemplary systems and methods may be configured for acquiring device information 802 including any one or more of: information pertaining to an individual device 808; information pertaining to a workflow environment 810, which may include information pertaining to one or more individual devices 808; and/or information pertaining to a device enterprise 812, which may include information pertaining to one or more workflow environments 810 and/or information pertaining to one or more individual devices 808. A server 106 may be provided, for example, to manage communications between devices on the device network. Memory storage 108 may be provided, for example, to store device information.

Device information may be analyzed with respect to an individual device, a workflow environment (which may include aggregated information from multiple devices), or a whole enterprise (which may include aggregated information from multiple workflow environments and/or from multiple devices). For example, exemplary systems and methods may be configured for analyzing device information 804 including any one or more of: analyzing information pertaining to an individual device 814; analyzing information pertaining to a workflow environment 816, which may include analyzing information pertaining to one or more individual devices 814; and/or analyzing information pertaining to a device enterprise 818, which may include analyzing information pertaining to one or more workflow environments and/or analyzing information pertaining to one or more individual devices 814.

Device instructions may be sent to one or more locations on a device network, including one or more devices or other locations such as a server 106 or memory storage 108. For example, exemplary systems and methods may be configured for sending device instructions 806, which may include any one or more of: sending instructions pertaining to an individual device 820; sending instructions pertaining to a workflow environment 822, which may include sending instructions pertaining to one or more individual devices 820; and/or sending instructions pertaining to a device enterprise 824, which may include sending instructions pertaining to one or more workflow environments 822 and/or sending instructions pertaining to one or more individual devices 820.

Acquiring Device Information

Figure 8C:
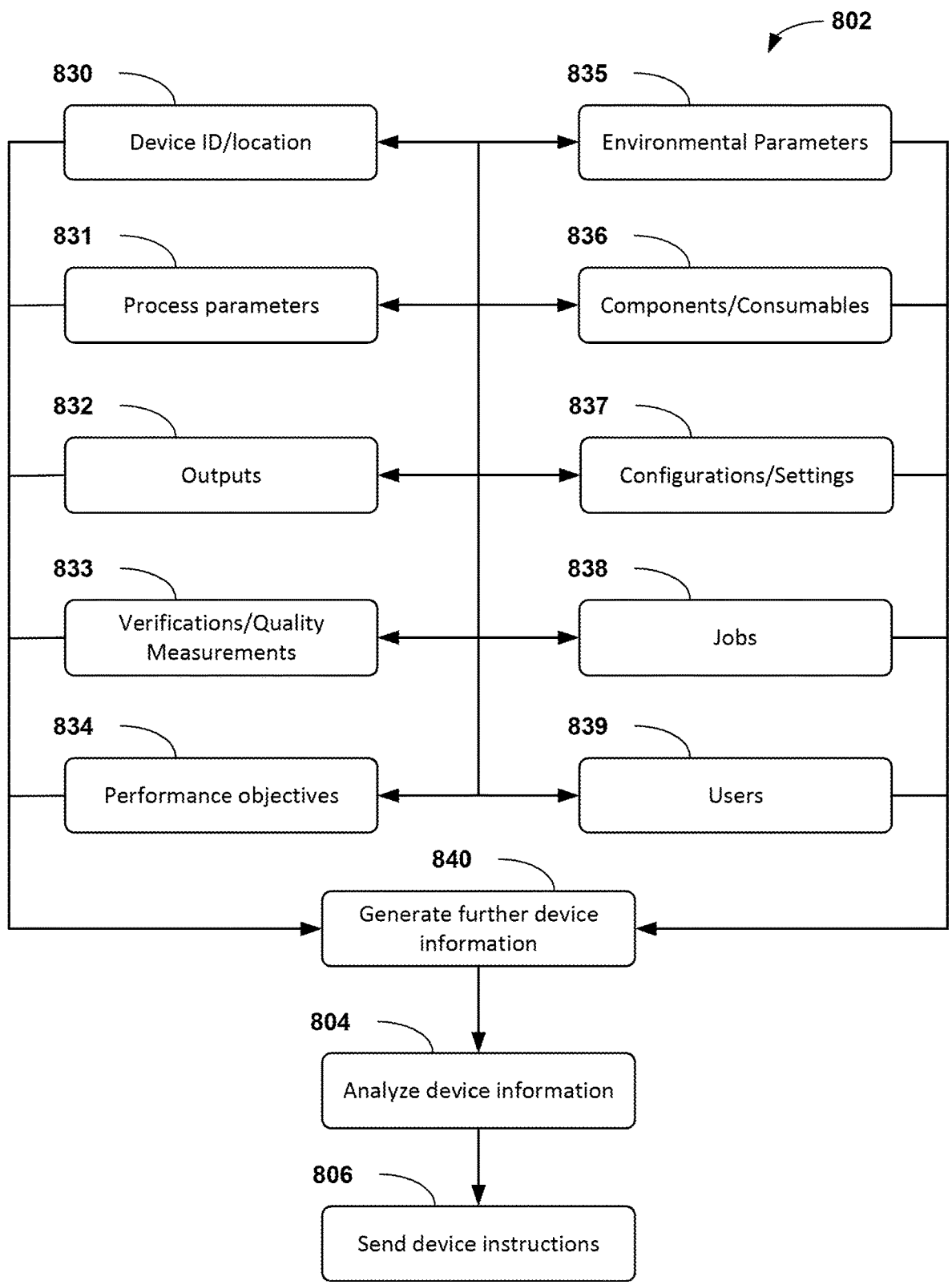
FIG. 8C is a flow chart showing exemplary types of device information which might be utilized when managing a fleet of devices.

Device information may be acquired directly from any one or more devices, or indirectly from other locations on a device network such as a server 106 or memory storage 108. Any such device information or combinations thereof may be utilized in accordance with the present disclosure. With reference to FIG. 8C, a flow chart is shown, depicting exemplary types of device information which might be acquired 802 in various embodiments. For example, exemplary systems and methods may be configured for acquiring device information pertaining to any one or more of: identities or locations of devices 830, process parameters 831, outputs of devices 832, verifications/quality measurements 833, performance objectives (e.g., quality, productivity, cost) 834, environmental parameters 835, components and/or consumables utilized by devices 836, device configurations or settings 837, jobs assigned to devices 838, and users assigned to devices 839. Aspects of such device information may be relationally associated to one another, for example in a database housed in memory storage 108.

Information pertaining to components and/or consumables may include, for example, information about print heads, drums, rollers, toner, ink, printing ribbon, printable medium, and any other replaceable parts or consumable items. Such information may include a consumption rate, a count or estimate of a supply/level/useful life remaining, an alarm for low-supply/low-level/low-useful-life alarms, a maintenance or service requirement with respect to a component and/or consumable, and the like.

In an exemplary embodiment, a device comprising a production system 702 produces outputs, and device information is acquired including information about the production system and/or the outputs 704 having been produced. Further, a device comprising a verification system 706 verifies outputs, and device information is acquired including information about the verification system and/or information about the verified outputs 708. Such exemplary embodiment may comprise a production system integrated with or communicatively coupled with a verification system.

When a device, production system, or verification system comprises a printing assembly, device information may include information about printed media produced by the printing assembly, such as information about printed media and/or indicia having been printed thereon.

When a device, production system, or verification system comprises a scanner/verifier assembly, device information may include information about scans having been obtained by the scanner/verifier assembly, such as information about printed media and/or indicia having been printed by a printing assembly. Information about scans may include a digital image of printed media and/or indicia obtained by the scanner/verifier assembly.

A device for purposes of the present disclosure may include any device or combination of devices that may be within the contemplation of the skilled artisan, many of which are disclosed herein, and all of which are within the spirit and scope of the present disclosure. In some embodiments, a device includes a thermal transfer printer, and device information includes information about a printing ribbon supply and/or information about a printable medium supply, such as low supply, or similar information about other consumables or components. In some embodiments, a device includes a laser toner printer, and device information includes information about a toner supply and/or information about a printable medium supply, such as low supply, or similar information about other consumables or components. In some embodiments, a device includes an ink drop printer, and device information includes information about an ink supply and/or information about a printable medium supply, such as low supply, or similar information about other consumables or components. In some embodiments, a device includes a point-of-sale device (e.g., a cash register, a payment console, etc.), and device information includes information about an ink supply and/or information about a printable medium supply, such as low supply, or similar information about other consumables or components.

In some embodiments, a printer sequentially produces a plurality of indicia or other items and a scanner obtains a digital image of each and every indicia or other item from among the plurality. Alternatively, a scanner may obtain a digital image of a subset of the indicia or other items from among the plurality. For example, a scanner may obtain a digital image of every N-th indicia or other item produced by the printer, such as every 2nd indicia or other item, every 3rd indicia or other item, every 4th indicia or other item, every 10th indicia or other item, every 100th indicia or other item. In some embodiments, a scanner may obtain one or more digital images of printed media and/or indicia produced by the printer when a change occurs with respect to other device information, and thereby obtaining a collection of device information associated with such change having occurred. Such change may include a change or changes pertaining to one or more process parameters, outputs, quality, productivity, environmental parameters, consumables, settings, jobs, and/or users.

In some embodiments, a triggering event as discussed below may be based at least in part on an aspect of device information.

In some embodiments, acquiring device information may include generating further device information 840. Such further device information may include outputs from data management activities, such as: extracting a subset of data from device information, e.g., for further processing or storage; cleaning device information, e.g., to remove corrupt or inaccurate data; annotating device information, e.g., with comments, explanations, or to provide context; integrating device information, e.g., to combine device information from multiple sources such as combining device information from multiple devices, multiple workflow environments, multiple device networks, multiple enterprises, and/or combining device information with different data such as data from business intelligence systems, enterprise resource management systems, and the like; and/or providing data visualizations or other data representations, for example to present data in a readable, aesthetically pleasing, or otherwise user-friendly format. Furthermore, any such device information may be relationally associated with other device information, for example, for further processing in accordance with the present disclosure.

Analyzing Device Information

Figure 8D:
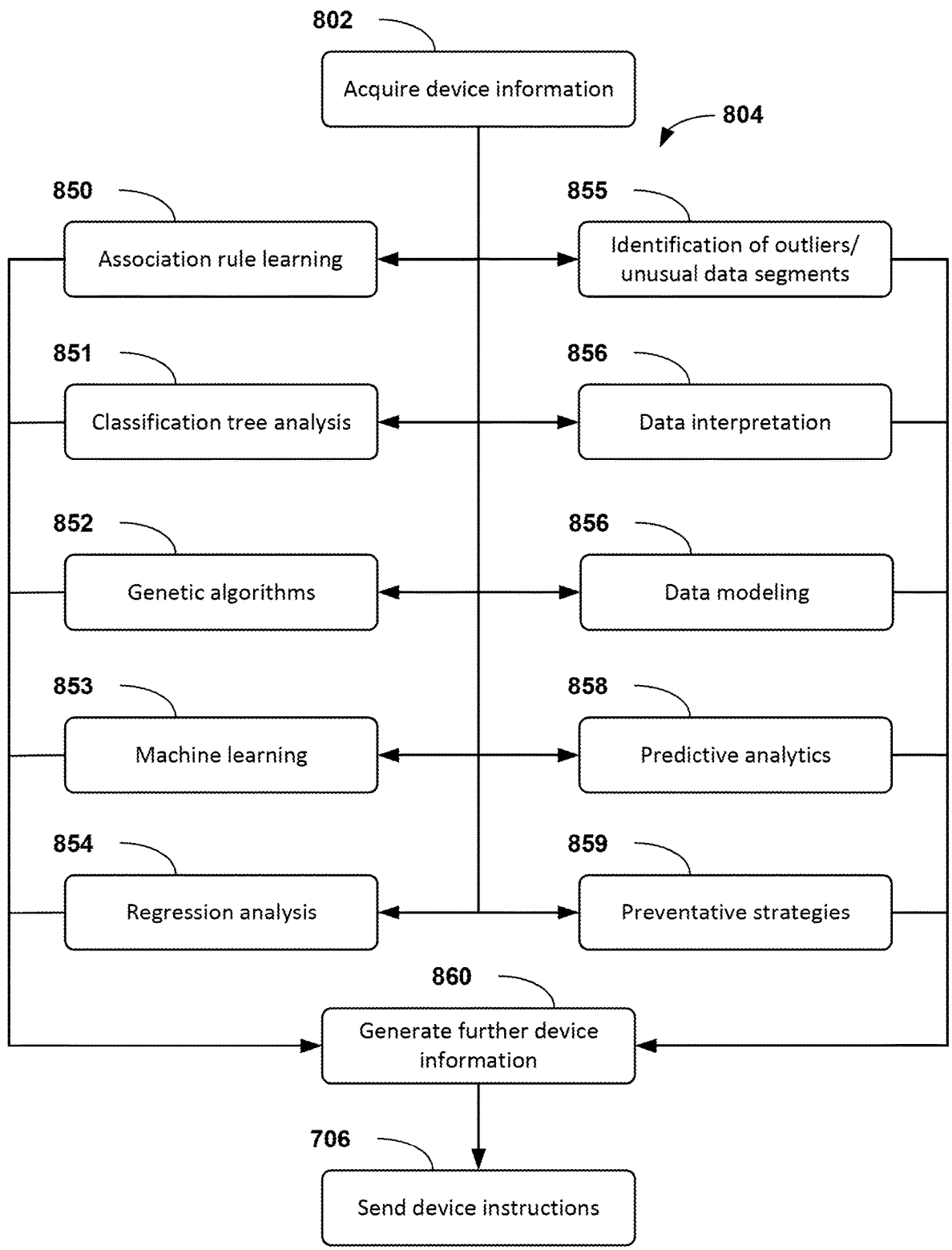
FIG. 8D is a flow chart showing exemplary analytical techniques which might be utilized when managing a fleet of devices.

Any one or more aspects of device information may be analyzed using analytical techniques known in the art. Any such analytical technique or combinations thereof may be utilized in accordance with the present disclosure. With reference to FIG. 8D, a flow chart is shown, depicting exemplary analytical techniques which might be used to analyze device information 804 in various embodiments. For example, exemplary systems and methods may be configured for analyzing device information (i.e., any one or more aspects thereof) utilizing any one or more of the following analytical techniques: association rule learning 850, classification tree analysis 851, genetic algorithms 852, machine learning 853, regression analysis 854, identification of outliers/unusual data segments 855, data interpretation 856, data modeling 857, predictive analytics 858, and preventative strategies 859. In some embodiments, analyzing device information may include generating further device information 860, for example, information resulting from or based on any of the foregoing analytical techniques having been performed on device information and/or data from other sources.

In some embodiments, one or more aspects of device information may be compared to one or more parameter values. With reference to FIG. 8E, a flow chart is shown, depicting an exemplary comparison of one or more aspects of device information to one or more parameter values. As shown, a first aspect of device information 870 is compared to a first parameter value 872. When a deviation from the first parameter value has been detected 872, a first instruction 874 is sent, based on the deviation from the first parameter value having been detected. The first instruction may be sent to at least one location on the device network. Additionally, or in the alternative, a second aspect of device information 870 can be compared to a second parameter value 876. When a deviation from the second parameter value has been detected 876, a second instruction is sent, based on the deviation from the second parameter value. The second instruction can be sent to at least one location on the device network. In addition, or alternatively, the first aspect of device information 870 may be compared to the second parameter value 876. Comparison of the first aspect of device information 870 to the second parameter value 876 may occur separately from comparison of the first aspect of device information to the first parameter value 872, and/or following comparison of the first aspect of device information to the first parameter value. For example, the first aspect of device information may be compared to the second parameter value 876 when a deviation from the first parameter value has not been detected 880. Alternatively, the first aspect of device information may be compared to the second parameter value 876 when a deviation from the first parameter value has been detected 880, such as to ascertain whether a deviation from both the first parameter value and the second parameter value.

As examples, the first parameter value 872 and/or the second parameter value 876 may each include a value corresponding to one or more of: a process parameter, an output, a measurement or verification of an output, a performance objective, an environmental parameter, a component or consumable, a setting, a job, or a user, or combinations these. Additionally, or in the alternative, a parameter value may correspond to an output from any one or more analytical techniques.

In an exemplary embodiment, device information comprising information about indicia having been produced by a printing assembly and/or information about scans having been obtained by a scanner/verifier assembly is provided. The information about scans may include a digital image of printed media and/or indicia obtained by the scanner/verifier assembly. One or more aspects of such device information are compared to one or more parameter values, which may include parameter values based on verifications and/or quality measurements for printed media and/or indicia, and/or performance objectives for producing printed media and/or indicia. For example, such parameters may pertain to physical characteristics of printed media and/or indicia or corresponding quality metrics (such as observed from analyzing a digital image of such printed media and/or indicia). The quality metric may be based on standards, including ANSI/ISO standards pertaining to printed media and/or indicia. Such standards may include one or more of: an ANSI/ISO standard grading structure (e.g., ISO/IEC 15415, 15416, 30116, or 29158), AIM (Association for Automatic Identification and Mobility) Direct Part Mark (DPM) Quality Guideline DPM-1-2006, USPS Merlin standards, and/or customized or user-defined standards. The device information may include one or more values (e.g., measured or calculated values) attributable to one or more of such physical characteristics or corresponding quality measurements for printed media and/or indicia, and the one or more parameter values may include process control parameter values, such as specification targets, control limits, and the like, for such physical characteristics or corresponding quality measurements.

In some embodiments, for example when using an ANSI/ISO standard grading structure, the physical characteristics of printed media and/or indicia which may be evaluated include print growth, print shrinkage, ink spread, edge determination, minimum reflectance, symbol contrast, minimum edge contrast, modulation, printing defects, quiet zone, and decodability. These characteristics are well known in the art, and are described in the ANSI/ISO guidelines.

Additionally, or in the alternative, for example, when using DPM Quality Guideline DPM-1-2006, the physical characteristics of printed media and/or indicia which may be evaluated include decodability, cell contrast, cell modulation, fixed pattern damage, unused error correction, axial non-uniformity, minimum reflectance, and grade non-uniformity. These characteristics are well known in the art, and are described in the DPM Quality Guideline.

Additionally, or in the alternative, the physical characteristics of printed media and/or indicia which may be evaluated include OCR quality parameters, including character inside fit, character outside fit, character, position, background noise, and character evaluation value (CEV) grade.

In some embodiments, device information may include one or more values (e.g., measured or calculated values) attributable to the scan parameter or grade for the printed media (e.g., as determined by an ANSI/ISO standard or other grading structure), and the one or more parameter values may include process control parameter values, such as specification targets, control limits, and the like for such scan parameter or grade. In some embodiments, device information may include one or more values (e.g., measured or calculated values) attributable to the scan parameter or overall symbol grade for indicia (e.g., as determined by an ANSI/ISO standard or other grading structure), and the one or more parameter values may include process control parameter values, such as specification targets, control limits, and the like for such scan parameter or symbol grade.

In some embodiments, device information may include information about performance objectives for producing outputs, such as a quality value, a productivity value, and/or a cost value, and the one or more parameter values may include process control parameter values, such as specification targets, control limits, and the like for such performance objectives.

In some embodiments, device information may include status information for one or more devices, such as whether the device or various systems or components thereof are showing as operational, or whether the device or any such systems or components has presented an error message, or has experienced a failure, or a loss of connectivity in respect of another workflow device, a standby device, or another device or resource on a device network. Analyzing device information may include ascertaining any one or more aspects of such status information. For example, a parameter value may be configured to correspond to one or more aspects of status information, and a deviation from the parameter value would exist when the device status does not correspond to the parameter value.

In some embodiments, analyzing device information may include ascertaining the occurrence of a triggering event. Such triggering events are discussed in more detail below. One example of a triggering event is a device failure. In an exemplary embodiment, a triggering event may give rise to a deviation from a parameter value. For example, a parameter value may be configured to the absence of a triggering event, and a deviation from the parameter value would exist upon the occurrence of a triggering event. Alternatively, in another exemplary embodiment, a deviation from a parameter value may give rise to a triggering event.

Sending Device Instructions

In accordance with the present disclosure, any one or more device instructions may be sent to any one or more locations on a device network. Such instructions may be sent to a location associated with a device, such as a processor or memory storage. For example, device instructions may be sent to a processor 710/714, a server 106, and/or memory storage 108. In an exemplary embodiment, device instructions may be sent in response to a deviation from a parameter value having been detected.

Figure 8F:
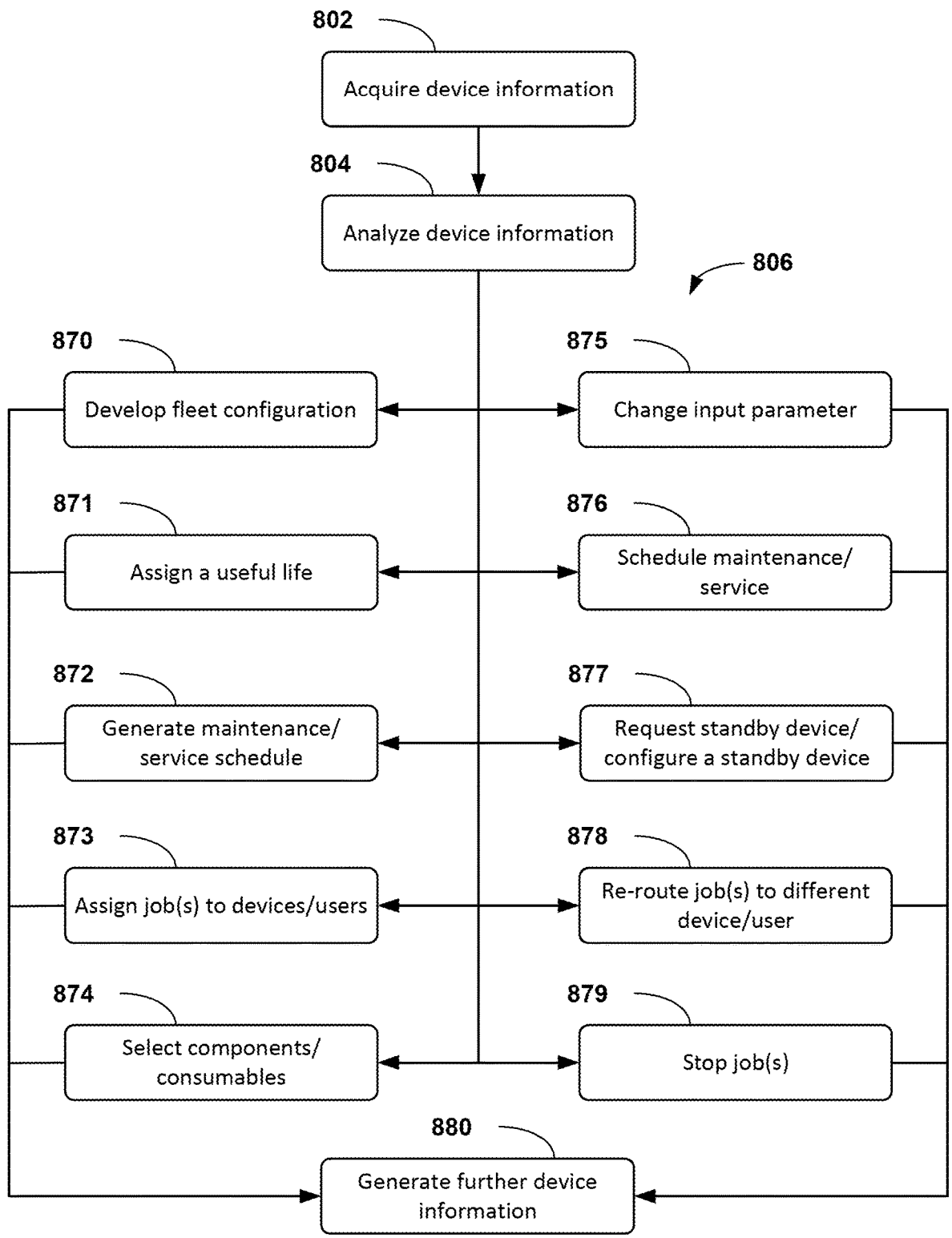
FIG. 8F is a flow chart showing exemplary device instructions which might be utilized when managing a fleet of devices.

With reference to FIG. 8F, a flow chart is shown, depicting exemplary device instructions. For example, exemplary systems and methods may be configured for sending device instructions 806 (and/or for receiving device instructions), including instructions directed towards any one or more of the following operations: developing a fleet configuration 870, assigning a useful life for one or more devices 871, generating a maintenance or service schedule for one or more devices 872, assigning one or more jobs to one or more devices and/or one or more users 873, selecting components/consumables 874, changing one or more input parameters 875, scheduling maintenance or service for one or more devices 876, requesting a standby device 877, re-routing job(s) or otherwise assigning job(s) to different devices and/or users 878, and stopping jobs 879. In some embodiments, sending device instructions may include generating further device information 880, for example, device information pertaining to device instructions having been sent to one or more devices.

In some embodiments, device instructions may be directed towards developing a fleet configuration 870. Such fleet configuration may include a selection of devices to be introduced into a workflow environment, for example to perform one or more jobs and/or for use by one or more users. The fleet configuration may be provided for an enterprise, a workflow environment, and/or for one or more jobs or one or more users or groups of users, such as a subset of jobs or users within an enterprise or a workflow environment.

In some embodiments, device instructions may be directed towards assigning a useful life for one or more devices 871, and/or a maintenance or service schedule for one or more devices 872. For example, a useful life may be assigned and/or a maintenance schedule may be generated based on an analysis of device information pertaining to the performance of one or more devices. Such device information may include information about utilization or uptime or expected utilization or uptime of one or more devices, information about maintenance requirements, schedules, or expected schedules, information about failure rates or expected failure rates, and/or information about device performance or expected performance relative to performance objectives.

In some embodiments, device instructions may be directed towards assigning one or more jobs to one or more devices and/or one or more users 873. For example, jobs may be assigned to devices or users based on information about the availability, utilization, capabilities, and/or performance of one or more devices with respect to which jobs might be assigned. Such assignments may include nascent assignments and/or changes to assignments for jobs having been assigned.

In some embodiments, device instructions may be directed towards selecting components and/or consumables 874. For example, components and/or consumables may be selected based on information about the availability, utilization, capabilities, and/or performance of such components and/or consumables, and/or of one or more devices when utilizing such components and/or consumables. Such device instructions may include, for example, initiating orders or order schedules, or changing orders or order schedules; and/or selecting or changing components or consumables for use with one or more devices. For printers, components and/or consumables includes print heads, drums, rollers, toner, ink, printing ribbon, printable medium, and any other replaceable parts or consumable items.

In some embodiments, device instructions may be directed towards changing one or more input parameters 875. Such input parameters may include, for example, set points, manipulated variables, tuning algorithms, controller logic, and other process control parameters. Device instructions for changing input parameters may be directed towards one or more devices. For example, input parameters may be changed to adjust the operation or performance of an individual device, or to adjust the operation of a plurality of devices simultaneously. In addition, or in the alternative, input parameters may be changed to adjust an interaction as between two or more devices.

For devices that include a printing assembly, input parameters that may be changed in accordance with the present disclosure include: device settings or configurations; print logic, or print commands generated by the print logic, such as strobe rate, timing, heat, temperature, or energy level for printing elements; drive system parameters, such as step rate or timing for a stepper motor; and parameters pertaining to performance objectives.

For devices that include a scanner/verifier assembly, input parameters that may be changed in accordance with the present disclosure include: scan rate, symbology, grading standard, and parameters pertaining to performance objectives.

In some embodiments, device instructions may be directed towards scheduling maintenance or service for one or more devices 876, requesting a standby device and/or configuring a standby device 877, re-routing job(s) or otherwise assigning job(s) to different devices and/or users 878, and/or stopping jobs 789. Scheduling maintenance or service may include scheduling based on ascertaining that a device presently requires maintenance or service, or predicting that a device may require maintenance or service at some time. Stopping jobs may include stopping jobs in progress, and/or stopping jobs in queue. Jobs may be stopped, and/or jobs may be re-routed or otherwise assigned to a different device or user, for example, in connection with maintenance or service having been scheduled for such device, and/or in connection with a triggering event as discussed in more detail below. A standby device may be requested to be introduced into a workflow environment, for example, to provide additional capacity to meet output requirements, and/or to replace a workflow device. A standby device may take the place of a workflow device, for example, in response to detecting a deviation from a parameter value with respect to the workflow device, and/or in response to a triggering event as discussed in more detail below. A standby device may be configured as discussed in more detail below.

In some embodiments, device instructions may be directed towards forward-looking activities, such as may be associated with deploying a new fleet of devices having a configuration tailored to given performance objectives. Alternatively, or in addition, device instructions may be directed towards backwards-looking activities, such as may be associated with making changes to a fleet of devices based on past performance of other devices in order to better meet given performance objectives. Further, device instructions may be directed towards real-time management of a fleet of devices, such as may be associated with managing performance objectives. At least the types of device instructions disclosed herein may be directed towards any such forward-looking, backwards-looking, or real-time management of performance objectives. Further types of device information will be apparent to those skilled in the art.

Fleet Management

Performance objectives for a device or a fleet of devices, for example, resizing on a device network may be managed utilizing one or more aspects of the systems and methods disclosed herein, including any one or more steps or features configured for: acquiring device information 802, analyzing device information 804, and sending device instructions based on device information 806.

Figure 9:
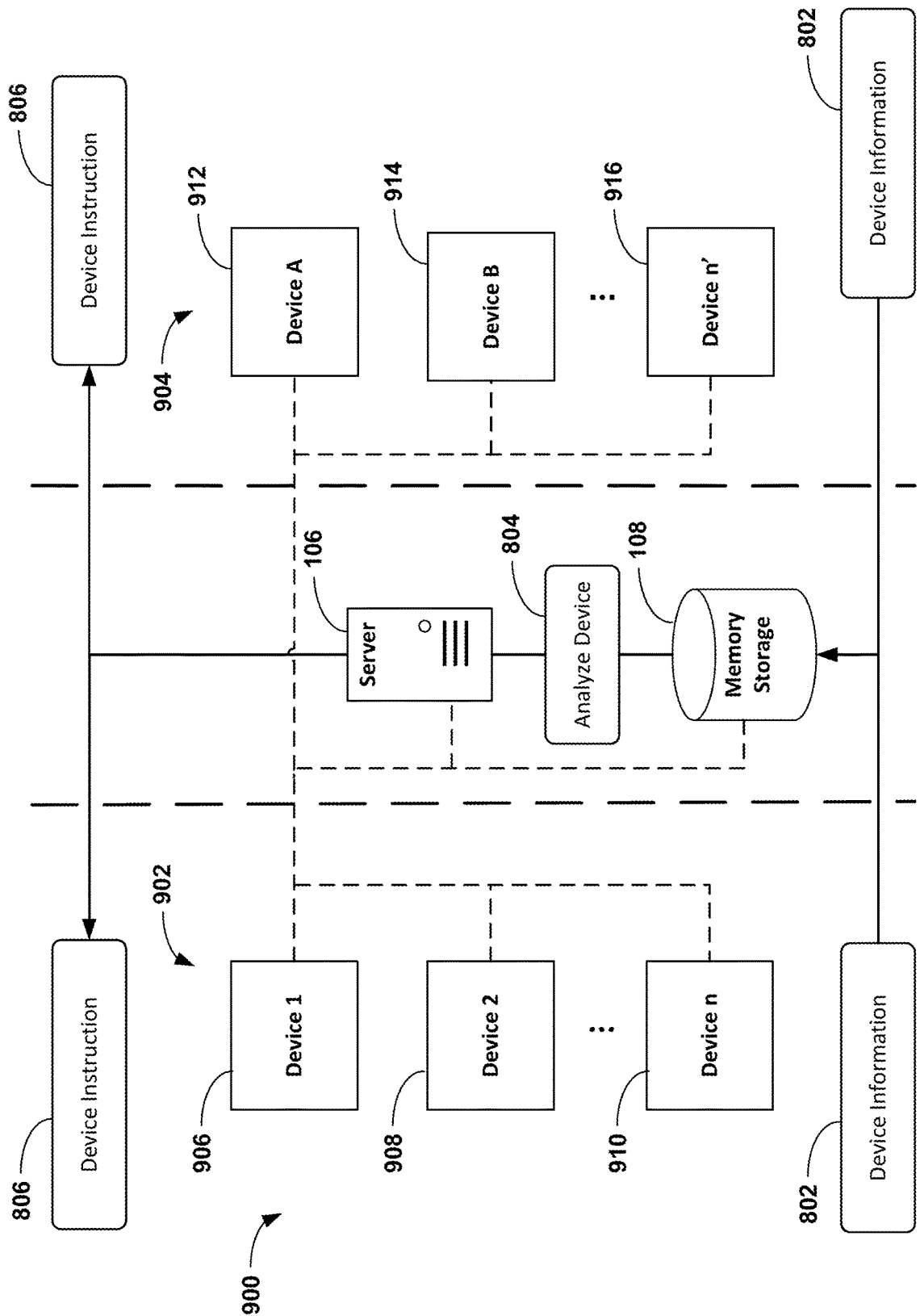
FIG. 9 schematically depicts yet another embodiment of a device network configured for managing a fleet of devices.

With reference to FIG. 9, a schematic is shown, depicting an exemplary device network 900. As shown, the exemplary device network 900 may include one or more workflow environments, such as a first workflow environment 902 and a second workflow environment 904. The first workflow environment includes one or more devices, such as a first device within the first workflow environment 906, a second device within the first workflow environment 908, and an N-th device within the first workflow environment 910. The second workflow environment also includes one or more devices, such as a first device within the second workflow environment 906, a second device within the second workflow environment 908, and an N-th device within the second workflow environment 910. A server 106 and memory storage 108 also are provided. The server 106 may be used to manage communications between devices on the device network. Memory storage 108 may be used to store device information. Device information 802 may be obtained from the first workflow environment and/or from the second workflow environment. Such device information may pertain to a workflow environment as a whole (e.g., as to all of the devices in the workflow environment, including workflow devices, and optionally including standby devices), or such device information may pertain to a subset of devices in the workflow environment (e.g., one or more workflow devices and/or one or more standby devices). When receiving device information 802, some or all of such device information may be stored in memory storage 108. Some or all of the device information received and/or stored in memory storage may be analyzed 804 in accordance with the present disclosure. Analysis may be performed before and/or after having stored the device information in memory storage. Device instructions 806 may be sent to the first workflow environment and/or to the second workflow environment. Such device instructions may pertain to a workflow environment as a whole (e.g., as to all of the devices in the workflow environment, including workflow devices, and optionally including standby devices), or such device instructions may pertain to a subset of devices in the workflow environment (e.g., one or more workflow devices and/or one or more standby devices).

In some embodiments, device information 802 may be obtained from one or more devices within the first workflow environment (e.g., the first device within the first workflow environment 906), and device instructions 806 may pertain to one or more devices within the first workflow environment (e.g., the first device within the first workflow environment 906). Alternatively, or in addition, device information 802 may be obtained from one or more devices within the first workflow environment (e.g., the first device within the first workflow environment 906), and device instructions 806 may pertain to one or more devices within the second workflow environment (e.g., the first device within the first workflow environment 906). In some embodiments, device information 802 may be obtained from a first device within the first workflow environment 906, and device instructions 806 may pertain to the first device within the first workflow environment 906. Alternatively, or in addition, device information 802 may be obtained from a first device within the first workflow environment 906, and device instructions 806 may pertain to a second device within the first workflow environment 906. Further alternatively, or in further addition, device information 802 may be obtained from a first device within the first workflow environment 906, and device instructions 806 may pertain to a first device within the second workflow environment 910.

Figure 10A:
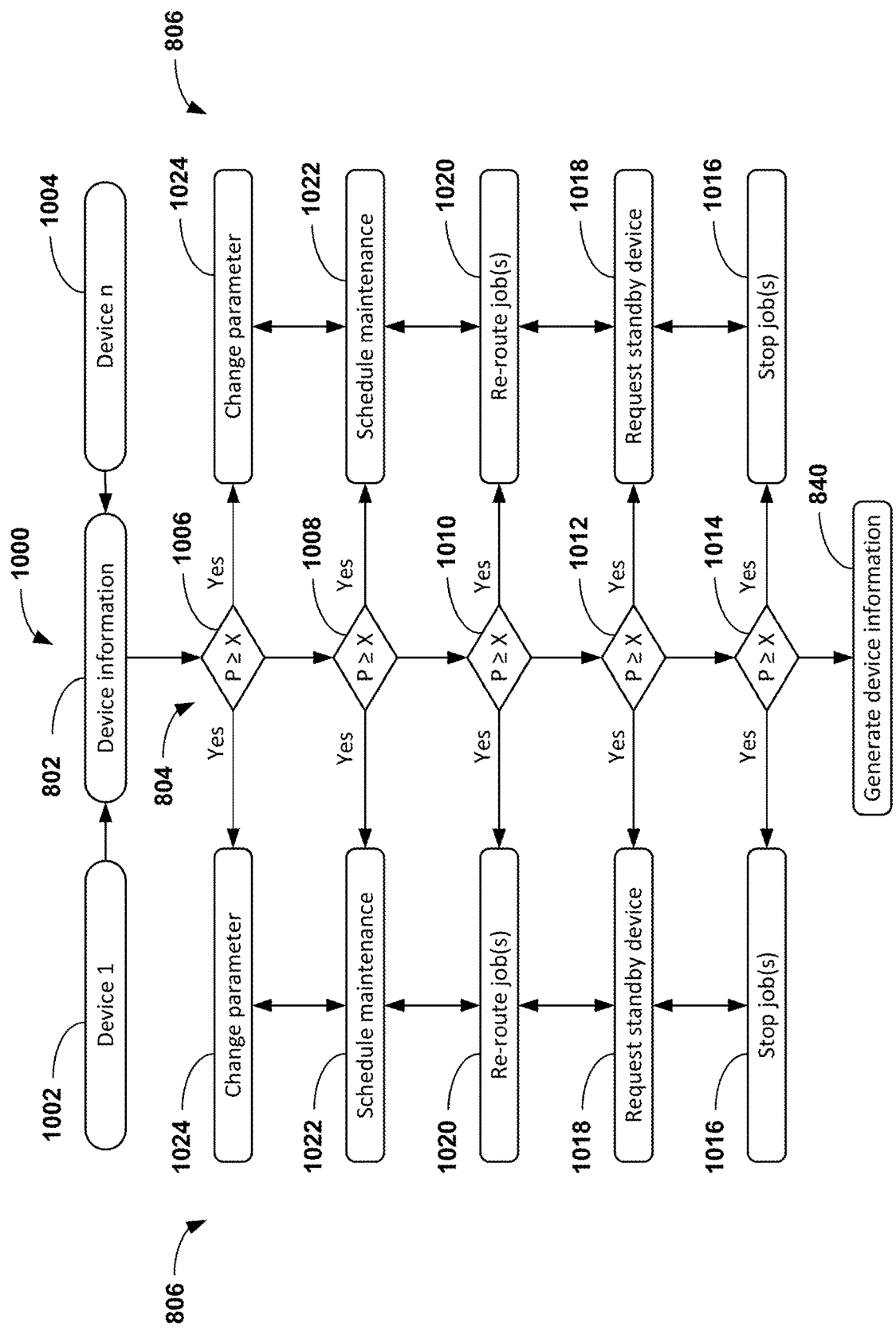
FIGS. 10A through 10F depict flow charts showing various exemplary schema for managing a fleet of devices.

Schema for managing a device or a fleet of devices may be configured in accordance with the present disclosure using any combination of the features or steps disclosed herein. Additional combinations will be apparent to the skilled artisan, and are within the spirit and scope of the present disclosure. As examples, FIGS. 10A through 10F show various exemplary schema for managing one or more devices, utilizing exemplary combinations of various features or steps configured for acquiring device information 802, analyzing device information 804, and sending device instructions 806. In one exemplary embodiment 1000 shown in FIG. 10A, device information 802 may be acquired from any one or more devices, which may include a first device 1002 and an N-th device 1004. The device information may include, for example, one or more of the exemplary types of device information shown in FIG. 8C. One or more aspects of device information 802 are subject to analysis using any one or more analytical techniques 804. Such analytical techniques may include, for example, one or more of the analytical techniques shown in FIGS. 8D and/or 8E. As shown in FIG. 10A, one or more aspects of device information are compared to one or more parameters. When a deviation from a parameter value has been detected, one or more instructions are sent. When a device network is provided, the one or more instructions may be sent to at least one location on the device network. For example, the one or more instructions may be sent to one or more locations associated with one or more devices, such as to a location associated with the first device 1002 and/or to a location associated with the N-th device 1004. The one or more instructions may include, for example, one or more of the exemplary device instructions shown in FIG. 8F.

In an exemplary embodiment 1000, device information is acquired 802 from one or more devices. The one or more devices may include a first device 1002 and/or one or more additional devices 1004 (e.g., a second device). The first device 1002 and the one or more additional devices 1004 (e.g., the second device) may be located within the same workflow environment and enterprise, or the first device may be located in a separate workflow environment and/or a separate enterprise from the one or more additional devices. Further, the one or more additional devices may be located among one or more workflow environments and/or enterprises. The device information may correspond, for example, to one or more jobs having been performed or partially performed by the one or more devices. One or more aspects of the device information are compared to one or more parameter values, and responsive to detecting one or more deviations from such one or more parameter values, one or more instructions are set to one or more locations on a device network. For example, an aspect of device information may be compared to a parameter value (e.g., a first parameter value 1006, a second parameter value 1008, a third parameter value 1010, a fourth parameter value 1012, a fifth parameter value 1014, and/or an N-th parameter value (not shown)). Responsive to detecting a deviation from a parameter value, one or more instructions may be sent to one or more locations on the device network (e.g., a first instruction 1016, a second instruction 1018, a third instruction 1020, a fourth instruction 1022, a fifth instruction 1024, and/or an N-th instruction (not shown)). The one or more instructions may trigger one or more actions, which may be responsive to address such deviation. As examples, the one or more actions may correspond to carrying out any device instruction, such as the exemplary device instructions shown in FIG. 8F.

As shown in FIG. 10A, the one or more instructions and corresponding one or more actions include: stopping a job or jobs 1016, requesting a standby device 1018, re-routing a job or jobs, or otherwise assigning a job or jobs to a different device or user 1020, scheduling maintenance 1022, and/or changing an input parameter, such as a process parameter 1024. The location on the device network to which such instructions are sent may be, for example, a location associated with the first device 1102 and/or the N-th device 1104. In some embodiments, further device information may be generated 840, for example, pertaining to any one or more of the steps of acquiring device information 802, analyzing device information 804, and sending device instructions 806.

Figure 10B:
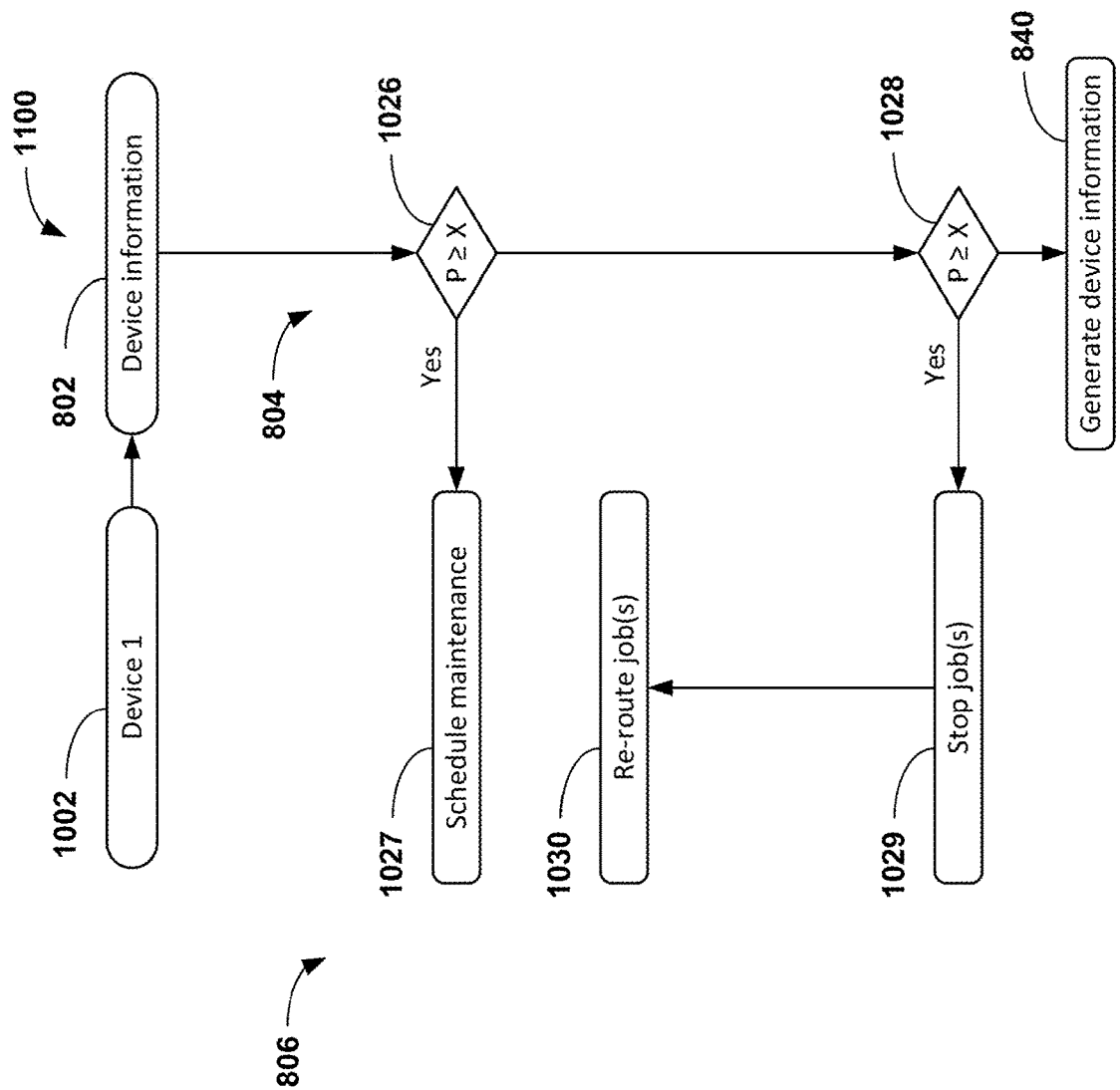
Figure 10C:
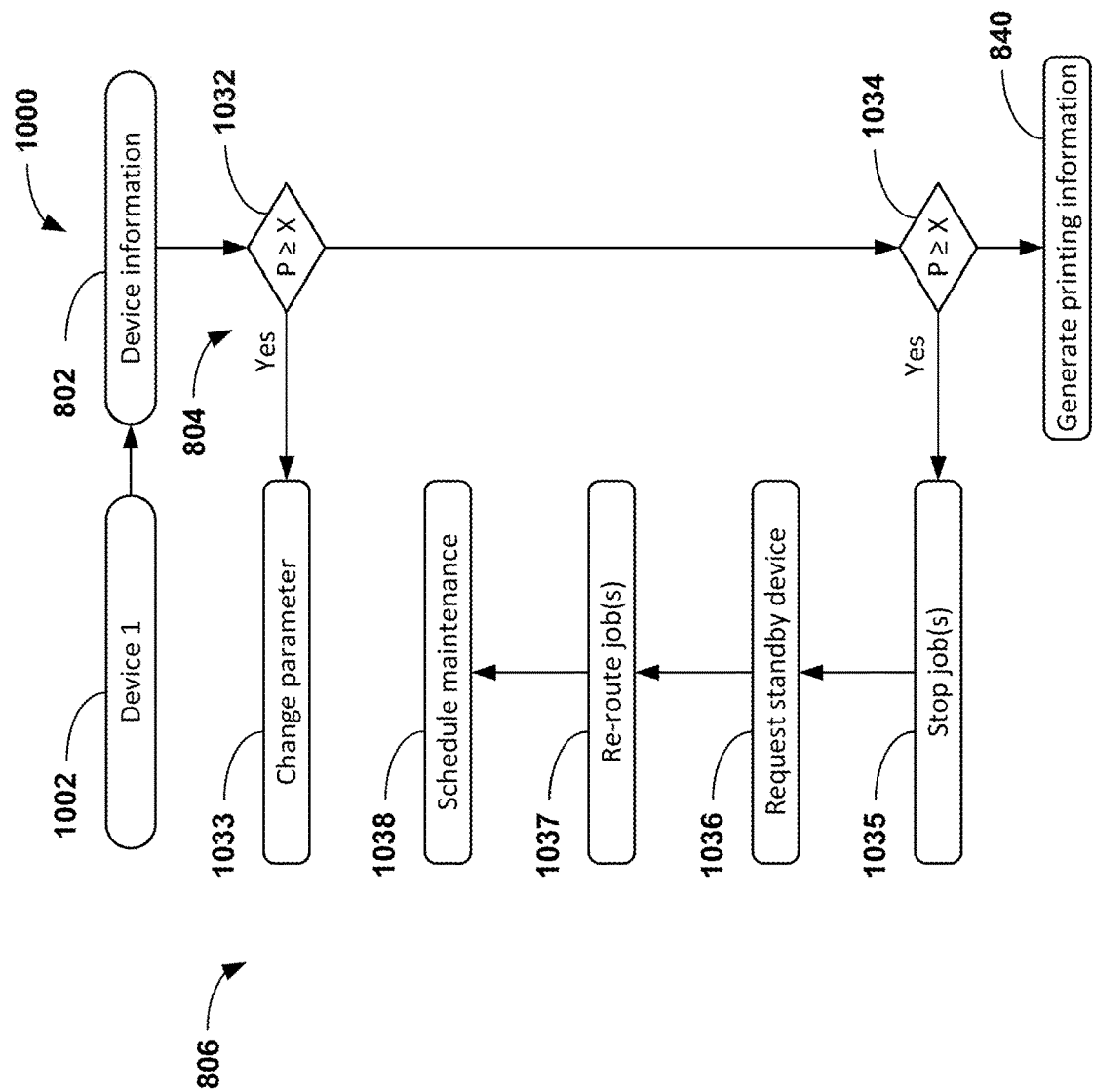

In some embodiments, for example as shown in FIGS. 10B and 10C, device information associated with a first device 1002 is acquired 802. The device information is analyzed 804, with one or more aspects of the device information being compared to one or more parameter values (e.g., 1026 and/or 1028 in FIG. 10B; and/or 1032 and/or 1040 in FIG. 10C), and responsive to a detecting deviation from a parameter value, one or more instructions are respectively sent (e.g., 1027, 1029, and/or 1030 in FIG. 10B; and/or 1033, 1042, 1044, 1046, and/or 1048 in FIG. 10C) to a location on the device network associated with the first device 1002, triggering action responsive to address the respective deviation.

More particularly, but without limitation, as shown in FIG. 10B, a first aspect of the device information 802 is compared to a first parameter value 1026, and responsive to detecting a deviation from the first parameter value, a first instruction 1027 is sent to at least one location on the device network, triggering a first action responsive to address such deviation. In some embodiments, as shown in FIG. 10B, the first action may comprise scheduling maintenance for the first device. Further, in some embodiments, the first aspect of the device information 802 is compared to a second parameter value 1028, and responsive to detecting a deviation from the second parameter value, a second instruction 1029 and/or 1030 is sent to at least one location on the device network, and/or a third instruction 1029 or 1030 are sent to at least one location on the device network, triggering a second action, and optionally, a third action responsive to address such deviation. In addition, or alternatively, in some embodiments a second aspect of the device information may be compared to the first parameter value 1032 and/or the second parameter value 1028, similarly triggering instructions and corresponding actions responsive to detecting deviations from parameter values. In some embodiments, as shown in FIG. 10B, the second action may comprise stopping one or more jobs assigned to the first device, and the third action may comprise re-routing one or more jobs from the first device, or otherwise assigning such jobs to a different device or user. Alternatively, the second action may comprise both stopping jobs and re-routing.

Further, as shown in FIG. 10C, a first aspect of the device information 802 is compared to a first parameter value 1032, and responsive to detecting a deviation from the first parameter value, a first instruction 1033 is sent to at least one location on the device network, triggering a first action responsive to address such deviation. In some embodiments, as shown in FIG. 10C, the first action may comprise changing an input parameter for the first device. Further, in some embodiments, the first aspect of the device information 802 is compared to a second parameter value 1034, and responsive to detecting a deviation from the second parameter value, one or more instructions 1035, 1036, 1037, and/or 1038 are sent to at least one location on the device network, triggering one or more actions responsive to address such deviation. In addition, or alternatively, in some embodiments a second aspect of the device information may be compared to the first parameter value 1032 and/or the second parameter value 1034, similarly triggering one or more instructions and one or more corresponding actions responsive to detecting deviations from parameter values. In some embodiments, as shown in FIG. 10C, the one or more actions may comprise: stopping one or more jobs assigned to the first device, requesting a standby device (e.g., to be introduced into the workflow environment in place of the first device), re-routing one or more jobs from the first device, or otherwise assigning such jobs to a different device or user, and/or scheduling maintenance for the first device.

Figure 10D:
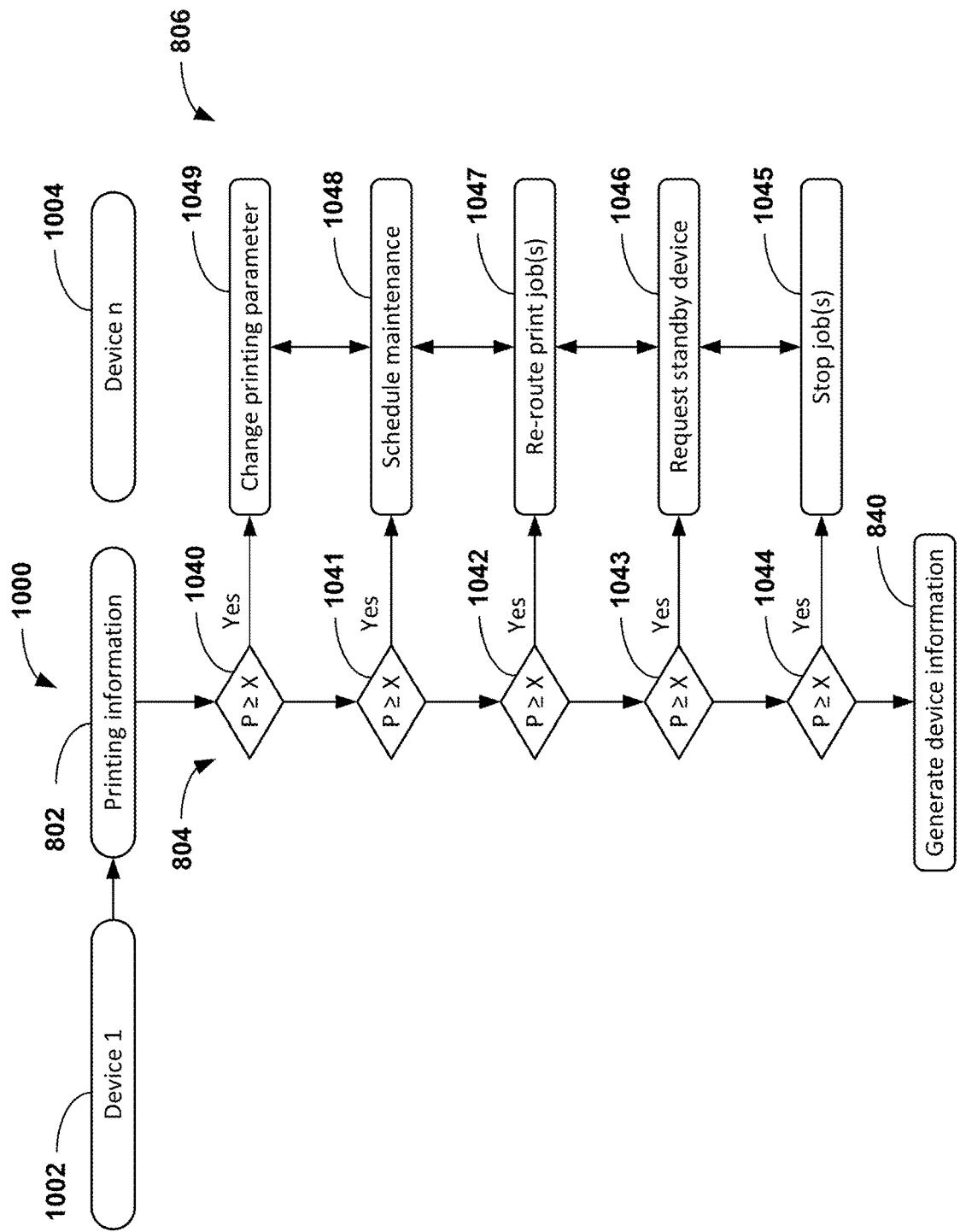
Figure 10E:
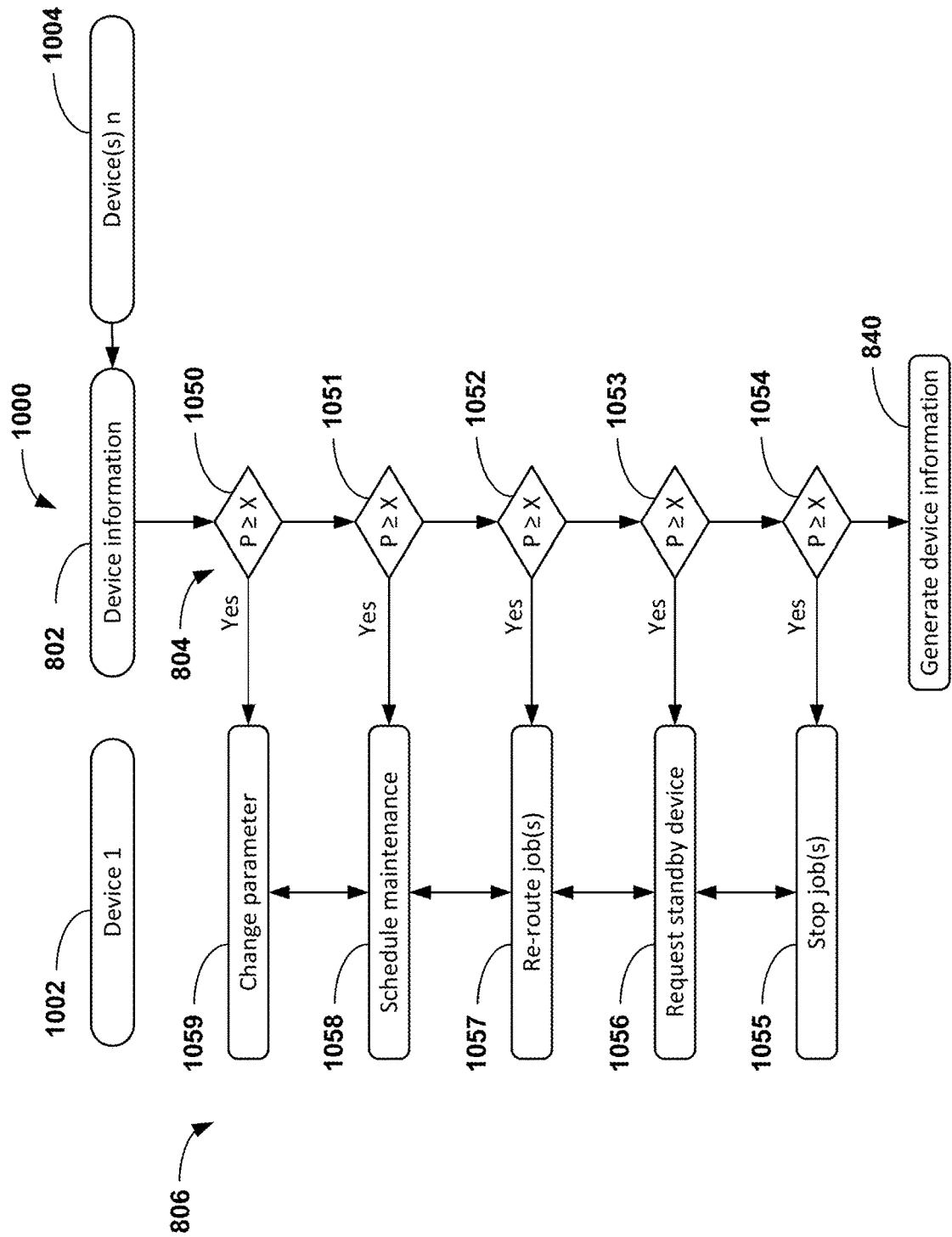

In another exemplary embodiment, for example a shown in FIG. 10D, one or more aspects of device information 802 associated with a first device 1002 are compared to one or more parameter values 1040, 1041, 1042, 1043, and/or 1044, and responsive to detecting a deviation from one or more of the parameter values, one or more instructions instruction 1045, 1046, 1047, 1048, and/or 1049 are sent to at least one location on the device network, triggering one or more actions with respect to one or more additional devices 1004 (e.g., a second device). In yet another exemplary embodiment, for example as shown in FIG. 10E, one or more aspects of the device information 802 associated with the one or more additional devices 1004 (e.g. the second device) are compared to one or more parameter values 1050, 1051, 1052, 1053, and/or 1054, and responsive to detecting a deviation from one or more of the parameter values, one or more instructions instruction 1055, 1056, 1057, 1058, and/or 1059 are sent to at least one location on the device network, triggering one or more actions with respect to the first device 1002.

Figure 10F:
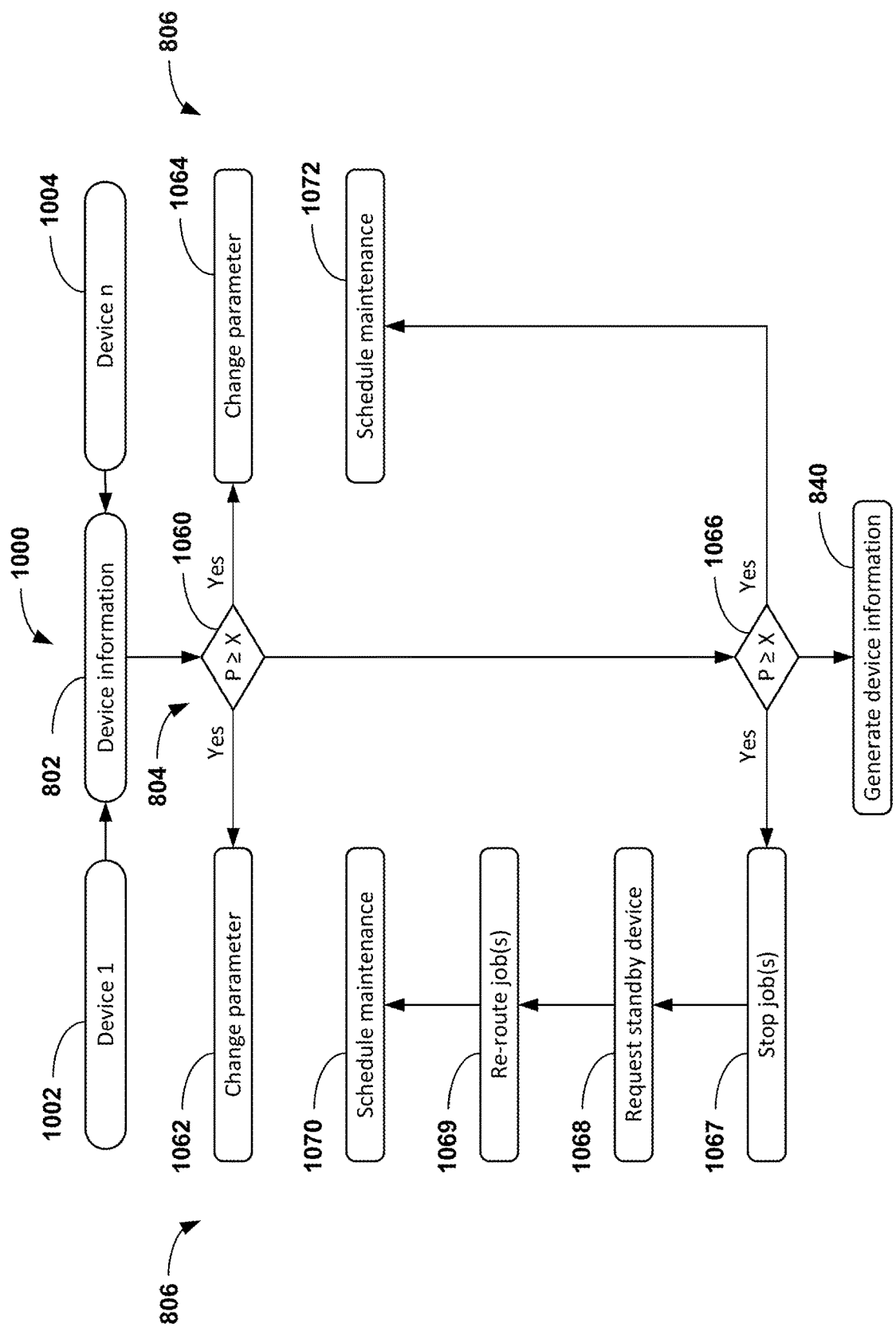

More particularly, but without limitation, in some embodiments for example as shown in FIG. 10F, device information is acquired 802, and the device information may be associated with a first device 1002 and/or one or more additional devices 1004 (e.g., a second device). The device information is analyzed 804, with one or more aspects of the device information being compared to one or more parameter values (e.g., 1060/1066), and responsive to a detecting deviation from a parameter value, one or more instructions are respectively sent, triggering action associated with the first device 1002 (e.g., 1062, 1067, 1068, 1069, and/or 1070) and/or triggering action associated with the one or more additional devices 1004 (e.g., 1064 and/or 1072). The parameter values may be identical or different as between the first device 1002 and the one or more additional devices 1004. For example, as shown in FIG. 10F, a first aspect of device information 802 (which may be based on information pertaining to the first device 1002 and/or one or more additional devices 1004) is compared to a first parameter value 1060, and responsive to detecting a deviation from the first parameter value, a first instruction is sent to at least one location on the device network, triggering a first action with respect to the first device 1062 and/or with respect to the one or more additional devices 1064. In some embodiments, as shown in FIG. 10F, the first action may comprise changing an input parameter value for the first device and/or for the second device. For example, the instruction triggering changing an input parameter value 1062 for the first device 1002 may be based on information pertaining to the one or more additional devices 1004 (in addition to, or as an alternative to, information pertaining to the first device 1002). Alternatively, or in addition, the instruction triggering changing an input parameter value 1064 for the one or more additional devices 1004 may be based on information pertaining to the first device 1002 (in addition to, or as an alternative to, information pertaining to the one or more additional devices 1004).

Further, in some embodiments, the first aspect of the device information 802 (which may be based on information pertaining to the first device 1002 and/or one or more additional devices 1004) is compared to one or more additional parameter values 1066, and responsive to detecting a deviation from one or more of the one or more additional parameter value, one or more additional instructions are respectively sent to at least one location on the device network, triggering one or more additional actions with respect to the first device 1062 and/or with respect to the one or more additional devices 1064. In addition, or alternatively, in some embodiments one or more additional aspects of device information may be compared to the first parameter value 1060 and/or to the one or more additional parameter values 1066, similarly triggering instructions and corresponding actions responsive to detecting deviations from parameter values. In some embodiments, the one or more additional actions may include: stopping one or more jobs, requesting a standby device, re-routing one or more jobs or otherwise assigning jobs to a different device or user, and/or scheduling maintenance, in each case with respect to the first device 1062 and/or with respect to the one or more additional devices 1064. As shown in FIG. 10F, with respect to the first device, one or more jobs are stopped, a standby device has been requested, one or more jobs have been re-routed or otherwise assigned to a different device, and maintenance has been scheduled; and with respect to one or more additional devices, maintenance has been scheduled. For example, responsive to detecting a deviation from a parameter value 1066 triggering stopping jobs with respect to a first device 1002, maintenance may be scheduled 1072 for one or more additional devices 1004, thereby causing maintenance to be carried out on the one or more additional devices 1004 based on information pertaining to the first device 1002, potentially avoiding a future stopping of jobs (e.g., because of a device failure, a quality issue, and/or unplanned maintenance) with respect to the one or more additional devices.

In some embodiments, one or more parameter values may be based on predictive analytics or other analytical techniques disclosed herein. For example, when detecting a deviation from a parameter value corresponding to a first device 1002, predictive analytics or other analytical techniques in accordance with the present disclosure may provide information based upon which instructions may be sent to locations on the device network associated with one or more other devices 1004 (e.g. a second device), thereby triggering actions with respect to such one or more other devices 1004 based on having detected a deviation from a parameter value corresponding to the first device 1002. Additionally, or in the alternative, when detecting a deviation from a parameter value corresponding to the one or more other device 1004, predictive analytics or other analytical techniques may provide information based upon which instructions may be sent to locations on the device network associated with the first device 1002, thereby triggering actions with respect to the first device 1002 based on having detected a deviation from a parameter value corresponding to the one or more other devices 1004. Further, in some embodiments, a parameter value itself (e.g., 1050, et seq.) corresponding to the first device 1002 may be based on information, predictive analytics, or other analytical techniques associated with one or more other devices 1004. Similarly, information, predictive analytics, or other analytical techniques associated with the first device 1002 may provide the basis for a parameter value (e.g., 1040, et seq.) corresponding to the one or more other devices 1004.

In some embodiments, for example, in the schema for managing a device or a fleet of devices shown in FIGS. 10A through 10F, the one or more devices may include printers and/or scanners. For example, the first device 1002 and/or the one or more additional devices 1004 may comprise a printing assembly configured to produce printed media and/or indicia, and a scanner/verifier assembly configured to obtain device information pertaining to printed media and/or indicia produced by the printing assembly. In some embodiments, the scanner/verifier assembly may be an inline scanner/verifier. In addition, or alternatively, the one or more devices may include printers and/or scanners provide as separate devices. For example, in some embodiments, a first device may be a printer having an inline scanner, and a second device may be a printer without an inline scanner. Alternatively, in some embodiments, a first device may be a printer and a second device may be a scanner. Alternatively, in some embodiments a fleet of devices may be provided in which all of the devices are printers having an inline scanner.

In some embodiments, for example, in the schema for managing a device or a fleet of devices shown in FIGS. 10A through 10F, the device information may correspond to one or more jobs having been performed or partially performed by one or more devices. For example, the device information may comprise one or more digital images of printed media and/or indicia. The printed media and/or indicia may have been produced by one or more of such devices, and/or the digital images may have been obtained by one or more of such devices. In some embodiments (for example, when a device comprises a printer configured to produce printed media and/or indicia and an inline scanner configured to obtain device information pertaining to printed media and/or indicia produced by the printer), a parameter value may be based on a scan parameter or a grade for such indicia, such as an overall symbol grade for such indicia. For example, a parameter value may be based on a scan parameter or a grade for printed media and/or indicia produced by a printer (such as an overall symbol grade for such indicia), and/or any other quality metric corresponding to the printed media and/or indicia. For example, a quality metric may be based on a value corresponding to or more of: print growth, print shrinkage, ink spread, edge determination, minimum reflectance, symbol contrast, minimum edge contrast, modulation, printing defects, quiet zone, and decodability, cell contrast, cell modulation, fixed pattern damage, unused error correction, axial non-uniformity, and grade non-uniformity. Other quality metrics are discussed herein, and even further quality metrics will be within the contemplation of the skilled artisan, all of which are within the spirit and scope of the present disclosure.

In some embodiments, a deviation from a parameter value may correspond to one or more jobs having been performed or partially performed by a first device 1002 (e.g., an output produced by the first device), and responsive to detecting the deviation, one or more instructions may be sent to at least one location on the device network, triggering one or more actions with respect to one or more additional devices 1004. For example, the one or more actions may include re-routing or otherwise assigning one or more jobs from a second device to a third device 1020 from among the one or more additional devices 1065. Additionally, or in the alternative, the one or more actions may include one or more of: stopping a job or jobs 1016, requesting a standby device 1018, scheduling maintenance 1022, and/or changing an input parameter, such as a process parameter 1024.

In some embodiments, the one or more additional devices 1004 may include a standby device (e.g., FIGS. 3 through 6), and the one or more actions may include triggering the standby device to be introduced into a workflow environment.

Optimizing

Various embodiments of the present disclosure embrace systems and methods for optimizing a device or a fleet of devices for one or more performance objectives, including quality, productivity, and cost factors. Referring back to FIG. 8A, device information pertaining to performance objectives may be acquired 802, analyzed 804, and provide a basis for sending device instructions 806, all in accordance with the present disclosure. In some situations, various performance objectives may have an inversely proportional correlation to one another (e.g., quality vs. cost, quality vs. productivity, productivity vs. cost), such that tradeoffs between competing objectives may exist under a certain configuration or across a certain range of configurations. Alternatively, in some embodiments various performance objectives may have a proportional correlation to one another, such that a combination of at least two performance objectives may be improved or optimized correspondingly (e.g., without requiring a tradeoff as between the performance objectives) under a certain configuration or across a certain range of configurations. Accordingly, various embodiments further embrace systems and methods for analyzing and selecting from among various alternatives, for example, to optimize a device or a fleet of devices for one or more performance objectives.

In some situations, a given output may be producible with any one or more different devices. Similarly, in some situations, a given device may be configurable according to any one or more different alternatives. Likewise, a workflow environment and/or an enterprise may be configurable according to any one or more different alternatives. The alternatives for a workflow environment configuration include all of the possible alternative configurations for each of the devices in the workflow environment. The alternatives for an enterprise configuration include all of the possible alternative configurations for each workflow environment in the enterprise and all of the possible alternative configurations for each of the devices therein. As examples, such alternatives may include a selection of component parts, consumables, process parameters, configurations, and settings for a device or devices. In addition, it will be appreciated that multitude of factors may directly or indirectly impact various performance objectives of an enterprise, of a workflow environment, or of one or more individual devices. Factors that may be relevant include the selection of a device or devices, configurations for a device or devices, jobs and/or users assigned to a device or devices, maintenance schedules, performance objectives, and environmental factors such as temperature, humidity, airborne particulates, etc. In some situations, a multitude of different factors may be relevant, and/or the magnitude with which various relevant factors directly or indirectly impact performance objectives may differ as between different devices, as between different workflow environments, and/or as between different enterprises. Further, in some situations, the relevance and/or the magnitude with which various relevant factors directly or indirectly impact performance objectives may otherwise be unknown apart from carrying out systems and methods disclosed herein. In some embodiments, relevant factors may be identified using analytical techniques as discussed herein.

In an exemplary embodiment, one or more devices having a verification system are provided. For example, devices having a production system 702 and a verification system 704 such as those shown in FIGS. 7A through 7F may be used. As discussed above, a verification system may be configured to verify outputs from a device, and in various embodiments frequent verifications may be obtained, up to and including verifying every output from a device. Device information may be acquired from one or more devices, including device information obtained from devices having a verification system. Such device information may be analyzed according to the present disclosure to optimize for various performance objectives.

Figure 11A:
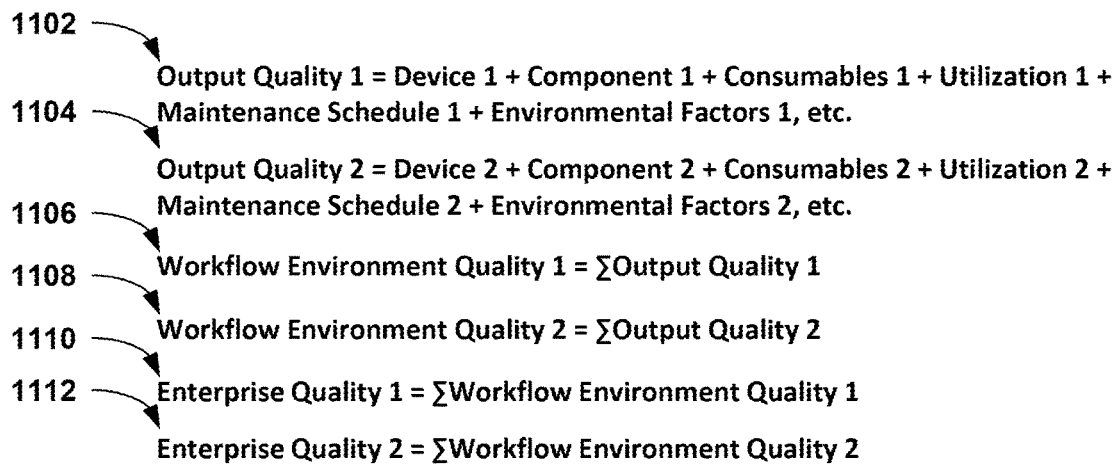
FIGS. 11A through 11C shows exemplary formula which may be utilized when optimizing for performance objectives.
Figure 11B:
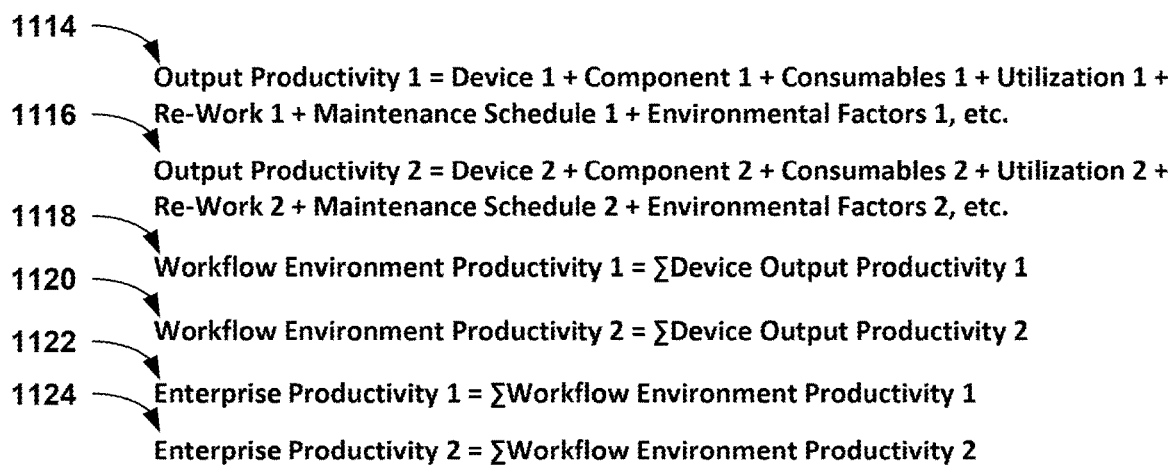
Figure 11C:
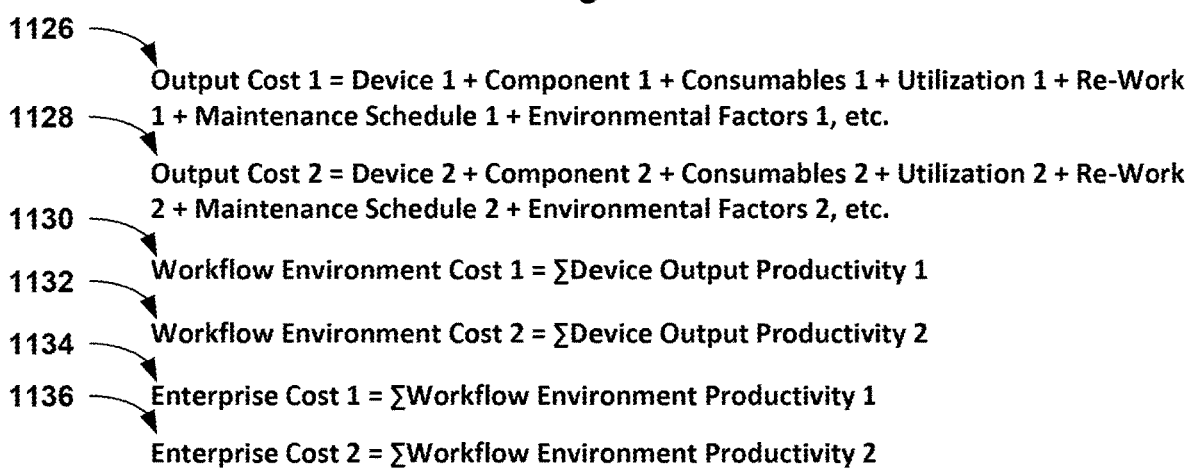

With reference to FIGS. 11A through 11C, various examples of formula which may be utilized when optimizing for performance objectives are shown. As shown in FIG. 11A, in some embodiments, a device or a fleet of devices may be optimized for output quality. Output quality from one or more devices may be analyzed or compared, for example, by producing and verifying outputs under a first series of conditions 1102 and under a second series of conditions 1104, with the first series of conditions 1102 differing from the second series of conditions 1104 by at least one factor. Device information acquired under the respective conditions may be analyzed to ascertain any difference in output quality. A multitude of factors may be relevant, and a multitude of different conditions may be compared to one another. Similarly, output quality from one or more workflow environments may be analyzed or compared, for example, by aggregating output quality information from the devices within the workflow environment under a first series of conditions 1106 and under a second series of conditions 1108. Further, output quality from one or more enterprises may be analyzed or compared, for example, by aggregating output quality information from the workflow environments within the enterprise under a first series of conditions 1110 and under a second series of conditions 1112.

As shown in FIG. 11B, in some embodiments, a device or a fleet of devices may be optimized for productivity. Productivity from one or more devices may be analyzed or compared, for example, by producing and verifying outputs under a first series of conditions 1114 and under a second series of conditions 1116, with the first series of conditions 1114 differing from the second series of conditions 1116 by at least one factor. Device information acquired under the respective conditions may be analyzed to ascertain any difference in productivity. A multitude of factors may be relevant, and a multitude of different conditions may be compared to one another. Similarly, productivity from one or more workflow environments may be analyzed or compared, for example, by aggregating productivity information from the devices within the workflow environment under a first series of conditions 1118 and under a second series of conditions 1120. Further, productivity from one or more enterprises may be analyzed or compared, for example, by aggregating productivity information from the workflow environments within the enterprise under a first series of conditions 1122 and under a second series of conditions 1124.

As shown in FIG. 11C, in some embodiments, a device or a fleet of devices may be optimized for various cost factors. Costs factors associated with one or more devices may be analyzed or compared, for example, by producing and verifying outputs under a first series of conditions 1126 and under a second series of conditions 1128, with the first series of conditions 1126 differing from the second series of conditions 1128 by at least one factor. Device information acquired under the respective conditions may be analyzed to ascertain any difference in one or more cost factors. A multitude of factors may be relevant, and a multitude of different conditions may be compared to one another. Similarly, cost information from one or more workflow environments may be analyzed or compared, for example, by aggregating cost information from the devices within the workflow environment under a first series of conditions 1130 and under a second series of conditions 1132. Further, cost information from one or more enterprises may be analyzed or compared, for example, by aggregating cost information from the workflow environments within the enterprise under a first series of conditions 1134 and under a second series of conditions 1136.

In some embodiments, parameter values based on performance objectives may be provided. For example, such parameter values may include a quality value, a productivity value, and/or a cost value. Device information may be analyzed 804 with respect to any such parameter value based on a performance objective, and device instructions may be sent 806 with the objective of optimizing for one or more performance objectives. In exemplary embodiments, device instructions may be operative to change (i.e., increase or decrease) a parameter value. For example, responsive to detecting a deviation from a parameter value based on a performance objective corresponding to one or more devices (or one or more workflow environments or enterprises), an input parameter for one or more devices may be changed. Such change to the input parameter may be operative to change a quality value, a productivity value, and/or a cost value. For example, when a deviation from a parameter value indicates that a quality value and/or a productivity value are too low, and/or a cost value is too high, such deviation may trigger one or more instructions responsive to the deviation.

Example input parameters which may be changed or varied (e.g., to optimize for output quality, productivity, and/or cost) include heat settings for one or more print elements of a print head and/or printing speed. Such heat settings and/or printing speed may be changed or varied, for example, to optimize a scan parameter or a grade for printed media and/or indicia, such as an overall symbol grade for such indicia. Those skilled in the art will appreciate that heat settings and/or printing speed may impact output quality (e.g., various scan parameters and/or the grade for printed media, such as the overall symbol grade for the indicia), productivity (e.g., production rate, useful life, maintenance/service schedules), and/or cost (e.g., production costs, component/consumables costs, downtime costs, utilization costs, re-work costs). As such, in some embodiments heat settings and/or printing speed may be increased or decreased to optimize for output quality, productivity, and/or cost. Heat settings and/or print speed may be increased or decreased individually or together, and the increases and/or decreases may be made correspondingly (e.g., increasing both or decreasing both) or inversely (e.g., increasing one and decreasing the other).

Example components and/or consumables which may be changed or varied (e.g., to optimize for output quality, productivity, and/or cost) include print heads, drums, rollers, toner, ink, printing ribbon, printable medium, and any other replaceable parts or consumable items. Those skilled in the art will appreciate that different components and/or consumables and/or combinations thereof may impact output quality (e.g., various scan parameters and/or grade for printed media, such as the overall symbol grade for the indicia), productivity (e.g., printing speed, production rate, useful life of components or devices, maintenance/service schedules), and/or cost (e.g., production costs, component/consumables costs, downtime costs, utilization costs, re-work costs). As such, in some embodiments various components and/or consumables may be changed or varied to optimize for output quality, productivity, and/or cost.

In some embodiments, a trade-off may exist as between one or more of output quality, productivity, and/or cost. Output quality may be decreased in favor of increasing productivity and/or reducing cost. Alternatively, productivity may be decreased and/or cost may be increased, in favor of increasing output quality. As one example, various scan parameters and/or grade for printed media (such as the overall symbol grade for indicia) may decrease because of a change to one or more parameters such as heat settings and/or print speed (e.g., while still maintaining an adequate grade (e.g., overall symbol grade) or other output quality parameters), in favor of increased productivity and/or reduced cost resulting from such change. Alternatively, various scan parameters and/or grade for printed media, such as the overall symbol grade for indicia, may increase because of a change to one or more parameters such as heat settings and/or print speed, resulting in decreased productivity and/or increased cost. As another example, a component and/or consumable may be exchange for a less expensive alternative, resulting in a decrease to output quality (e.g., while still maintaining an adequate grade (e.g., overall symbol grade) or other output quality parameters for printed media and/or indicia), in favor of increased productivity and/or reduced cost resulting from such change. Alternatively, a component and/or consumable may be exchange for a more expensive alternative, resulting in an increase to output quality and/or productivity.

Conversely in some embodiments, various performance objectives (e.g., output quality, productivity, and/or cost) may have a proportional correlation to one another, such that a combination of at least two performance objectives may be improved or optimized correspondingly (e.g., without requiring a tradeoff as between the performance objectives) under a certain configuration or across a certain range of configurations. For example, in some embodiments, optimizing for performance objectives in accordance with the present disclosure may reveal a combination of input parameters which provide: an increase in quality corresponding with an increase in productivity and/or a decrease in cost; and/or an increase in productivity corresponding with an increase in productivity and/or a decrease in cost; and/or a decrease in cost corresponding with an increase in quality and/or an increase in productivity.

In some embodiments, selection of a first component or consumable from among a plurality of alternatives may be correlated to a performance objective associated with a second component or consumable. For example, a selection of a printable medium may yield an increase or decrease in the useful life of a print head (or other performance objective), or a selection of a print head may yield an increase or decrease in output quality (or other performance objective), resulting from printing on a selected printable medium. As another example, a selection of a printing ribbon or ink may yield an increase or decrease in the useful life of a print head (or other performance objective), or a selection of a print head may yield an increase or decrease in output quality (or other performance objective), resulting from printing with a selected printing ribbon or ink. It will be appreciated that similar correlations may be identified with respect to any one or more components/consumables, including print heads, drums, rollers, toner, ink, printing ribbon, printable medium, and any other replaceable parts or consumable items.

Quality Assurance

In some embodiments, the systems and methods disclosed herein may be configured to address quality assurance matters. For example, device information pertaining to verifications obtained from one or more devices, for example one or more devices having a verification system, may be used as evidence as to the nature of the outputs produced by those devices. Such information may be useful in the event of an issue with output quality, such as an output failure, a complaint or other inquiry pertaining to output quality.

Figure 12:
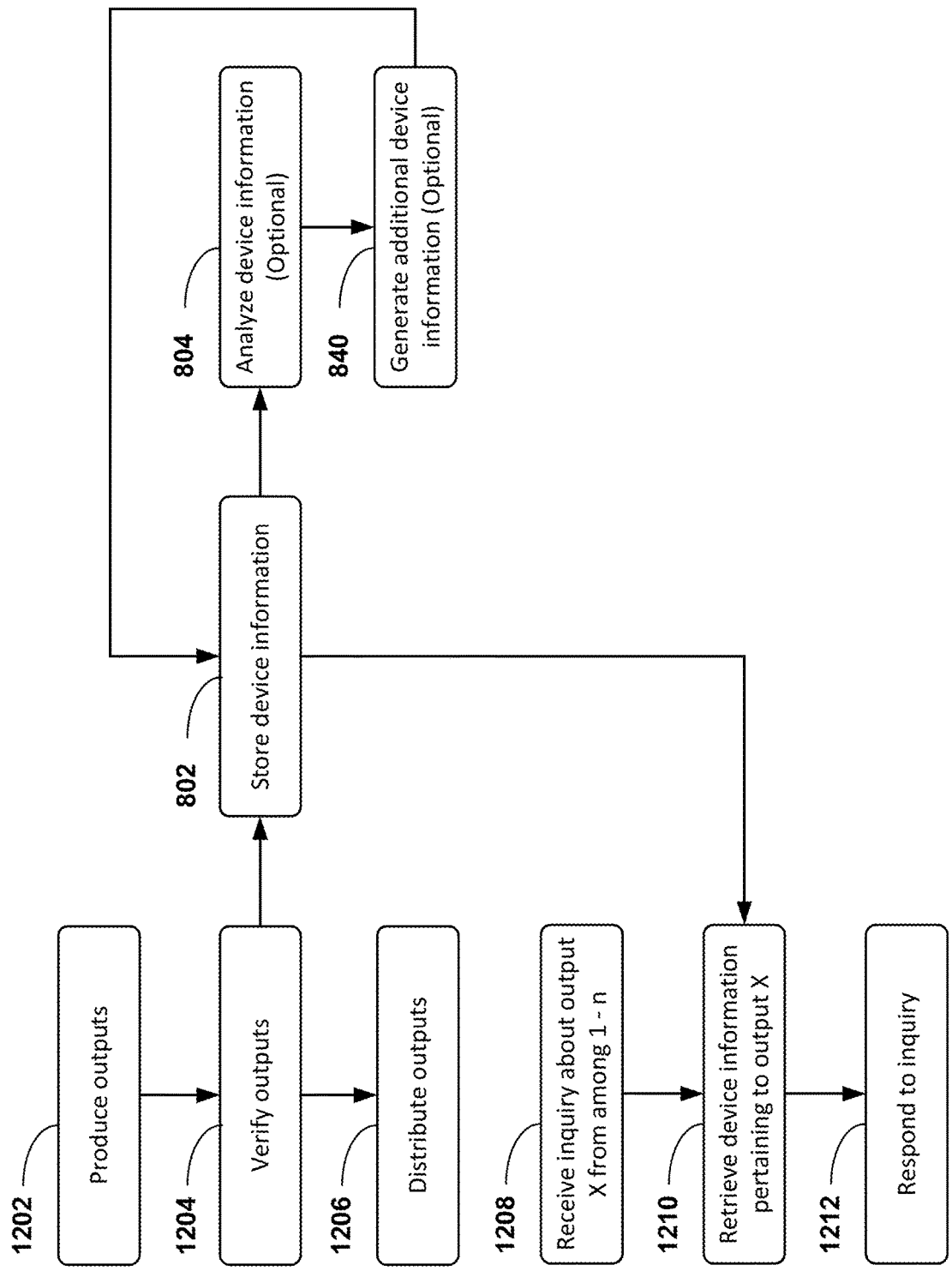
FIG. 12 is a flow chart showing an exemplary embodiment of steps or features configured for addressing quality assurance matters.

With reference to FIG. 12, an exemplary embodiment of steps or features configured for addressing quality assurance matters is shown. In an exemplary embodiment outputs are produced 1202, outputs are verified 1204, and outputs are distributed 1206. In some embodiments, the outputs may be printed media and/or indicia printed on a printable medium. Device information is stored 802, which in an exemplary embodiment includes information pertaining to a plurality of verified outputs (e.g., outputs 1 through N). For example, the information pertaining to verified outputs may include digital images of the printed media and/or indicia (e.g., a digital image of each item of printed media and/or indicia 1 through N). Such verifications may be obtained from a device having a verification system, such as a printer having an inline scanner. As another example, information pertaining to verified outputs may include device information showing that a device or devices have been maintained or services according to a schedule or other requirements. Such device information may include maintenance or service schedules, requirements, and/or records for a device or devices. Optionally, the device information may be analyzed 804, and optionally, additional device information may be generated 840. Such additional device information also may be stored, for example, in memory storage 108. Responsive to receiving an inquiry about an output or outputs 1208 (e.g., an inquiry pertaining to output X, where X is selected from among outputs 1 through N), device information pertaining to the output or outputs is retrieved 1210 from memory storage 108. The device information retrieved may include the verification information obtained by a verification system. When the output is printed media and/or indicia, the device information retrieved may include a digital image of the printed media and/or indicia. The device information retrieved may also include maintenance or service information (e.g., schedules, requirements, and/or records). Additionally, the device information retrieved may include other pertinent information, such as information about what device produced the output, its configuration and settings, quality information, and any other pertinent information as the skilled artisan may desire. A response to the inquiry is then provided 1212. In an exemplary embodiment, a response to an inquiry 1212 may be based on device information. For example, a response to an inquiry 1212 may be to provide device information (optionally including verification information and/or maintenance or service information) as evidence of the nature of the output or outputs to which the inquiry pertains. In some embodiments, the response to the inquiry may be to send device instructions 806 in accordance with the present disclosure. For example, the inquiry 1208 and/or the device information having been retrieved in response to the inquiry 1212 may for the basis for sending device instructions 806.

Introducing Standby Devices into Workflow Environments

Figure 13:
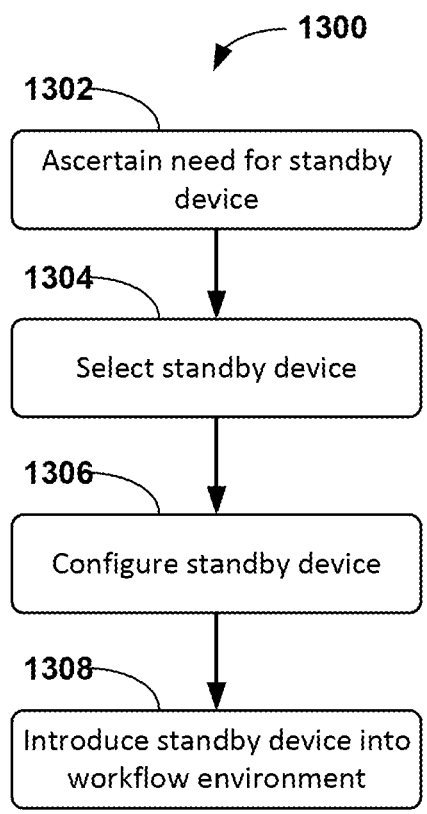
FIG. 13 is a flow chart showing yet another embodiment of steps or features configured for managing a fleet of devices.

Various embodiments of the present disclosure embrace systems and methods for managing a fleet of devices, including systems and methods for introducing a standby device into a workflow environment, and for performing jobs in a workflow environment. With reference to FIG. 13, some embodiments of these systems and methods 1300 may include any one or more steps or features configured for: ascertaining when a standby device is needed, or may become needed, for a job in a workflow environment 1302; selecting a standby device from among a plurality of standby devices 1304; configuring a standby device for a job in a workflow environment 1306; and/or introducing a standby device into a workflow environment 1308.

Triggering Events

Generally, a current or potential need for a standby device may arise at an unexpected or unpredictable time, for example, when a workflow device experiences a failure or when additional capacity is needed to meet unanticipated productivity fluctuations or production requirements in a workflow environment. However, sometimes a need for a standby device can be predicted or otherwise known in advance, in which case downtime for a workflow device can be scheduled. For example, a need for a standby device can be triggered when a workflow device has an upcoming maintenance requirement (e.g., replacement of components that tend to wear out), when a service interval becomes due (e.g., clean the device, refill supplies, or recharge batteries), or when fluctuating production requirements are pre-planned. Accordingly, in some embodiments one or more devices on a device network are configured to ascertain a triggering event, indicating a current or potential need for a standby device. Such a triggering event may correspond to any one or more events indicating a current or potential need for a standby device, including expected or unexpected events and predictable or unpredictable needs.

With reference to FIG. 14, exemplary triggering events are shown. Any one or more triggering events may be utilized with various embodiments of the methods disclosed herein. The exemplary triggering events shown in FIG. 14 include triggering events ascertained by a workflow device, triggering events ascertained by a standby device, triggering events corresponding to an input from a user, and/or triggering events ascertained by a server. It will be appreciated the various triggering events shown in FIG. 14 may be ascertained by either one or more of a workflow device, a standby device, or a server, and/or may correspond to an input from a user, and such triggering events are not exclusive to any one source. Additionally, other triggering events will be appreciated by those skilled in the art, all of which are within the spirit and scope of the present disclosure.

For example, in some embodiments a triggering event may be ascertained by a workflow device. The workflow device may then communicate the existence of the triggering event to one or more standby devices. As shown in FIG. 14, triggering events ascertained by a standby device may include a change in status, such as a device failure or scheduled downtime. A device failure may include a general failure or a physical failure such as a damaged or worn-out component, a software failure, or a loss of connectivity in respect of another workflow device, a standby device, or another device or resource on a device network. Scheduled downtime may include a maintenance requirement, or a service interval becoming due. A loss of connectivity includes both known and unknown reasons for the loss of connectivity.

Additionally, or in the alternative, a triggering event may be ascertained by a standby device. A triggering event ascertained by a standby device may include any of the triggering events ascertained by a workflow device. For example, in some embodiments one or more standby devices monitor communications sent by one or more workflow devices, and ascertain based on that communication that a standby device is needed or may become needed for a job in the workflow environment. This may also include ascertaining a loss of connectivity with a workflow device, for example, as indicated by the workflow device having communicated an offline status message or from a period of time having gone by without having received a communication from the workflow device. A standby device also may ascertain a current or potential need for a standby device independently from any communications from other devices, for example, by calculating a passage of time corresponding to scheduled downtime for a workflow device, such as a maintenance requirement or a service interval; or production requirements. Additionally, a standby device may ascertain a triggering event based on information from other sources, such as information from a server or information from a user input. For example, a server may communicate information pertaining to production requirements or scheduled downtime for workflow devices.

Additionally, in some embodiments triggering event may correspond to a user input. Such user input may be in the form of pressing a button or otherwise selecting on a user interface, either on a workflow device, a standby device, or any other interface associated with a device network.

A triggering event indicating a current or potential need for a standby device may include any one or more of the foregoing examples. Additionally, a triggering event may be based on a wide variety of other indicators which will be apparent to those skilled in the art in view of the present disclosure.

Selecting the Standby Device

In some embodiments, a device network includes a plurality of standby devices and it will therefore sometimes be necessary to select a standby device from among the plurality. The selected standby device can then be configured as required and introduced into the workflow environment. The skilled artisan will appreciate that a standby device may be selected from among a plurality of standby devices based on any one or more appropriate factors. For example, a standby device may be selected from among a plurality of standby devices based on: whether the standby device is configurable to perform a job; whether and the extent to which the standby device requires configuration (e.g., to install firmware, software/apps, apply settings); whether the standby device is presently available for use or whether the standby device has been allocated to or reserved for other purposes; a period of time remaining until the device becomes due for a maintenance requirement or a service interval or other scheduled downtime; the age or generation of the device; or other factors which may be useful or desirable. In some embodiments, there may be only a single option from among the plurality of standby devices, for example, when only one of the standby devices is available or compatible for a given job in a workflow environment. Additionally, in some embodiments a device network may have only a single standby device, in which case there would be no alternatives to choose from.

The selection of a standby device may be carried out by a user, by a workflow device, or by a standby device. For example, a user may choose a standby device from a menu of options on a user interface or by pressing a button on a keypad. A user may make such a selection from a workflow device, the workflow device then communicating such selection to the selected standby device. Additionally, or alternatively, a user may select a standby device on a user interface, such as an interface for the standby device being selected, an interface for a workflow device being removed from the workflow environment, or a separate interface.

In some embodiments, a workflow device may automatically choose a standby device based on one or more predefined factors, such as those mentioned above. For example, a workflow device may identify the presence of one or more standby devices on a device network, and then choose a standby device from among those identified. In some embodiments, a workflow device may choose a standby device from among a plurality based on the standby device having been designated as a primary standby device. In some embodiments, a standby device may be selected by a user, for example via a user interface associated with one or more standby devices. Such a selection by a user may be utilized, for example, in the event of a loss of connectivity that renders features configured for automatic selection of a standby device inoperable.

Additionally, or in the alternative, a standby device may ascertain an order of selection from among a plurality of standby devices, as for any one or more workflow devices on a device network. Such order of selection may be based on any one or more predefined factors, such as those mentioned above. For example, in some embodiments, a first standby device may ascertain that it is available and configurable to perform a first job presently allocated to a first workflow device, and that based on one or more predefined factors, no other standby devices have priority with respect to the first job allocated to the first workflow device. The first standby device would then self-select when ascertaining a current or potential need with respect to the first job allocated to the first workflow device.

Furthermore, in some embodiments a second standby device may ascertain that it is available and configurable to perform the first job, and also available and configurable to perform a second job presently allocated to a second workflow device, and that based on one or more predefined factors, the first standby device has priority over the second standby device with respect to the first job allocated to the first workflow device, and that the second standby device has priority over the first standby device with respect to the second job allocated to the second workflow device. The second standby device would then self-select when ascertaining a current or potential need with respect to the second job. Additionally, the second standby device would then self-select over the priority allocated to the first standby device when the second standby device ascertains that the first standby device is unavailable (e.g., in the event of the device being offline or in the event of a device failure).

In some embodiments, a device network having a plurality of standby devices may include a primary standby device and at least one additional standby device, and the primary standby device may select a standby device from among the plurality, to be introduced into the workflow environment, based on any one or more factors disclosed herein. For example, a device network may include a first standby device, a second standby device, and a third standby device, in which the first standby device has been designated the primary standby device. The primary standby device may select the second standby device over the third standby device, such that the second standby device would be introduced into the workflow environment. In addition, or alternatively, the primary standby device may self-select, such that the primary standby device itself would be introduced into the workflow environment over the second standby device and the third standby device. Further, a standby device may be selected by a user (e.g., via a user interface associated with one or more standby devices), for example, in the event of a loss of connectivity that renders features configured for automatic selection of a standby device inoperable. The selection may be based on any one or more considerations, such as what jobs have been assigned to the respective devices and which of the devices are configurable to perform those jobs, performance objectives such as output quality, productivity, or cost associated with respective devices, or other considerations in accordance with the present disclosure. Other considerations will be apparent to those skilled in the art.

In some embodiments, a standby device may be selected in advance, prior to a triggering event, to be introduced into a workflow environment upon the occurrence of a given triggering event. For example, as shown in FIG. 4, a first standby device 412 shows as being available for all of the workflow devices 400 on the device network, and as such has been designated as the primary standby device. Accordingly, when a triggering event occurs with respect to the device network 400 of FIG. 4, the first standby device 400 will be selected. As shown in FIG. 5, a first standby device 512 shows as being available for workflow devices 1-100, and as such has been designated as the primary standby device as to those devices; and a second standby device 514 shows as being available for workflow devices 101-250, and as such has been designated as the primary standby device as to those devices. Accordingly, the device network 500 of FIG. 5, the first standby device 512 will be selected when a triggering event occurs with respect to one of workflow devices 1-100, and the second standby device 514 will be selected when a triggering event occurs with respect to one of workflow devices 101-250.

Configuring the Standby Device

In some embodiments, a standby device may require configuration before introducing the standby device into a workflow environment. Configuration may include installing firmware, installing software/applications, and/or configuring settings of the standby device. For example, a standby device may have a configuration that differs from what is required or preferred to carry out a job in a workflow environment, and/or from what is required or preferred by a user. In such instances the standby device can be configured accordingly. Generally, configuring a standby device includes applying a configuration to the standby device according to requirements or preferences corresponding to a job in a workflow environment and/or a user profile. In some embodiments, configuring a standby device includes replicating a workflow device on a standby device, for example, configuring the standby device so that the standby device and the workflow device each have the same version of firmware, software, and/or application, and/or the same settings and/or user profile. Additionally, or in the alternative, configuring a standby device also may include applying a configuration to a standby device so that the standby device will be operable to perform a job in a workflow environment, such as a job assigned to the workflow device.

In some embodiments, it may be infeasible to replicate a workflow device on a standby device. For example, a workflow device may have a configuration which is incompatible with the standby device, but in some of those instances there may be a different configuration whereby the standby device would be operable to perform a job assigned to the workflow device. This may occur, for example, when a standby device is not backwards-compatible with a workflow device, but the standby device may nevertheless be configurable for a job in the workflow environment. Conversely, in some embodiments, a standby device may already have a configuration that accords to requirements or preferences corresponding to a job in a workflow environment and/or a user profile. For example, a standby device may have been previously configured, and in some instances, introduced into a workflow environment and then subsequently returned to standby status, or a standby device may have been pre-configured prior to having been introduced to standby status.

In some embodiments, a standby device has a default configuration. The default configuration may be selected by the skilled artisan, for example, to accommodate one or more configurations of workflow devices. The default configuration may be selected to allow the standby device to be introduced into a workflow environment in place of a maximum or optimum number of workflow devices having different configurations. The default configuration also may correspond to a configuration of a workflow device, for example, when a plurality of workflow devices is provided, each having a configuration that is the same or similar to one another, a standby device may be provided with a default configuration corresponding to such configuration of the plurality of workflow devices. The default configuration may be a replica of the configuration applied to one or more workflow devices, and/or a configuration otherwise according to requirements or preferences corresponding to a job in a workflow environment and/or a user profile.

When a standby device has a default configuration corresponds to some, but not all, of a plurality of workflow devices with respect to which the standby device is available and configurable, the default configuration can be superseded or overwritten as needed to configure the standby device accordingly. In some embodiments, a default configuration may be automatically updated as and when defaults change, for example, to update a standby device configuration with new firmware, software, applications and/or settings as the defaults for those items change over time. Example settings may include, for example, settings associated with: the device network, one or more devices on a device network, a workflow, one or more jobs in a workflow, a user, a group of users, and/or user preferences. For printers, settings may include, for example, settings associated with media dimensions, printing quality, printing speed, and/or special printing command languages. For scanners, settings may include, for example, settings associated with interface compatibility, symbology, terminal type, control characters, packet mode, access point links, and/or feedback (visual, audible, tactile). Such defaults may be changed over time, for example, to keep the standby devices up to date with changes in configurations to workflow devices. For example, a standby device may be updated with a new default configuration so as to correspond to those workflow devices for which the standby device has been designated as the primary standby device (e.g., FIGS. 2 and 3), or so that the default configuration would correspond to the configuration for a majority of workflow devices on a device network and/or those devices otherwise most likely to invoke a triggering event. Accordingly, in some embodiments a default configuration may be provided as to one or more standby devices which corresponds to a configuration of one or more workflow devices, so that such standby devices will not require configuration (or further configuration may be minimized) in the event of a triggering event corresponding to those workflow devices.

In some embodiments, one or more devices on a device network automatically perform all or some of the steps for configuring a standby device. In some embodiments, configuration data corresponding to a workflow device is sent to a standby device. Such configuration data may include a firmware installation file, a software installation file, an application installation file, and/or settings information. The configuration data may be sent to a standby device in response to a trigger event, in response to a standby device having ascertained the presence of new configuration data, in response to the standby device having been selected for a job in a workflow environment, and/or a user input.

Configuration data corresponding to a workflow device may be housed in memory storage 108 (FIGS. 1-10). Memory storage 108 may be located within any one or more of the workflow devices or standby devices on a device network, and/or may be an external storage device (e.g., external flash memory) directly connected to any one or more of the workflow devices or standby devices. Additionally, or in the alternative, memory storage 108 may be an external storage device accessible on a device network.

The workflow device may be configured to send configuration data to a standby device, for example, in response to a trigger event corresponding to the workflow device, or upon the workflow device having selected the standby device for a job in a workflow environment, and/or a user input. The standby device may then automatically apply the configuration data thereby updating its own configuration and or a configuration of another standby device, in each case for example, installing firmware, software, and/or software, and applying settings according to settings information. The standby device may extract configuration data from memory storage 108, which may be located within any one or more of the workflow devices or standby devices on a device network, and/or may be an external storage device (e.g., external flash memory) directly connected to any one or more of the workflow devices or standby devices.

In some embodiments, a first standby device 412 is provided having memory storage 108 associated therewith, and housed within the memory storage is configuration data corresponding to one or more workflow devices. When a triggering event occurs, the first standby device 412, in this instance designated as the primary standby device, identifies a standby device to be introduced into the workflow environment and configures the identified standby device according to the appropriate configuration data housed in memory storage. The identified standby device may be the first standby device 412 (FIG. 7), or a second standby device 414 (not shown). As shown in FIG. 7, the third standby device 416 would not be identified for introduction into the workflow environment in place of the second workflow device 406 because the third standby device shows as being available only for workflow devices 26-50, and not the second workflow device.

Figure 15:
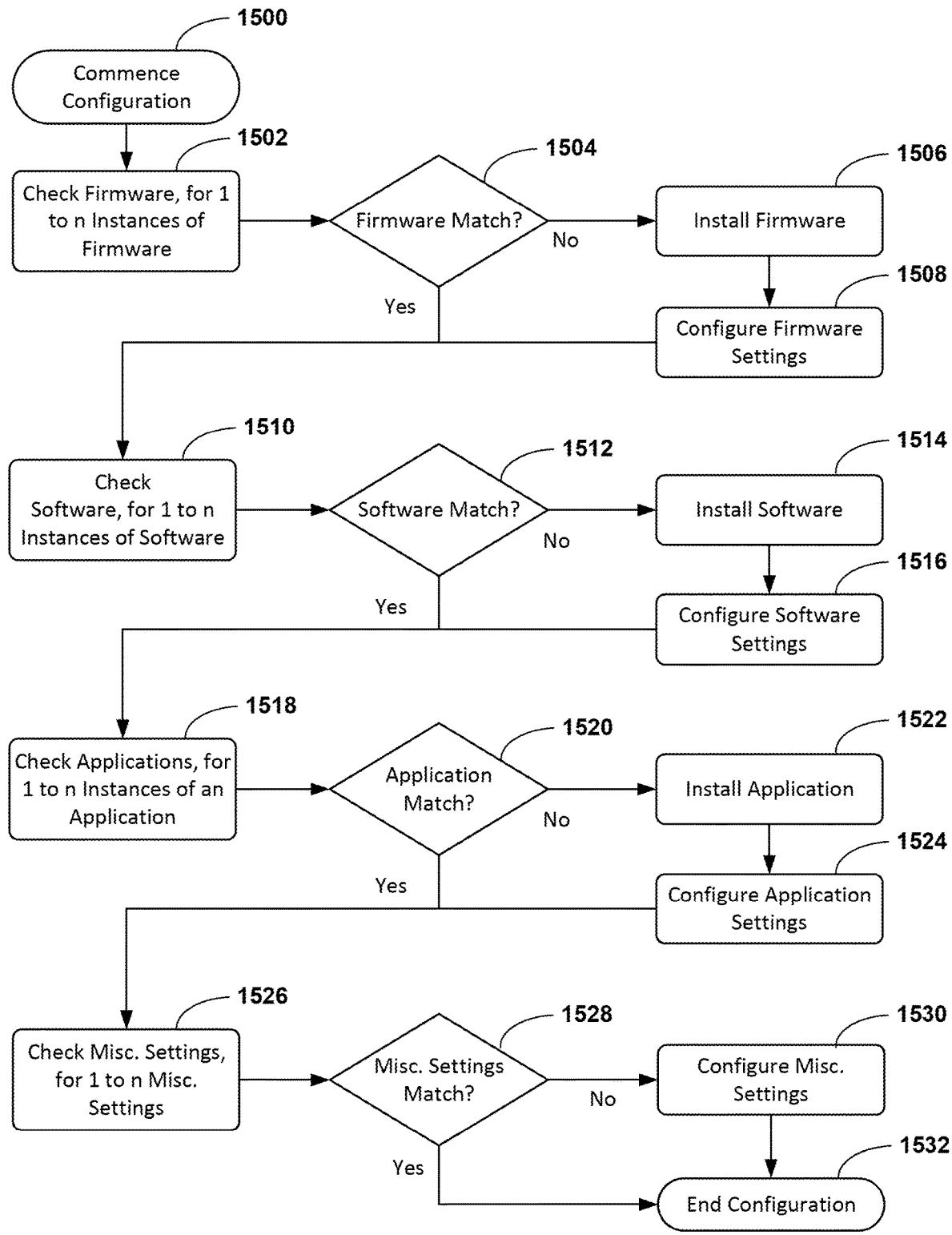
FIG. 15 schematically depicts an exemplary sequence of steps or features for configuring a standby device for introducing a standby device into a workflow environment.

With reference to FIG. 15, an exemplary flowchart is shown, depicting a sequence of steps for configuring a standby device. The configuration sequence may be commenced 1500 at any time, such as automatically in response to a trigger event, in response to a standby device having ascertained the presence of new configuration data, in response to the standby device having been selected for a job in a workflow environment, and/or in response to a user input. The standby device may be configured to carry out the configuration sequence autonomously, such as by self-executing installation files.

As shown in FIG. 15, the configuration sequence begins by checking the firmware 1502. The configuration data may contain multiple instances of firmware which may correspond to different functionalities of the device. Each instance of firmware in the configuration data is compared to the firmware presently installed on the standby device 1504. When an instance of firmware does not match, the firmware in the configuration data will be installed on the standby device 1506 and the firmware settings will be configured 1508. The configuration sequence proceeds to check each instance of software 1510, comparing the software presently installed on the standby device to the software in the configuration data 1512. When an instance of software in the configuration data does not match the instance installed on the standby device, the instance of software in the configuration data will be installed 1514, and the software settings will be configured 1516.

The configuration sequence further proceeds to check each application 1518, comparing each application presently installed on the standby device to the application in the configuration data 1520. When an application in the configuration data does not match the application installed on the standby device, the application in the configuration data will be installed 1522, and the application settings will be configured 1524. The configuration sequence further proceeds to check miscellaneous settings (e.g., settings other than firmware settings, software settings, or application settings, already having been configured) 1526, comparing each miscellaneous setting of the standby device to the settings information in the configuration data 1528. When a setting provided for by settings information in the configuration data does not match the corresponding setting of the standby device, the setting will be configured according to the settings information in the configuration data 1530. After proceeding through all of installations and settings, the configuration sequence will end 1532.

Introducing the Standby Device

Figure 16:
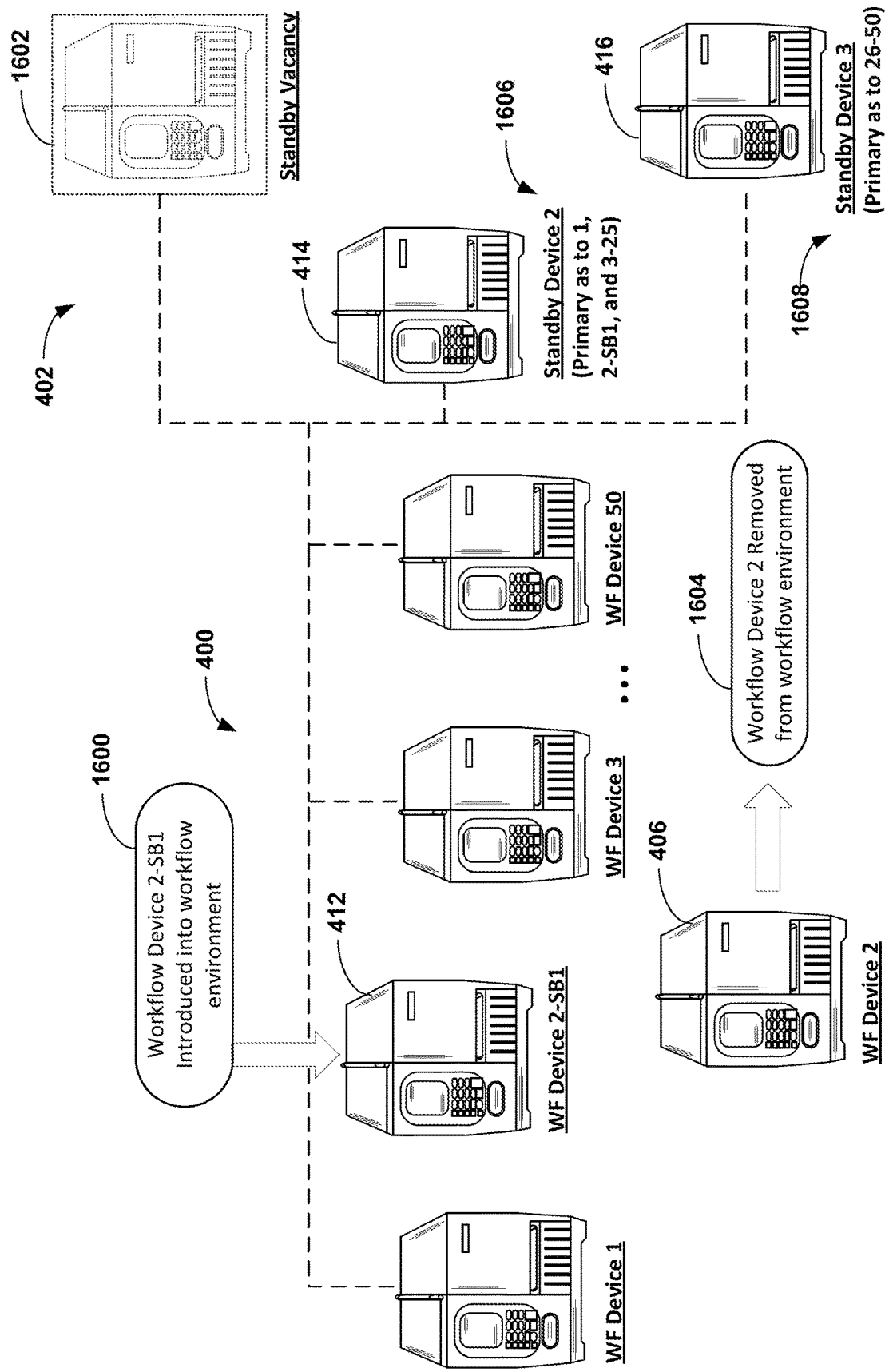
FIG. 16 schematically depicts a standby device having been introduced into a workflow environment, in place of a workflow device having been removed from the workflow environment.

In some embodiments, a standby device may need to be introduced into a workflow environment before the standby device begins performing a job in the workflow environment. With reference to FIG. 16, a standby device has been introduced into the workflow environment of FIG. 4 in place of a workflow device having been removed from the workflow environment. As shown in FIGS. 4 and 16, a plurality of workflow devices 400 and one or more of standby devices 402 are provided. A first standby device 412 has been designated as the primary standby device. Alternatively, one of the other standby devices (e.g. a second standby device 414) may be designated as the primary standby device (not shown). As shown in FIG. 16, the first standby device 412 has been introduced into the workflow environment 1600 (with newly assigned identity "Work Flow Device 2-SB1"), leaving a standby vacancy 1602. The first standby device has been introduced in place of a workflow device 406 having been removed from the workflow environment 1604. A second standby device is then designated as the primary standby device, the previous primary standby device 412 (i.e., the first standby device) having been introduced into the workflow environment. In some embodiments, for example, as shown in FIG. 16, a plurality of standby devices may be designated as a primary standby device, each as to a respective subset of workflow devices on a device network. As more particularly shown in FIG. 16, a second standby device 414, which is shown as being available for workflow devices 1-25 (FIG. 4), has now been designated as the primary standby device for workflow devices 1, 2-SB1, and 3-25 1606, and a third standby device 416, which is shown as being available for workflow devices 26-50, has been designated as the primary device for those workflow devices 1608.

In some embodiments, the first standby device 412 may have been identified for introduction into the workflow environment by based on its availability for the second workflow device 406. Alternatively, the second standby device 414 may have been identified (not shown) as also being available for the second workflow device. A determination as between the first standby device and the second standby device may be carried out by the primary standby device, in this case, the first standby device 412. Alternatively, when the second standby device 414 is designated as the primary standby device (not shown), the second standby device may identify the first standby device 412 or the second standby device 414 for introduction into the workflow environment.

Introducing the first standby device 412 (or alternatively the second standby device 414) into the workflow environment may include assigning the standby device a new IP address corresponding to the job in the workflow environment. In some embodiments, the standby device 412 may be located in an area separate from the workflow environment, such as a standby station, and a user may need to physically obtain the standby device and bring it to the workflow environment. For example, one or more standby devices 402, such as printers (e.g., label printers or barcode printers) or handheld scanners (e.g., RFID scanners or barcode scanners), may be placed on standby status in a convenient location nearby a workflow environment, such as in a break room. Alternatively, the one or more standby devices 402 may be staged in a workflow environment, where the standby devices can immediately begin performing a job upon having been introduced into the workflow environment. For example, one or more standby devices 402, such as printers (e.g., label printers or barcode printers) or handheld scanners (e.g., RFID scanners or barcode scanners), may be staged on standby status alongside one or more workflow printers, such that the standby device may begin performing a job without needing to be physically moved into position in a workflow environment.

Figure 17:
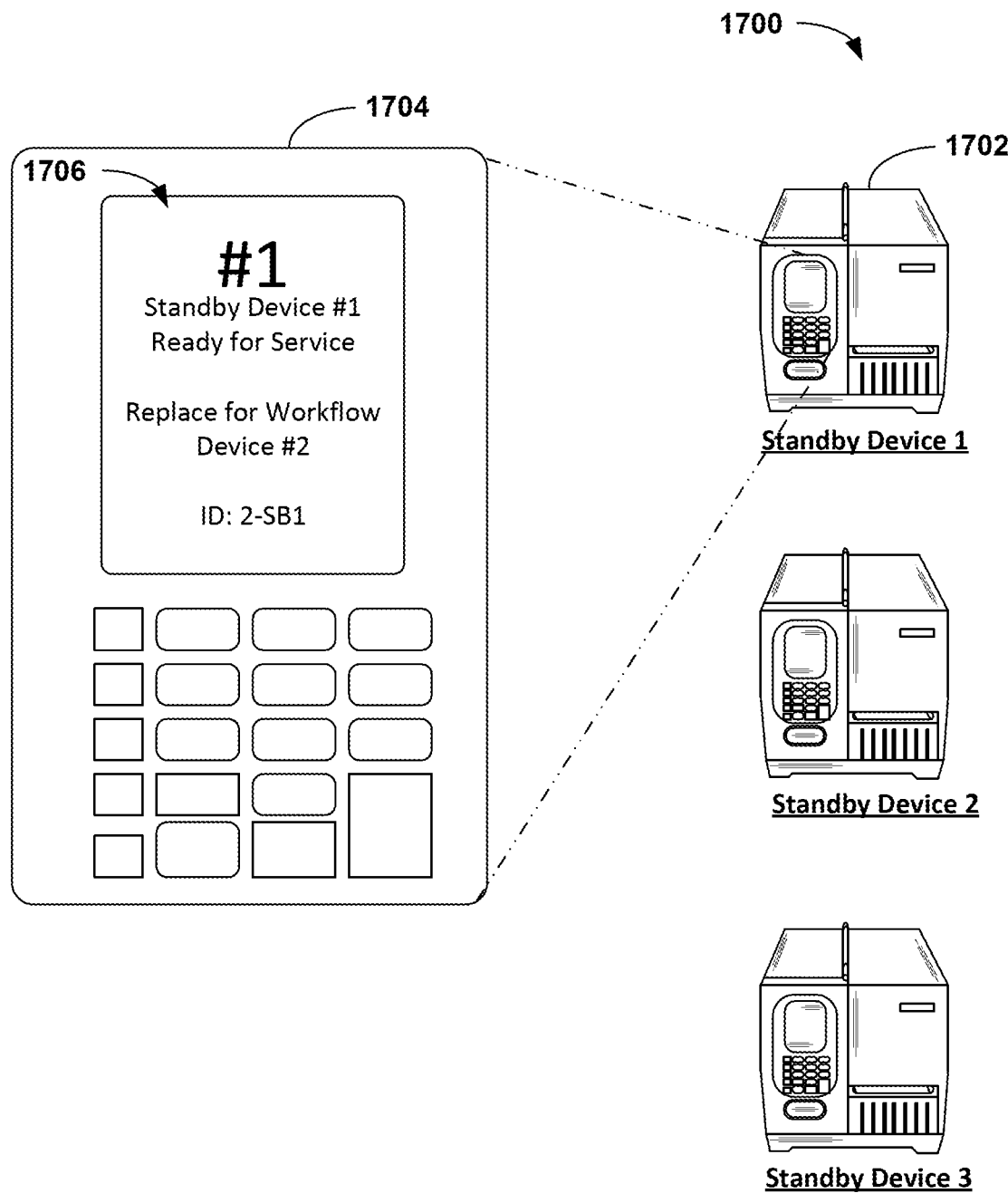
FIG. 17 shows an exploded view of one embodiment of a graphical user interface of a standby device, indicating that the standby device is ready to be introduced into a workflow environment.

In some embodiments, one or more devices on the device network automatically perform all or some of the steps for introducing a standby device into a workflow environment. For example, a standby device may be configured to reboot and assign itself a new IP address corresponding to a job in the workflow environment. In some embodiments, the IP address may be assigned by a server 106 (FIGS. 1-9) on the device network. The standby device may also be configured to provide an indication to a user that the standby device has been or is ready to be introduced into the workflow environment. For example, FIG. 17 shows an exemplary indication to a user. A plurality of standby devices 1700 is provided, and from among the plurality a first standby device 1702 is being introduced into a workflow environment. The standby device 1702 includes a user interface 1704, which provides an indication 1706 to the user. The indication may be configured to provide various information to the user, for example, to inform the user that the standby device is ready for service, which workflow device the standby device is to replace, and the new identify for the device in the workflow environment. In some embodiments, the user may simply begin using the standby device in the workflow environment, or alternatively, a user input may be required to complete the process of introducing the standby device into the workflow environment such as by moving the device into position.

Managing the Fleet

Figure 18:
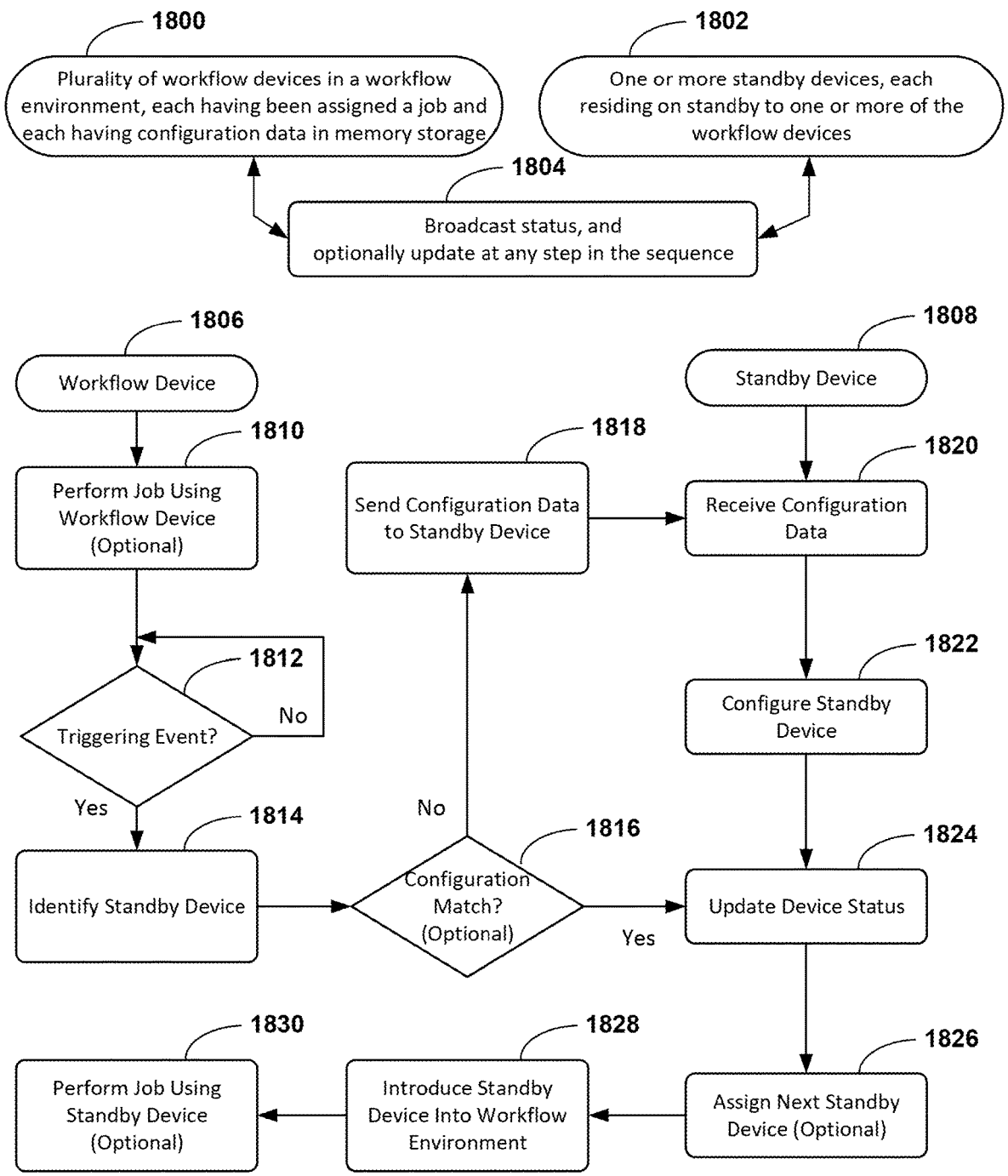
FIG. 18 is a flow chart showing one embodiment of steps or features configured for managing a fleet of devices, additionally embracing one embodiment of steps or features for configuring a standby device for a job in a workflow environment, and one embodiment of steps or features for performing a job in a workflow environment.

With reference to FIG. 18, an exemplary method of managing a fleet of devices in accordance with the present disclosure is shown. In this exemplary embodiment, a device network is provided, and residing on the network are a plurality of workflow devices 1800, each having been assigned a job in a workflow environment, and a one or more standby devices 1802, each residing on standby to one or more of the workflow devices. The plurality of workflow devices may each have configuration data in memory storage, and in some embodiments, the configuration data stored in one workflow device differs in at least one respect from configuration data stored in at least one additional workflow device. The configuration data may include a firmware installation file, a software installation file, an application installation file, and/or settings information. In some embodiments, one or more standby devices may be set to standby mode, with a default configuration corresponding to one or more of the plurality of workflow devices. The default configuration may include firmware, software, applications, and settings corresponding to a predetermined standby configuration.

In the exemplary embodiment of FIG. 18, a device network includes one or more workflow devices which are in communication with one or more standby devices, for example, periodically broadcasting status information to one another 1804. The devices may broadcast status updates at any step in the sequence shown in FIG. 18. Optionally, workflow devices may be in communication with one another, and/or standby devices may be in communication with one another. In some embodiments, one or more standby devices each broadcast status information to at least one of the plurality of workflow devices. The status information may include an identity, a location, and a status indicating availability of the standby device, e.g., for replicating. For example, the standby devices may broadcast their standby status with their unique communications address to the one or more workflow devices, and each workflow device will know of the existence of the one or more standby devices, and their respective addresses. Where the one or more standby devices includes a primary standby device as to one or more of the workflow devices, the status as a primary standby device will also be communicated to at least those workflow devices.

The device network includes a workflow device 1806 and a standby device 1808. Optionally, the workflow device 1806 may perform a job in a workflow environment 1810; however, the sequence in FIG. 18 may also commence prior to the workflow device having performed a job. When the workflow device ascertains a triggering event 1812 (e.g., an exemplary triggering event from FIG. 14), the workflow device identifies a standby device 1808 to be introduced into the workflow environment 1814. In some embodiments, the standby device may be identified based on status information communicated by the one or more standby devices. In some embodiments, the workflow device identifies the standby device over at least one additional standby device based on a first job having been assigned to the workflow device, and the standby device has been identified as being configurable to perform the first job.

Optionally, the workflow device 1806 or the standby device 1808 may ascertain whether the standby device has a configuration that matches the configuration of the workflow device, or whether the standby device otherwise requires any configuration data 1816. When the configuration data matches and/or the standby device does not otherwise require any configuration data, for example, when the standby device configuration is a replica of the workflow device configuration, the standby device status is updated 1824, and the standby device is introduced into the workflow environment 1828.

When the standby device 1808 has a configuration that does not match the configuration of the workflow device, or when the standby device otherwise requires some configuration data 1816, the workflow device then sends the appropriate configuration data to the standby device 1818. Alternatively, when omitting the optional step of ascertaining whether the standby device has a configuration that matches the configuration of the workflow device or whether the standby device otherwise requires any configuration data, the workflow device sends the appropriate configuration data to the standby device after the standby device has been identified 1814. The configuration data may be sent automatically in response to the triggering event, or a user may initiate the sending of configuration data. Optionally, the step of sending some or all of the configuration data may be omitted, for example, when the standby device standby device already has a configuration that accords to requirements or preferences corresponding to a job in a workflow environment and/or a user profile, even though the configuration data does not match precisely (not shown). In some embodiments, the configuration data sent to the standby device differs from configuration data stored in memory of at least one other workflow device from among the plurality. The configuration data may correspond to a first job assigned to the workflow device, and in some embodiments, the first job may differ in at least one respect from a second job assigned to one of the other workflow devices.

A first job and a second job may be any two jobs. As an example, for printers, a first job and a second job may include, respectively: printing a first type of labels and printing a second type of labels; printing media for a first production line and printing media for a second production line; printing as requested by a first user and printing as requested by a second user. As a further example, for scanners, a first job and a second job may include, respectively: scanning barcodes having a first symbology and scanning barcodes having a second symbology; scanning materials for a first production line and scanning materials for a second production line; scanning as requested by a first user and scanning as requested by a second user. Further examples are discussed below.

The standby device receives the configuration data 1820 (e.g., a firmware installation file, a software or application installation file, and/or settings information), optionally communicating to other devices that it is no longer available as a standby device to the other workflow devices (not shown), and then the standby device configures itself accordingly 1822, including for example, installing firmware, installing software, installing applications, and/or configuring settings of the standby device according to settings information. Preferably, following the standby device having been configured, the standby device will have a configuration that is a replica of the configuration for the workflow device. In some embodiments, the standby device 1808 is configured to perform a job that was assigned to the workflow device 1806.

Upon having been configured, the status of the standby device is updated 1824, and optionally, a next standby device is assigned as a primary standby device 1826. For example, as shown in FIG. 4, the first standby device 412 is designated as the primary standby device, and as shown in FIG. 16, has been introduced into the workflow environment. Accordingly, the second standby device 414 and/or the third standby device 416 may be designated as a primary standby device (FIG. 16). The standby device 1808 is then introduced into the workflow environment 1828, and optionally, the standby device 1808 may begin performing an assigned job in the workflow environment 1830, which may include performing the job assigned to the workflow device 1806, and/or a different job.

In some embodiments, configuration data corresponding to multiple different workflow devices and/or multiple workflow devices having different configurations are housed in memory storage 108 (FIGS. 1-9; not shown in FIG. 18). In some embodiments, the memory storage may be an external memory storage device, such as a memory storage device directly connected to the standby device 1808. Alternatively, in some embodiments, each standby device may have memory storage 108 housed therein. In some embodiments, configuration data corresponding to multiple different workflow devices and/or multiple workflow devices having different configurations may be housed in memory storage of each of the standby devices. Alternatively, in some embodiments, such configuration data may be transferred or copied to the next standby device having been assigned 1826, and/or the memory storage directly connected to the standby device 1808 may be disconnected therefrom and then connected to the next standby device.

Optionally, the standby device 1808 may provide an indication to a user, for example, as shown in FIG. 17. Optionally, the workflow device 1806 may be removed from the workflow environment, for example, when the standby device is introduced into the workflow environment in substitution for the workflow device.

Figure 19:
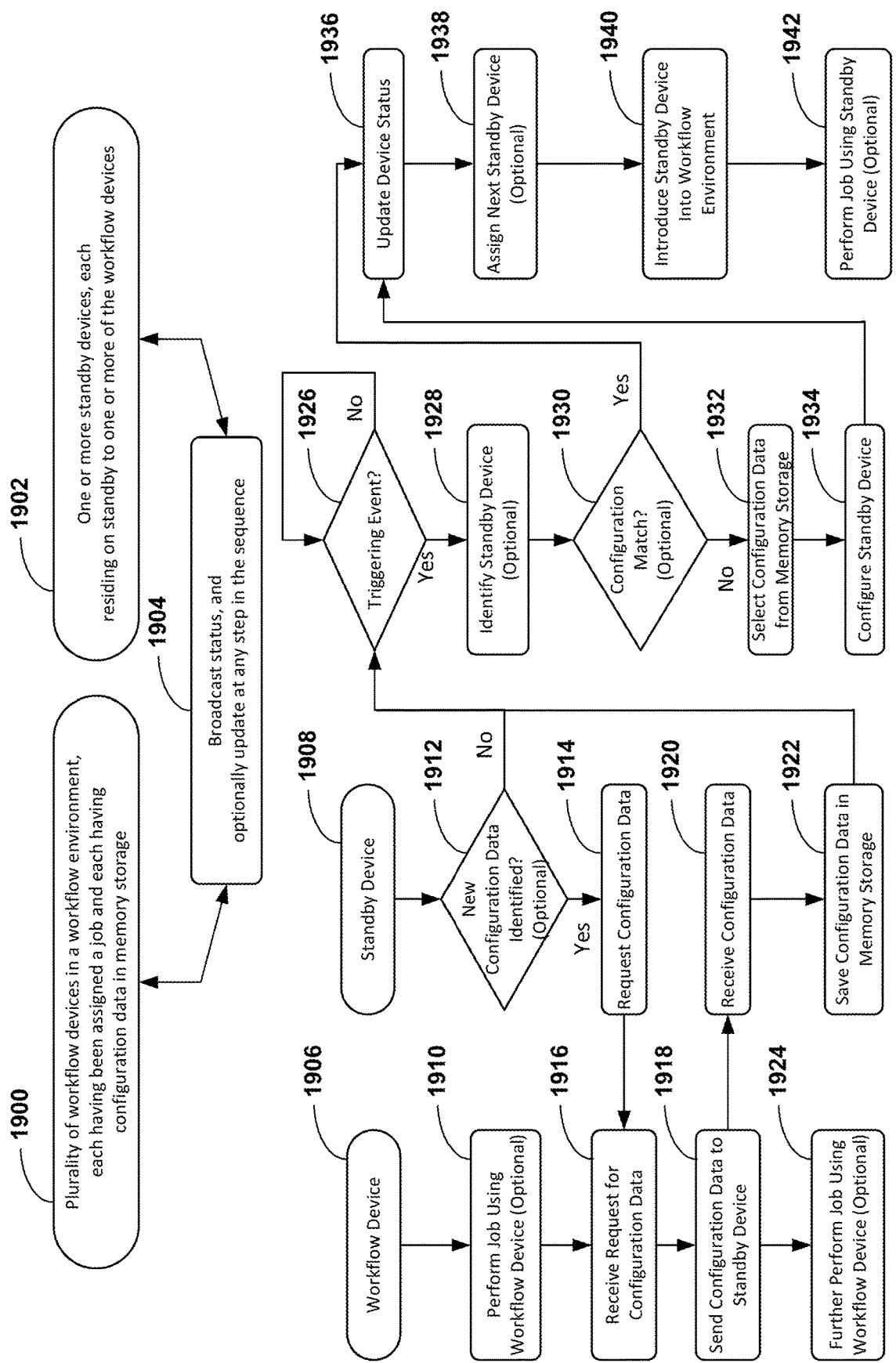
FIG. 19 is a flow chart showing another embodiment of steps or features configured for managing a fleet of devices, additionally embracing another embodiment of steps or features for configuring a standby device for a job in a workflow environment, and another embodiment of steps or features for performing a job in a workflow environment.

With reference to FIG. 19, an additional exemplary method of managing a fleet of devices in accordance with the present disclosure is shown. In this exemplary embodiment, a device network is provided, and residing on the network are a plurality of workflow devices 1900, each having been assigned a job in a workflow environment, and a one or more standby devices 1902, each residing on standby to one or more of the workflow devices. Optionally, a workflow device may be configured to announce its presence on the device network and sent its configuration data to be housed in memory storage 108, for example, when the workflow device is first added to the device network. The plurality of workflow devices may each have configuration data in memory storage, and in some embodiments, the configuration data stored in one workflow device differs in at least one respect from configuration data stored in at least one additional workflow device. The configuration data may include a firmware installation file, a software installation file, an application installation file, and/or settings information. In some embodiments, one or more standby devices may be set to standby mode, with a default configuration corresponding to one or more of the plurality of workflow devices. The default configuration may include firmware, software, applications, and settings information corresponding to a predetermined standby configuration.

Optionally, a workflow device may be configured to identify a standby device from among the one or more standby devices 1902 to be introduced into the workflow environment upon the occurrence of a triggering event. Additionally, or in the alternative, a standby device may be configured to identify a workflow device from among the plurality of workflow devices 1900, for which the standby device will serve in a standby capacity. In some embodiments, a primary standby device may be configured to assign one or more other standby devices to serve in a standby capacity to one or more workflow devices.

In the exemplary embodiment of FIG. 19, a device network includes one or more workflow devices which are in communication with one or more standby devices, for example, periodically broadcasting status information to one another 1904. The devices may broadcast status updates at any step in the sequence shown in FIG. 19. Optionally, workflow devices may be in communication with one another, and/or standby devices may be in communication with one another. In some embodiments, one or more standby devices each broadcast status information to at least one of the plurality of workflow devices. The status information may include an identity, a location, and a status indicating availability of the standby device, e.g., for replicating. For example, the standby devices may broadcast their standby status with their unique communications address to the one or more workflow devices, and each workflow device will know of the existence of the one or more standby devices, and their respective addresses. Where the one or more standby devices includes a primary standby device as to one or more of the workflow devices, the status as a primary standby device will also be communicated to at least those workflow devices.

As shown in FIG. 19, the device network includes a first workflow device 1906 and a first standby device 1908. Optionally, the first standby device 1908 may be a primary standby device (FIGS. 4 and 5). In addition to the first standby device 1908, the one or more standby devices 1902 may make up a plurality of standby devices 402, 502, 602 (FIGS. 4-6). Optionally, the first workflow device 1906 may perform a job in a workflow environment 1910; however, the sequence in FIG. 19 may also commence prior to the workflow device having performed a job.

In some embodiments, configuration data corresponding to multiple different workflow devices and/or multiple workflow devices having different configurations are housed in memory storage 108 (FIGS. 1-9; not shown in FIG. 19). In some embodiments, the memory storage may be an external memory storage device, such as a memory storage device directly connected to the first standby device 1908. Alternatively, in some embodiments, each standby device may have memory storage 108 housed therein. In some embodiments, configuration data corresponding to multiple different workflow devices and/or multiple workflow devices having different configurations may be housed in memory storage 108.

The first standby device 1908 optionally ascertains whether the first workflow device 1906 has any configuration data that is new or that has been changed 1912. In some embodiments, the first standby device 1908, for example a primary standby device as to multiple workflow devices, may ascertain at step 1912 whether any one or more workflow devices have configuration data that is new or that has been changed, and/or whether any additional workflow devices have been added to the device network which have configuration data not already housed in memory storage 108 or which differs from the configuration data in memory storage. This step may optionally be repeated periodically to check for new devices having been added to the device network (e.g., workflow devices and/or standby devices) and then optionally assign standby devices to workflow devices accordingly, and/or to check for new configuration data, and/or changes to configuration data, and then update configuration data housed in memory storage accordingly.

When the presence of a new workflow device and/or new or changed configuration data is identified, the first standby device 1908 requests the appropriate configuration data 1914 from the appropriate workflow device. The requested configuration data may be all of the configuration data corresponding to the workflow device, or only the configuration data that is new or has been changed. The workflow device receives the request for configuration data 1916, and the appropriate configuration data is sent to the first standby device 1918. The first standby device 1908 receives the configuration data 1920, and saves the configuration data in memory storage 1922, such as memory storage 108. Optionally, the first standby device 1918 may configure itself according to the new or changed configuration data having been received (not shown), for example, when the new or changed configuration data corresponds to a workflow device for which the first standby device has been designated a primary standby device. The first workflow device 1006 may optionally further perform a job in the workflow environment 1924.

In some embodiments, configuration data may be requested automatically 1914, and/or configuration data may be sent automatically 1918, in response to a triggering event (not shown), or a user may initiate the sending of configuration data (not shown). In some embodiments, the configuration data sent to the standby device differs from configuration data stored in memory of at least one other workflow device from among the plurality. The configuration data may correspond to a first job assigned to the workflow device, and in some embodiments, the first job may differ in at least one respect from a second job assigned to one of the other workflow devices.

Upon the occurrence of a triggering event 1926, optionally, a standby device is identified for introducing into the workflow environment 1928. Alternatively, in some embodiments the standby device to be introduced into the workflow environment may be predetermined. For example, in some embodiments, the first standby device 1908 will be introduced into the workflow environment on the occurrence of a triggering event. This pre-determination may be based, for example, on the first standby device being available to perform a job assigned to the first workflow device 1906, and/or by virtue of the first standby device having been designated as the primary standby device. It should be noted, however, that the first standby device is not necessarily the primary standby device; but rather, in some embodiments, a different standby device may be designated the primary standby device, and in some embodiments, none of the standby devices are designated the primary standby device. Alternatively, in some embodiments the standby device to be introduced into the workflow environment on the occurrence of a triggering event remains undetermined (not shown), and a standby device will be identified when a triggering event occurs. In some embodiments, the standby device may be identified 1928 by the first standby device 1908, which may include self-selecting the first standby device or selecting a different standby device from among a plurality of standby devices. Such identifying a standby device may be based on status information communicated by the one or more standby devices such as availability of a standby device as to one or more of the workflow devices, and/or configuration information housed in memory storage pertaining to configurability of a standby device to perform a job in the workflow environment. In some embodiments, the first workflow device 1906 may identify a standby device to be introduced into the workflow environment over at least one additional standby device based on a first job having been assigned to the workflow device, and the standby device has been identified as being configurable to perform the first job.

The sequence depicted in FIG. 19 proceeds with optionally ascertaining whether the standby device to be introduced into the workflow environment has a configuration that matches or otherwise is compatible with a required configuration, or whether any configuration data is required 1930. The required configuration may include a configuration corresponding to the relevant workflow device, (e.g., the first workflow device 1906), and/or a configuration needed to carry out a required job in the workflow environment. A determination as to whether configuration data is required may be carried out by the first workflow device 1906 and/or by the first standby device 1908. When the configuration data matches and/or the standby device does not otherwise require any configuration data, for example, when the standby device configuration is a replica of the configuration of the first workflow device 1906, the standby device status is updated 1936, and the standby device is introduced into the workflow environment 1940.

When the standby device to be introduced into the workflow environment has a configuration that does not match the configuration of the workflow device, or when the standby device otherwise requires some configuration data 1930, the appropriate configuration data is selected from memory storage 1932 (e.g., memory storage 108). The selected configuration data may include, for example, a firmware installation file, a software installation file, an application installation file, and/or settings information. The selection may be carried out by the first standby device 1908 (e.g., when the first standby device 1908 is designated as the primary standby device), and/or another standby device the plurality (e.g., the standby device to be introduced into the workflow environment). Alternatively, or in addition, the selection may be carried out by a user (e.g., via a user interface), for example, in the event of a loss of connectivity that renders features configured for automatic selection by a standby device inoperable. Optionally, communications may be transmitted among the devices indicating that the standby device to be introduced into the workflow environment is no longer available as a standby device to the other workflow devices (not shown). Alternatively, when omitting the optional step of ascertaining whether the standby device has a configuration that matches the configuration of the workflow device or whether the standby device otherwise requires any configuration data, the appropriate configuration is selected from memory storage 1932 (e.g., memory storage 108).

With the appropriate configuration data having been selected from memory storage, the standby device to be introduced into the workflow environment is configured accordingly 1934, including for example, installing firmware, installing software, installing applications, and/or configuring settings of the standby device according to settings information. The standby device so configured may be the first standby device 1908 or another standby device on the device network. In some embodiments, the configuration may be carried out by the first standby device 1908, or, if different, the standby device to be introduced into the workflow environment. Preferably, when introducing a standby device into the workflow environment in place of a workflow device, following the standby device to be introduced having been configured, such standby device will have a configuration that is a replica of the configuration for the workflow device. In some embodiments, the standby device is configured to perform a job that was assigned to the workflow device.

Upon having been configured, the status of the standby device to be introduced into the workflow environment is updated 1936, and optionally, when the standby device to be introduced had been a primary standby device, a next standby device is assigned as a primary standby device 1938. For example, as shown in FIG. 4, the first standby device 412 is designated as the primary standby device, and as shown in FIG. 16, has been introduced into the workflow environment. Accordingly, the second standby device 414 and/or the third standby device 416 may be designated as a primary standby device (FIG. 16). The first standby device 1908 is then introduced into the workflow environment 1040, and optionally, the first standby device 1908 may begin performing an assigned job in the workflow environment 1942, which may include performing the job assigned to the workflow device, and/or a different job. In some embodiments, when a next standby device is assigned as a primary standby device 1938, configuration data in memory storage 108 (e.g., memory within the first standby device 1908) may be transferred or copied to additional memory storage 108 corresponding to the next standby device having been assigned (e.g., memory within such next standby device), and/or memory storage directly connected to the first standby device 1908 may be disconnected therefrom and then connected to the next standby device.

Optionally, the first standby device 1908 (and/or another standby device having been identified to be introduced into the workflow environment) may provide an indication to a user, for example, as shown in FIG. 17. Optionally, the first workflow device 1906 may be removed from the workflow environment, for example, when the standby device is introduced into the workflow environment in substitution for the workflow device.

Additional Exemplary Devices and Workflow Environments

The present disclosure may utilize any variety of devices or combinations of devices that may be within the contemplation of those skilled in the art. As additional examples, and without limitation, the present disclosure may be implemented using one or more of the following types of devices, or combinations thereof: a printer, a barcode scanner, a mobile phone, a computer device (e.g., a desktop, a laptop, a tablet), an RFID device, a wearable device, a copy machine, a fax machine, an image or document scanner, a point-of-sale device an instrument (e.g. a measurement instrument such as an electronic scale, or a flow meter), a calibration device (e.g., a device for calibrating one or more other devices such as instruments), or a dimensioner (e.g., a weighing and volume measuring system for measuring three-dimensional objects such as packages, parcels, pallets, cartons, and boxes). A printer may include a printer with an integrated or in-line scanner/verifier, desktop printer, an "all-in-one" printer, an industrial printer, a mobile printer, a bar-code printer, a label printer, a ticket printer, a tag printer, an ink-drop printer, a laser printer, a thermal printer, a thermal transfer printer, a 3-D printer, a dot-peen printer, a laser-marking or laser-engraving printer, an electro-chemical etching printer, a circuit printer, a point-of-sale device (e.g., a cash register, a payment console, etc.), or any other printer. A barcode scanner may include a barcode verifier, a handheld barcode scanner, a general duty barcode scanner, a healthcare barcode scanner, an in-counter barcode scanner, an industrial barcode scanner, a hands-free barcode scanner, a pocket barcode scanner, a wearable barcode scanner (e.g., a hands-free scanning device), a point-of-sale device (e.g., a cash register, a payment console, etc.), a dimensioner, or any other scanner. A computer device may include a handheld computer, a cold-storage computer, a healthcare mobile computer, a hazardous location computer, a vehicle-mounted computer, a wearable computer (e.g., a hands-free computing device). An RFID device may include an RFID antenna, a RFID reader (e.g., a fixed, desktop, or handheld RFID reader), an RFID printer (e.g., a fixed, desktop, or handheld RFID printer), a vehicle-mounted RFID device (e.g., an RFID antenna, reader, or printer), or any other RFID device. A wearable device may include a headset, wearable printer, a wearable scanner, or a wearable computer. Devices may include industrial devices, desktop devices, mobile devices. As an example, but without limitation, the foregoing devices may be implemented in various embodiments of the present disclosure including a verification system.

As additional examples, and without limitation, a workflow environment may include: a warehouse, a distribution center or operation (e.g., an inbound/receiving workflow, a forklift/vehicle workflow, order fulfillment/picking workflow, and outbound/shipping workflow), a manufacturing facility or operation (e.g., an automated labeling workflow, a part picking workflow, a part marking workflow, a kitting workflow, an assembly workflow, an inspection workflow), a transportation facility or operation, a healthcare facility or operation (e.g., an admission workflow, a bedside point-of-care workflow, a medication, surgery, or treatment workflow, a specimen collection workflow, a laboratory services workflow, a pharmacy workflow, a medical supply tracking workflow), a logistics center or operation, a retail location or operation (e.g., a point-of-sale workflow, a customer engagement workflow, a mobile marketing workflow, a store operations workflow, a grocery store or grocery workflow, a restaurant or foodservices location or workflow, a general or specialty retail location or workflow), a merchandising and delivery facility or operation (e.g., a store delivery workflow, a merchandise stocking workflow, or a home delivery workflow), a government facility or operation (e.g., a military deployment workflow, a law enforcement workflow, a public service workflow, a security workflow), a parcel facility or operation, a courier facility or operation, or a vehicle or vehicle-based operation (e.g., a warehouse vehicle workflow, a transportation vehicle workflow, or a delivery workflow), a port or intermodal facility or operation (e.g., a shipping port or shipping port workflow, an airport or airport workflow, a bus station or bus station workflow, a train station or train station workflow), a field-service location or field operation (e.g., an event location or event management workflow, a utilities location or utilities management workflow, a job site or job process (e.g., a work order management workflow, a dispatch workflow, a service route or service workflow, a start of day workflow, a dynamic routing or tracking workflow, an inventory asset management workflow, an end of day workflow), a fleet vehicle or rolling stock management facility or operation, a third-party logistics operation or workflow, and a packaging or labeling facility or operation.

As additional examples, jobs may include printing material, scanning material, receiving a call, initiating a call, transmitting data, receiving data, copying data. As additional examples, jobs may differ from among one another based any one or more characteristics of the respective jobs. Such differences include different workflows, different inputs, different outputs, different specifications, different quality, and different users.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,866,421;
U.S. Pat. Nos. 8,868,519; 8,868,802;
U.S. Pat. Nos. 8,868,603; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;

U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;

U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.); U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.); U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

The foregoing detailed description and accompanying figures set forth typical embodiments of methods for managing a fleet of devices. The present disclosure is not limited to such exemplary embodiments. It will be apparent that numerous other methods may be provided. Various embodiments have been set forth via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects and/or features of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of ordinary skill in the art in light of the present disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as volatile and non-volatile memory devices, floppy and other removable disks, hard disk drives, SSD drives, flash drives, optical discs (e.g., CD ROMs, DVDs, etc.), and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control elements (e.g., feedback for sensing temperature; control heaters for adjusting temperature). A typical data processing system may be implemented utilizing any suitable commercially available components, such as those typically found in data computing/communication and/or network computing/communication systems.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality. Specific examples of operably couplable include but are not limited to physically mateable and/or physically interacting components and/or wirelessly interactable and/or wirelessly interacting components and/or logically interacting and/or logically interactable components.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those skilled in the art. The various aspects, features, and embodiments disclosed herein are for purposes of illustration and are not intended to be limiting. It is intended that the scope of the present invention be defined by the following claims and their equivalents.

The invention claimed is:

1. A method for managing a fleet of devices, the method comprising:
   obtaining from at least one scanner assembly, device information corresponding to a job pertaining to scanning an indicia, wherein the device information pertains at least in part to at least one printed media produced by a first workflow device of a plurality of workflow devices on a device network;
   analyzing the device information by comparing at least one first aspect of the device information to a first parameter value; and
   in response to detecting a first deviation between the at least one first aspect of the device information and the first parameter value and associated with the at least one printed media, sending a first instruction to a first location on the device network, the first instruction triggering a first action comprising:
   transmitting configuration data to configure a second workflow device on the device network for performing the job by causing an installation of at least one of a firmware, a software, or an application on the second workflow device, and
   assigning the job to the second workflow device.

2. The method according to claim 1, wherein the second workflow device comprises a standby device, wherein the first action further comprises triggering the standby device to be introduced into a workflow environment.

3. The method according to claim 1, wherein the first parameter value is based at least in part on a scan parameter associated with the indicia.

4. The method according to claim 1, wherein analyzing the device information further comprises:
  comparing at least a second aspect of the device information to a second parameter value; and
  responsive to detecting a second deviation from the second parameter value, sending a second instruction to a second location on the device network, the second instruction triggering a second action.

5. The method according to claim 4, wherein the second parameter value is based at least in part on a value corresponding to one or more of: edge determination, minimum reflectance, symbol contrast, minimum edge contrast, modulation, printing defects, quiet zone, decodability, cell contrast, cell modulation, fixed pattern damage, unused error correction, axial non-uniformity, and grade non-uniformity.

6. The method according to claim 1, wherein the plurality of workflow devices comprises a first device, a second device, and a third device, wherein the first deviation from the first parameter value corresponds to printed media produced by the first device, wherein the first action comprises assigning one or more jobs from the second device to the third device, the third device being the second workflow device.

7. The method according to claim 1, wherein the first action further comprises scheduling maintenance for one or more workflow devices from the plurality of workflow devices.

8. An apparatus for managing a fleet of devices, the apparatus comprising a processor and a non-transitory memory comprising program code, the non-transitory memory and the program code configured to, with the processor, cause the apparatus to at least:
  obtain from at least one scanner assembly, device information corresponding to a job pertaining to scanning an indicia, wherein the device information pertains at least in part to at least one printed media produced by a first workflow device of a plurality of workflow devices on a device network;
  analyze the device information by comparing at least one first aspect of the device information to a first parameter value; and
  in response to detecting a first deviation between the at least one first aspect the device information and the first parameter value and associated with the at least one printed media, send a first instruction to a first location on the device network, the first instruction triggering a first action comprising:
    transmitting configuration data to configure a second workflow device on the device network for performing the job by causing an installation of at least one of a firmware, a software, or an application on the second workflow device, and
    assigning the job to the second workflow device.

9. The apparatus according to claim 8, wherein the second workflow device comprises a standby device, wherein the first action further comprises triggering the standby device to be introduced into a workflow environment.

10. The apparatus according to claim 8, wherein the first parameter value is based at least in part on a scan parameter associated with the indicia.

11. The apparatus according to claim 8, wherein to analyze the device information, the non-transitory memory and the program code are configured to, with the processor, cause the apparatus to further:
  compare at least a second aspect of the device information to a second parameter value; and
  responsive to detecting a second deviation from the second parameter value, send a second instruction to a second location on the device network, the second instruction triggering a second action.

12. The apparatus according to claim 11, wherein the second parameter value is based at least in part on a value corresponding to one or more of: edge determination, minimum reflectance, symbol contrast, minimum edge contrast, modulation, printing defects, quiet zone, decodability, cell contrast, cell modulation, fixed pattern damage, unused error correction, axial non-uniformity, and grade non-uniformity.

13. The apparatus according to claim 8, wherein the plurality of workflow devices comprises a first device, a second device, and a third device, wherein the first deviation from the first parameter value corresponds to printed media produced by the first device, wherein the first action comprises assigning one or more jobs from the second device to the third device, the third device being the second workflow device.

14. The apparatus according to claim 8, wherein the first action further comprises scheduling maintenance for one or more workflow devices from the plurality of workflow devices.

15. A computer program product for managing a fleet of devices, the computer program product comprising at least one non-transitory computer-readable storage medium having computer-readable program code portions stored therein, the computer-readable program code portions comprising an executable portion configured to:
  obtain from at least one scanner assembly, device information corresponding to a job pertaining to scanning an indicia, wherein the device information pertains at least in part to at least one printed media produced by a first workflow device of a plurality of workflow devices on a device network;
  analyze the device information by comparing at least one first aspect of the device information to a first parameter value; and
  in response to detecting a first deviation between the at least one first aspect of the device information and the first parameter value and associated with the at least one printed media, send a first instruction to a first location on the device network, the first instruction triggering a first action comprising:
    transmitting configuration data to configure a second workflow device on the device network for performing the job by causing an installation of at least one of a firmware, a software, or an application on the second workflow device, and
    assigning the job to the second workflow device.

16. The computer program product according to claim 15, wherein the second workflow device comprises a standby device, wherein the first action further comprises triggering the standby device to be introduced into a workflow environment.

17. The computer program product according to claim 15, wherein the first parameter value is based at least in part on a scan parameter associated with the indicia.

18. The computer program product according to claim 15, wherein analyzing the device information further comprises:
  comparing at least a second aspect of the device information to a second parameter value; and
  responsive to detecting a second deviation from the second parameter value, sending a second instruction to a second location on the device network, the second instruction triggering a second action.

19. The method of claim 1, wherein the configuration data comprises a plurality of instances of the firmware, wherein the method further comprises:
- in response to determining that a first instance of the plurality of instances does not match an existing firmware on the second workflow device, causing an installation of the firmware.

20. The method of claim 1, wherein detecting the first deviation between the at least one first aspect of the device information and the first parameter value is based on a quality metric corresponding to the at least one printed media.

\* \* \* \* \*